US012145373B2

(12) United States Patent
Leiser et al.

(10) Patent No.: US 12,145,373 B2
(45) **Date of Patent: *Nov. 19, 2024**

(54) PRINT LIQUID SUPPLY

(71) Applicant: Hewlett-Packard Development Company, L.P., Spring, TX (US)

(72) Inventors: Judson M. Leiser, Corvallis, OR (US); Miquel Boleda Busquets, Sant Cugat del Vallès (ES); Bernd Karlsboeck, Sant Cugat del Vallès (ES); David Olsen, Corvallis, OR (US); Michael E. Peterschmidt, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/763,855

(22) PCT Filed: Jul. 13, 2018

(86) PCT No.: PCT/US2018/041932

§ 371 (c)(1),
(2) Date: May 13, 2020

(87) PCT Pub. No.: WO2020/013834

PCT Pub. Date: Jan. 16, 2020

(65) Prior Publication Data

US 2020/0282733 A1 Sep. 10, 2020

(51) Int. Cl.
*B41J 2/175* (2006.01)

(52) U.S. Cl.
CPC ....... *B41J 2/17523* (2013.01); *B41J 2/17513* (2013.01); *B41J 2/1752* (2013.01);
(Continued)

(58) Field of Classification Search
CPC .. B41J 2/17513; B41J 2/17516; B41J 2/1752; B41J 2/17523; B41J 2/17546; B41J 2/1755
See application file for complete search history.

(56) References Cited

U.S. PATENT DOCUMENTS

| | | | |
|---|---|---|---|
| 3,599,840 | A | 8/1971 | Speas et al. |
| 5,512,925 | A | 4/1996 | Ohashi |

(Continued)

FOREIGN PATENT DOCUMENTS

| | | |
|---|---|---|
| CN | 1186021 | 7/1998 |
| CN | 1259086 | 7/2000 |

(Continued)

OTHER PUBLICATIONS

European Patent Application, "Communication under Rule 71(3) EPC," issued in connection with European patent application No. 18830065.1, dated Feb. 11, 2021, 66 pages.

(Continued)

*Primary Examiner* — Anh T Vo
(74) *Attorney, Agent, or Firm* — Foley & Lardner LLP

(57) ABSTRACT

A print liquid supply apparatus comprising a container to hold print liquid and an interface structure to fluidically connect the container to a receiving station wherein the interface structure projects outwards with respect to the container and comprises a liquid interface to fluidically connect to a corresponding fluidic interface of the receiving station and a liquid channel fluidically connecting the container and the liquid interface.

19 Claims, 39 Drawing Sheets

(52) U.S. Cl.
CPC ......... *B41J 2/17546* (2013.01); *B41J 2/1755* (2013.01); *B41J 2002/17516* (2013.01)

(56) References Cited

U.S. PATENT DOCUMENTS

| | | | | |
|---|---|---|---|---|
| 5,835,817 | A * | 11/1998 | Bullock | G03G 15/553 399/25 |
| 5,847,734 | A | 12/1998 | Pawlowski, Jr. | |
| 6,033,064 | A | 3/2000 | Pawlowski, Jr. | |
| 6,102,533 | A * | 8/2000 | Nozawa | B41J 2/17513 347/86 |
| 6,130,695 | A | 10/2000 | Childers | |
| 6,142,617 | A | 11/2000 | Barinaga et al. | |
| 6,161,920 | A | 12/2000 | Santhanam et al. | |
| 6,183,077 | B1 | 2/2001 | Hmelar et al. | |
| 6,276,788 | B1 | 8/2001 | Hilton | |
| 6,290,345 | B1 | 9/2001 | Sasaki et al. | |
| 6,322,207 | B1 | 11/2001 | Hall et al. | |
| 6,416,166 | B1 | 7/2002 | Robinson et al. | |
| 6,471,333 | B1 | 10/2002 | Powell | |
| 6,474,512 | B2 | 11/2002 | Wakayama | |
| 6,619,344 | B2 | 9/2003 | Schonfelder et al. | |
| 6,749,292 | B2 | 6/2004 | Sturgeon | |
| 6,764,169 | B2 | 7/2004 | Hall et al. | |
| 6,793,332 | B2 | 9/2004 | Kaga et al. | |
| 6,863,388 | B2 | 3/2005 | Seino et al. | |
| 7,147,310 | B2 | 12/2006 | Steinmetz | |
| 7,165,833 | B2 | 1/2007 | Graham et al. | |
| 7,618,137 | B2 | 11/2009 | Inoue | |
| 7,651,208 | B2 | 1/2010 | Matsumoto | |
| 7,654,655 | B2 | 2/2010 | Malik et al. | |
| 8,297,744 | B2 | 10/2012 | Hayashi | |
| 8,591,014 | B2 | 11/2013 | Leiser | |
| 8,636,345 | B2 | 1/2014 | Ogle et al. | |
| 8,727,516 | B2 | 5/2014 | Harvey | |
| 8,833,913 | B2 | 9/2014 | Satoh et al. | |
| 9,067,424 | B1 | 6/2015 | Tominaga et al. | |
| 9,340,029 | B2 | 5/2016 | Naito et al. | |
| 9,522,776 | B2 | 12/2016 | Kawate | |
| 11,173,719 | B2 | 11/2021 | Leiser et al. | |
| 11,179,941 | B2 | 11/2021 | Leiser et al. | |
| 11,364,720 | B2 | 6/2022 | Leiser et al. | |
| 11,667,124 | B2 | 6/2023 | Leiser et al. | |
| 2002/0080217 | A1 | 6/2002 | Olsen | |
| 2002/0109761 | A1 | 8/2002 | Shimizu et al. | |
| 2002/0118262 | A1 | 8/2002 | Seino et al. | |
| 2002/0158943 | A1 | 10/2002 | Powell et al. | |
| 2002/0175977 | A1 | 11/2002 | Hanson et al. | |
| 2002/0196312 | A1 | 12/2002 | Ishizawa et al. | |
| 2003/0035032 | A1 | 2/2003 | Trafton | |
| 2004/0027432 | A1 | 2/2004 | Childers et al. | |
| 2004/0183873 | A1 | 9/2004 | Steinmetz et al. | |
| 2005/0024451 | A1 | 2/2005 | Steinmetz et al. | |
| 2005/0052511 | A1 | 3/2005 | Seino et al. | |
| 2005/0185036 | A1 | 8/2005 | Seino | |
| 2006/0017788 | A1 | 1/2006 | Otis et al. | |
| 2007/0070156 | A1 | 3/2007 | Steinmetz | |
| 2007/0229619 | A1 | 10/2007 | Sugahara et al. | |
| 2007/0291089 | A1 | 12/2007 | Fishbein et al. | |
| 2009/0096836 | A1 | 4/2009 | Haines et al. | |
| 2009/0244224 | A1 | 10/2009 | Koizumi et al. | |
| 2009/0290001 | A1 | 11/2009 | Domae | |
| 2010/0053257 | A1 | 3/2010 | Kubo | |
| 2010/0073442 | A1 | 3/2010 | Akiyama | |
| 2010/0231664 | A1 | 9/2010 | Steinmetz | |
| 2011/0310195 | A1 | 12/2011 | Nakamura | |
| 2012/0198686 | A1 | 8/2012 | Kitagawa | |
| 2012/0204966 | A1 | 8/2012 | Leiser et al. | |
| 2013/0208061 | A1 | 8/2013 | Harvey et al. | |
| 2013/0208601 | A1 | 8/2013 | Cui et al. | |
| 2014/0360596 | A1 | 12/2014 | Tsukahara et al. | |
| 2015/0035916 | A1 | 2/2015 | Olsen | |
| 2015/0077485 | A1 | 3/2015 | Nagashima et al. | |
| 2015/0109379 | A1 | 4/2015 | Koike et al. | |
| 2015/0191020 | A1 | 7/2015 | Tominaga et al. | |
| 2015/0375544 | A1 | 12/2015 | Kubota | |
| 2016/0096375 | A1 | 4/2016 | Ozeki | |
| 2016/0200114 | A1 | 7/2016 | Nanjo et al. | |
| 2017/0021634 | A1 | 1/2017 | Tsukahara | |
| 2017/0066249 | A1 | 3/2017 | Ono | |
| 2017/0085031 | A1 | 3/2017 | Ishizawa et al. | |
| 2017/0182781 | A1 | 6/2017 | Shimizu et al. | |
| 2018/0052027 | A1 | 2/2018 | Ackley | |
| 2018/0093482 | A1 | 4/2018 | Takahashi | |
| 2018/0154644 | A1 | 6/2018 | Okazaki et al. | |
| 2019/0016146 | A1 | 1/2019 | Fukasawa et al. | |
| 2019/0196393 | A1 | 6/2019 | Nagashima et al. | |
| 2020/0276824 | A1 | 9/2020 | Leiser et al. | |
| 2020/0346463 | A1 | 11/2020 | Leiser et al. | |
| 2020/0346464 | A1 | 11/2020 | Leiser | |
| 2021/0276337 | A1 | 9/2021 | Studer et al. | |

FOREIGN PATENT DOCUMENTS

| | | | |
|---|---|---|---|
| CN | 1284431 | | 2/2001 |
| CN | 1344618 | | 4/2002 |
| CN | 1385306 | | 12/2002 |
| CN | 1449919 | A | 10/2003 |
| CN | 1579786 | A | 2/2005 |
| CN | 1636743 | | 7/2005 |
| CN | 1860030 | | 11/2006 |
| CN | 101242957 | | 8/2008 |
| CN | 101585265 | | 11/2009 |
| CN | 102285238 | | 12/2011 |
| CN | 102427948 | | 4/2012 |
| CN | 103038064 | | 4/2013 |
| CN | 103153628 | | 6/2013 |
| CN | 103171293 | | 6/2013 |
| CN | 104085198 | | 10/2014 |
| CN | 104118216 | | 10/2014 |
| CN | 104442002 | A | 3/2015 |
| CN | 104999798 | | 10/2015 |
| CN | 105383167 | | 3/2016 |
| CN | 105829109 | | 8/2016 |
| CN | 106103106 | | 11/2016 |
| CN | 106414083 | | 2/2017 |
| CN | 107878038 | A | 4/2018 |
| DE | 69617610 | | 1/2002 |
| EP | 0778148 | A1 | 6/1997 |
| EP | 1815994 | A2 | 8/2007 |
| EP | 1905596 | | 4/2008 |
| EP | 1504907 | B1 | 4/2009 |
| EP | 2047997 | A1 | 4/2009 |
| EP | 2258554 | B1 | 12/2010 |
| EP | 2465686 | A1 | 6/2012 |
| EP | 2397334 | B1 | 1/2013 |
| EP | 2848412 | | 3/2015 |
| EP | 3281795 | A1 | 2/2018 |
| EP | 3300903 | | 4/2018 |
| EP | 3300904 | A | 4/2018 |
| EP | 3300904 | A1 | 4/2018 |
| HK | 1074970 | | 11/2005 |
| JP | 52-17239 | U | 2/1977 |
| JP | 60-228160 | A | 11/1985 |
| JP | 08-230210 | A | 9/1996 |
| JP | 09150524 | | 6/1997 |
| JP | 10128992 | | 5/1998 |
| JP | 2002513341 | | 5/2002 |
| JP | 2002-292905 | A | 10/2002 |
| JP | 200230770 | | 10/2002 |
| JP | 2002307704 | | 10/2002 |
| JP | 2002307710 | | 10/2002 |
| JP | 2002337358 | | 11/2002 |
| JP | 2003-025608 | A | 1/2003 |
| JP | 2003072102 | | 3/2003 |
| JP | 2007-500619 | A | 1/2007 |
| JP | 2007500618 | | 1/2007 |
| JP | 2007500620 | | 1/2007 |
| JP | 2007-152681 | A | 6/2007 |
| JP | 2007269040 | | 10/2007 |
| JP | 2007-290349 | A | 11/2007 |
| JP | 2009279876 | | 12/2009 |
| JP | 2010234801 | | 10/2010 |
| JP | 2011-143725 | A | 7/2011 |

(56) References Cited

FOREIGN PATENT DOCUMENTS

| | | | |
|---|---|---|---|
| JP | 2012-000862 | A | 1/2012 |
| JP | 2012-000863 | A | 1/2012 |
| JP | 2012131069 | | 7/2012 |
| JP | 2014028503 | | 2/2014 |
| JP | 5438622 | B2 | 3/2014 |
| JP | 3190113 | U | 4/2014 |
| JP | 2015058541 | | 3/2015 |
| JP | 2015058672 | | 3/2015 |
| JP | 2015174302 | | 10/2015 |
| JP | 2016007794 | | 1/2016 |
| JP | 2016045342 | | 4/2016 |
| JP | 2016185643 | | 10/2016 |
| JP | 2016187872 | | 11/2016 |
| JP | 2017-056706 | A | 3/2017 |
| JP | 2017052121 | | 3/2017 |
| JP | 2017052219 | | 3/2017 |
| JP | 2017209945 | | 11/2017 |
| JP | 2018-052027 | A | 4/2018 |
| JP | 2008132785 | | 4/2018 |
| JP | 2018052038 | | 4/2018 |
| JP | 2018065374 | | 4/2018 |
| JP | 2018103504 | | 7/2018 |
| JP | 2018103593 | | 7/2018 |
| JP | 2018108650 | A | 7/2018 |
| JP | 2019521895 | | 8/2019 |
| KR | 100234797 | | 12/1999 |
| RU | 2538522 | C2 | 1/2015 |
| TW | 200631803 | | 9/2006 |
| TW | I262137 | | 9/2006 |
| TW | 201111181 | A | 4/2011 |
| WO | 2005011985 | | 2/2005 |
| WO | 2007037451 | | 4/2007 |
| WO | 2010044788 | | 4/2010 |
| WO | WO-2010134907 | A1 | 11/2010 |
| WO | WO-2017115582 | | 7/2017 |
| WO | WO-2017131677 | A1 | 8/2017 |

OTHER PUBLICATIONS

European Patent Application, "Communication under Rule 71(3) EPC," issued in connection with Europena patent application No. 18830065.1, dated Feb. 11, 2021, 66 pages.

European Patent Office, "Entry into European Phase," issued in connection with EP patent application No. 18749231.0-1017, dated Jan. 25, 2019, 28 pages.

European Patent Office, "Intention to Grant," issued in connection with EP patent application No. 18749231.0-1017, dated Apr. 22, 2020, 143 pages.

International Searching Authority, "Search Report and Written Opinion," issued in connection with PCT patent application No. PCT/US2018/041924, dated Mar. 25, 2019, 17 pages.

* cited by examiner

PRINT LIQUID SUPPLY

RELATED APPLICATIONS

This patent arises from the U.S. national stage of International Patent Application Serial No. PCT/US18/041932, having a filing date of Jul. 13, 2018. International Patent Application Serial No. PCT/US18/041932 is hereby incorporated by reference in its entirety.

BACKGROUND

Print liquid supplies include reservoirs with print liquid. The print liquid can be a print agent such as ink or any agent to aid in the process of two-dimensional (2D) or three-dimensional (3D) printing. In use, the print liquid is to be provided to a print liquid dispense mechanism downstream of the supply. The print liquid dispense mechanism can be part of a larger 2D or 3D print system. The print system may include a plurality of receiving stations to allow different liquid type supplies to connect to the print liquid dispense mechanism and be replaced. Other print systems such as monochrome systems include only a single receiving station.

DRAWINGS

DESCRIPTION

Figure 1:
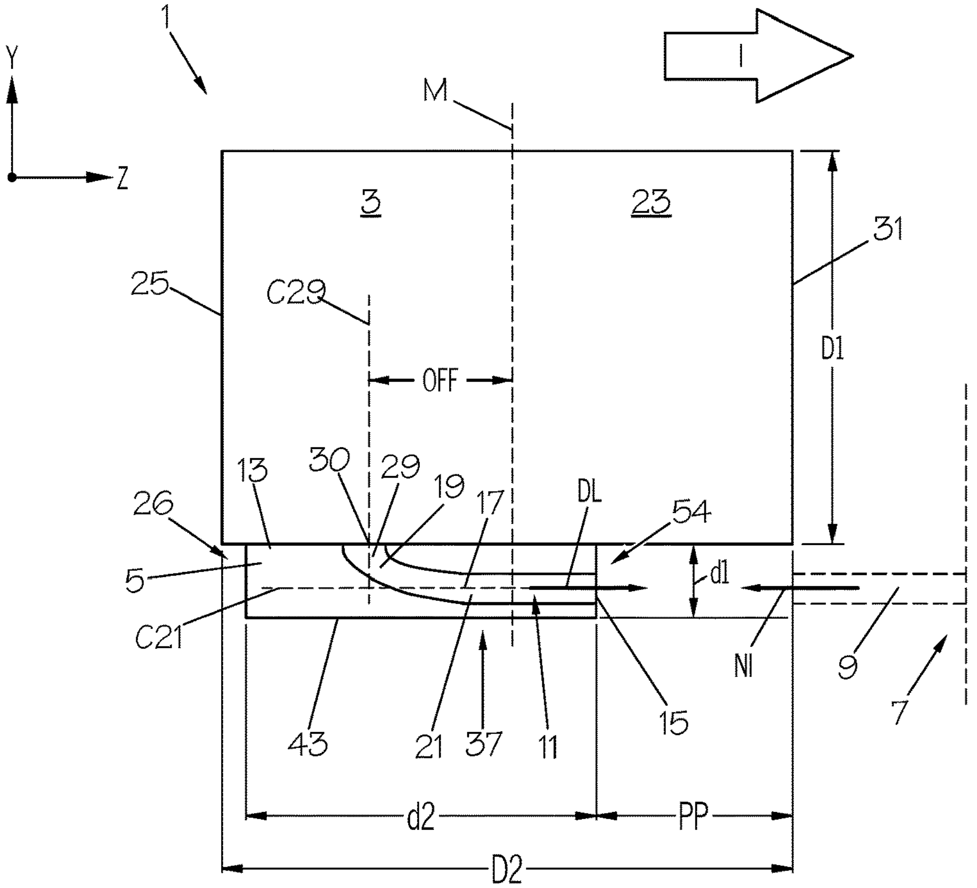
FIG. 1 illustrates a diagrammatic side view of an example of a liquid supply apparatus.

This disclosure addresses print liquid supply apparatuses, interface structures for use with print liquid supply apparatuses, and components of print liquid supply apparatuses and interface structures. In operation, an interface structure of this disclosure may be part of a replaceable print supply apparatus and may facilitate fluidically connecting the contents of the supply apparatus with a host apparatus, such as a printer. Example interface structures of this disclosure can be associated with a relatively wide range of different liquid volumes, supply types, and printer platforms, whereby printer platforms may be different in terms of operating with different media types, media formats, print speeds and/or liquid types, amongst others.

The liquid referred to in this disclosure may be a print liquid. The print liquid can be any type of agent for printing, including ink and 3D print agents and inhibitors. The print liquid may include certain amounts of gas and/or solids. While this disclosure mostly addresses print related aspects, it is recognized that the features and effects discussed in this disclosure could work for other types of liquid supply apparatuses for connection, with other types of host apparatuses.

For example, the print liquid supply apparatus of this disclosure can be associated with relatively high speed or large format print systems. The liquid reservoir volume of the supply apparatus may be at least approximately 50 ml (milliliters), at least approximately 90 ml, at least approximately 100 ml, at least approximately 200 ml, at least approximately 250 ml, at least approximately 400 ml, at least approximately 500 ml, at least approximately 700 ml or at least approximately 1 L (liter). In further examples, the supply apparatus may be adapted to contain larger liquid volumes, such as at least 1 L, at least 2 L, or at least 5 L. The reservoir volume of the supply apparatus of this disclosure may be scaled within a broad range of volumes. The same interface structure and the same receiving station may be associated with that broad range of volumes. The supply of this disclosure can facilitate using similar receiving station components for different print system platforms. For example, both smaller format and larger format printers, or both 2D and 3D printers, may be equipped with a similar receiving station to interface with the interface structures of this disclosure. This may lead to increased customization over a relatively wide product range which in turn may allow for cost control, efficiency, etc.

Further example interface structures and supply apparatuses of this disclosure facilitate a relatively easy mounting and unmounting of the supply apparatus with respect to the receiving station, irrespective of the internal liquid volume. In again further examples, relatively eco-friendly supply apparatuses are provided.

In this disclosure "approximately" or "at least approximately" should be understood as including some appropriate margin as well as "exactly". For example, when referring to approximately 23 mm (millimeter) this may include a certain margin such as for example 0.5 mm more than or less than 23 mm, but it should also include exactly 23 mm.

In this disclosure certain examples are described with reference to the drawings. While the drawings illustrate certain combinations of features, also sub-combinations of features that are not illustrated in isolation can be derived from these drawings. Where helpful reference is made to certain sub-combinations of features, margins, ranges, alternatives, different features, and/or omission or addition of certain features, whereby the drawings may be used for reference purposes.

Figure 2:
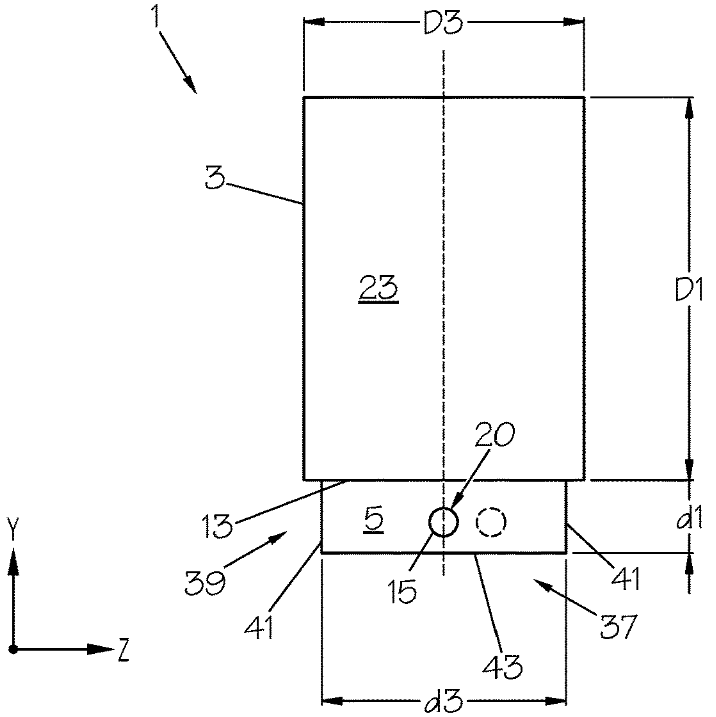
FIG. 2 illustrates a diagrammatic front view of the example liquid supply apparatus of FIG. 1.

FIGS. 1 and 2 illustrate diagrams of a side and front view, respectively, of an example of a print liquid supply apparatus 1. The print liquid supply apparatus 1 comprises a container 3 to hold print liquid. In one example the container 3 includes an at least partially collapsible reservoir to hold the liquid. In a further example the container 3 includes a support structure such as a box or tray at least partially around the reservoir to support and/or protect the reservoir. In this disclosure, without referring to a further reservoir or support structure, the container includes at least a reservoir.

In a filled state, the container 3 may have a substantially cuboid outer shape with rectangular outer walls and sharp or rounded edges that connect the walls. The container 3 can have other shapes. In an example the container 3 includes a collapsible bag adapted to collapse to facilitate withdrawal of the liquid. In the illustrated diagram the container 3 is illustrated in an expanded, for example filled, state. In an example, the container 3 is void of separate liquid retaining material such as foam. The container 3 may allow print liquid to freely move inside its liquid retaining volume.

The supply apparatus 1 includes an interface structure 5 for example to provide for a liquid connection between an internal liquid volume of the container 3 and a further host apparatus such as a printer. The interface structure 5 includes at least a liquid throughput 11 supplies liquid from the container 3 to a receiving station. As will be explained later in some examples liquid may during certain instances in time be provided back to the container 3, for example due to certain pressure changes, or to mix or circulate liquid in the container 3, either through a single liquid throughput channel or through multiple throughput channels of the same interface structure 3.

In one example, a host apparatus such as a 2D or 3D printer includes a receiving station 7 to receive the interface structure 5. The receiving station 7 may be a fixed or exchangeable part of the host apparatus. The diagram of FIG. 1 illustrates a portion of a receiving station 7 including a liquid needle 9. In this disclosure a liquid needle 9 may include any fluidic needle or pen for insertion into a fluidic interface of the supply apparatus. For example, the fluidic needle may include a metal or plastic needle. In other examples other types of receiving stations may be used, having liquid interfaces other than needles. Other types of fluidic interfaces of a receiving station may include towers, septums for receiving supply-side needles. The liquid throughput 11 is adapted to connect to the printer-side liquid interface. The example supply apparatus 1 is to be installed and removed with respect to the receiving station 7. The interface structure 5 is adapted for mounting and unmounting with respect to the receiving station 7. In one example the interface structure 5 is adapted for relatively user-friendly insertion and ejection with respect to the receiving station 7.

The interface structure 5 may include a plurality of interface features that interact with the receiving station. As will be explained with reference to different examples and figures, the interface features may include the liquid interface 15, data processing features, data connection features, guidance and alignment features, actuating features to mechanically actuate upon receiving station components, secure features, key features, etc. In certain examples the interface structure 5 may include a single molded structure at least part of which connects to, and projects from, the container 3. The interface structure 5 may also serve as a separate cap for the container 3, to seal the container 3 during transport and storage, after filling the container 3 with liquid before transport.

The container 3 and interface structure 5 each have respective first dimensions D1, d1, second dimensions D2, d2 and third dimensions D3, d3 that extend parallel to perpendicular reference axes y, x, z, respectively. In this disclosure the container dimensions D1, D2, D3 represent (i) axes parallel to the respective reference axes y, x, z along which the container 3 extends, and (ii) extents of a container volume along said axes. In this disclosure the interface dimensions d1, d2, d3 represent (i) axes parallel to the respective reference axes y, x, z, and (ii) extents of an interface profile of the interface structure 5 along said axes, wherein the interface profile is the portion of the interface structure 5 which is to interface with the receiving station. It may be understood that the interface profile, or first dimension d1, of the interface structure 5 spans interface components of the interface structure 5 that are to interface with the receiving station 7. The interface structure may include elements that project outside of the interface dimensions d1, d2, d3, external to said interface profile, for example to connect to and/or support the container 3. Each one of the first dimensions D1, d1, second dimensions D2, d2 and third dimensions D3, d3 may refer to a respective one of a height, length and width, depending on the orientation of the container 3 or interface structure 5.

In the illustrated example of FIGS. 1 and 2 the first dimension D1, d1 represents a height, the second dimension D2, d2 represents a length and the third dimension D3, d3 represents a width of each of the container 3 and the interface structure 5, respectively. As a skilled person will understand, in different instances and situations, the receiving station 7 and supply apparatus 1 may have different configurations and orientations and that is why this disclosure refers to "dimensions" or certain parallel "directions" or "axes" when describing certain features and their relative positions, dimensions and orientations.

On the other hand, for reasons of clarity this disclosure sometimes also uses more orientation-dependent language such as "top view", "side view", "front view", "back", "bottom", "front", "top", "lateral side", "width", "height", "length", "lateral", "distal", etc. but this should be interpreted as intended for clarity only rather than limiting respective features to a particular orientation, unless explained otherwise. To illustrate this point, certain liquid supply apparatuses with a collapsing bag type reservoir may operate in any orientation, due to the nature of collapsing bag type reservoirs, whereby the interface structure may protrude from the container in any direction. Correspondingly, a projecting portion of the container may project in any direction, and the interface structure could project in any direction. Also, a "container bottom" may be oriented at the top of a container if that container is placed or mounted upside down as compared to some of the illustrations in this disclosure while this does not affect the functioning of the supply apparatus or interface structure. Also, a front of the interface structure or container may be oriented downwards in installed condition if the container is rotated 90 degrees with respect to the horizontal orientation that is illustrated in most of the figures.

Furthermore, the description may refer to virtual reference planes, virtual planes or planes which are meant to serve as a reference for explaining certain shapes, relative positions, dimensions, extents, orientations, etc. similar to the earlier explained axes, directions and dimensions d1, D1, d2, D2, d3, D3.

The interface structure 5 projects along the direction of the first dimension D1, d1 outwards from the container 3. In the illustration, the interface structure 5 protrudes from a container side 13 parallel to the second and third container dimension D2, D3. In the illustrated example the interface structure 5 protrudes from a bottom 13 of the container 3, defined by a bottom wall.

In other examples, the interface structure 5 may protrude from one of a lateral side, front, back or top of the container 3. In different examples the supply apparatus 1 may have different orientations in printer-installed or stored condition whereby the interface structure 5 may protrude in any direction, downwards, upwards, sideways, etc., and the first dimension D1, d1 may be the corresponding direction.

The illustrated interface structure 5 projects outwards with respect to the outer wall 13 of the container 3 along a direction of the first dimension D1, d1 so that a total first dimension D1+d1 of the supply apparatus 1 can be approximately the sum of the two first dimensions D1, d1 of the container 3 and the interface structure 5. The first dimension D1 of the container 3 may be the distance between opposite walls along that first dimension D1. The first dimension d1 of the interface structure 5 may be the distance between opposite sides of the projecting portion of the interface structure 5 along said first dimensions d1. In certain examples, the interface structure 5 is of relatively low profile with multiple interface components extending within the relatively low profile. The first interface dimension d1 may be less than half of the first container dimension D1, or less than a third, fourth, fifth, or sixth of the first container dimension D1.

The interface structure 5 includes a liquid throughput 11 to fluidically connect the container to the receiving station. The liquid throughput 11 further includes a liquid channel 17 fluidically connecting the inner volume of the container 3 with the receiving station 7 in installed condition. The liquid channel 17 includes a liquid interface 15 to fluidically interface with a counterpart liquid input interface of the receiving station 7, embodied by a fluid needle 9 in the example of FIG. 1. In one example the liquid interface 15 includes a seal to receive, and seal to, the fluid needle 9. The liquid channel 17 may be defined by at least one liquid channel wall, for example a cylindrical or otherwise rounded channel wall that extends around and along at least one central axis C21 and/or C29. The liquid channel 17 may include a needle receiving channel portion 21 and a reservoir connecting channel portion 29, for example with a curved intermediate liquid channel portion 19 in between.

The needle receiving channel portion 21 extends along a needle insertion direction NI and a main liquid flow direction DL opposite to the needle insertion direction NI. Central axis C21 of the needle receiving channel portion 21, interface 15 and seal extend along a needle insertion direction NI and a main liquid flow direction DL opposite to the needle insertion direction NI. The central axis C21 of the needle receiving portion 21 may be relatively straight along the needle insertion direction NI to facilitate insertion of the needle 9. In the drawing, the central axis C21, main liquid flow direction DL and needle insertion direction NI extend in a line.

The reservoir connecting liquid channel portion 29 may extend approximately parallel to the first interface dimension d1, or to a projection direction of the interface structure 5, as indicated by the central axis C29 of the reservoir connecting liquid channel portion 29. The central axes C21, C29 of the needle receiving channel portion 21 and the reservoir connecting channel portion 29 extend at an angle with respect to each other, for example an approximately straight angle.

The liquid channel 17 may further include an intermediate channel portion 19 between the needle receiving and reservoir connecting channel portions 21, 29. The intermediate portion 19 may inflect the channel 17 between the needle receiving portion 21 and the reservoir connecting channel portion 29, for example in a curved fashion, to connect the liquid interface 15 to the inner volume of the container 3. The intermediate portion 19 may facilitate a curve and an offset between the needle receiving liquid channel portion 21 and the reservoir connecting liquid channel portion 29.

The liquid channel 17 and interface 15, including the seal 20 and needle receiving channel portion 21, are adapted to facilitate the illustrated main liquid flow direction DL out of the interface structure 5 and needle insertion direction NI into the interface structure 5. A main liquid flow direction DL of the needle receiving liquid channel portion 17 and the liquid interface 15 may extend straight out of the interface front 54, for example parallel to the second interface dimension d2 and/or second container dimension D2. The needle insertion direction NI may extend straight into the interface front 54, for example parallel to the second interface dimension d2 and/or second container dimension D2. It will be understood that, in a dismounted on-the-shelve condition of the supply apparatus 1 the main liquid flow direction DL and needle insertion direction NI can be defined by a central axis of the needle receiving liquid channel portion 21, which in turn may be defined by internal walls of the needle receiving liquid channel 21 and/or by a internal walls or a center channel inside the seal 20. In an example where there is a clearly definable central axis C21 of the needle receiving liquid channel 21 and/or liquid interface 15 including seal 20, that central axis C21 may define the main liquid flow direction DL and needle insertion direction NI. The main liquid flow direction DL may be relatively straight as determined by a central axis and/or internal liquid channel walls of the seal 20 and/or needle receiving liquid channel portion 21 to facilitate straight entry of a corresponding fluid needle 9 along the respective second dimensions D2, d2.

The main liquid flow direction DL represents the course along which the liquid is to flow between from the container 3 to the receiving station, to print. In one example the liquid flows in one direction only, out of the liquid interface 15 to the receiving station 7, at least most of the time. In other examples, the needle 9 and liquid channel 17 may be suitable for bi-directional flow, for example due to pressure fluctuations in the print system liquid circuit or for mixing/recirculating liquid in the container 3. In fact, in some examples two liquid interfaces may be provided in the same supply apparatus, to interface with two corresponding fluid needles of a single receiving station to mix/recirculate the liquid in the container and/or print system liquid channels. An additional dotted circle is illustrated in FIG. 2, next to the liquid interface 15, to illustrate this possibility. Hence, in this disclosure a main liquid flow direction DL refers to the liquid flowing out of the supply apparatus 1 to be able to print using that liquid, even if the flow in the liquid channel 17 may during certain time instances be in the opposite direction, either in the same liquid channel or in separate liquid channels.

In the illustrated example, a projecting portion 23 of the container 3 projects in a direction parallel to the main liquid flow direction DL surpassing the liquid interface 15 in the main liquid flow direction DL. Correspondingly, the projecting portion 23 projects in the second container dimension D2, whereby the second container dimension D2 may be larger than the second interface dimension d2. The projecting portion 23 contains liquid so that in filled condition the liquid may be held above, or next to, and beyond the liquid interface 15. In certain examples, more than one third or more than half of the second container dimensions D2 may project beyond the liquid interface 15 in the main liquid flow direction DL. This may facilitate that the container projecting portion 23 can be inserted head first into a receiving station 7 before a sealed and operational connection between the receiving station 7 and the interface structure 5 is established.

In certain examples, the extent PP to which the projecting portion 23 of the container 3 surpasses the liquid interface 15 may determine the reservoir volume of the container 3, whereby in a plurality of supply apparatuses 1 that have different volumes that connect to the same receiving station, the first and third dimensions d1, D1, d3, D3 are the same but the second container dimension may vary. A relatively large liquid volume reservoir of the container 3 may be associated with a longer projecting portion 23.

Some of these features may facilitate readily connecting a liquid volume size of choice to a receiving station 7. By a ready push against a back 25 of the container 3, in an insertion direction I parallel to the main liquid flow direction DL, the supply apparatus 1 can be pushed into a fluidically connected state with the receiving station 7. In addition, a manufacturer can adapt the inner volume of the container 3 by scaling the projecting portion 23 while the ease of insertion of the supply apparatus 1 is the same because the back 25 and interface structure 5 are positioned the same between these different volumes. In certain examples, the projecting portion 23 protrudes into the receiving station 7 so that the back of the supply apparatus 1 does not protrude from the receiving station 7, thereby preventing obstacles that operators could otherwise bump into. In the example of FIG. 1 a back 25 of the container 3 extends a small distance Bb further than a back 26 of the interface structure 5, as measured along the second container dimension D2. For example, such distance Bb may be between approximately 0 and 1 or between approximately 0 and 1 cm.

Where the projecting portion 23 projects beyond the liquid interface 15, for example where the liquid volume is more than 100 ml, the interface structure 5 may be fluidically connected to the container 3 offset from a middle M of the second container dimension D2 by an offset distance, for example of more than 5 mm or several cm (cm) depending on the liquid volume of the container 3. Herein, the middle M may be defined by a virtual reference plane that is parallel to the first and third container dimension D1, D3 and in the middle of the second container dimension D2. In the illustrated example, the middle M of the second container dimension D2 extends in the middle between a front 31 and back 25 of the container 3, and the reservoir connecting portion 29 of the liquid channel 17 connects to the internal reservoir volume of the container 3 behind the middle M, between the middle M and the back 25 of the container 3. As illustrated, the reservoir connecting portion 29 of the liquid channel 17 of the interface structure 5 is connected to a liquid output 30 of the container 3 to facilitate throughput of liquid from the container 3 through the interface structure 5. Correspondingly, the fluid connection between the container liquid output 30 and the reservoir connecting portion 29 of the liquid channel 17 is provided between the middle plane M and the back 25 of the container 3.

Figure 3:
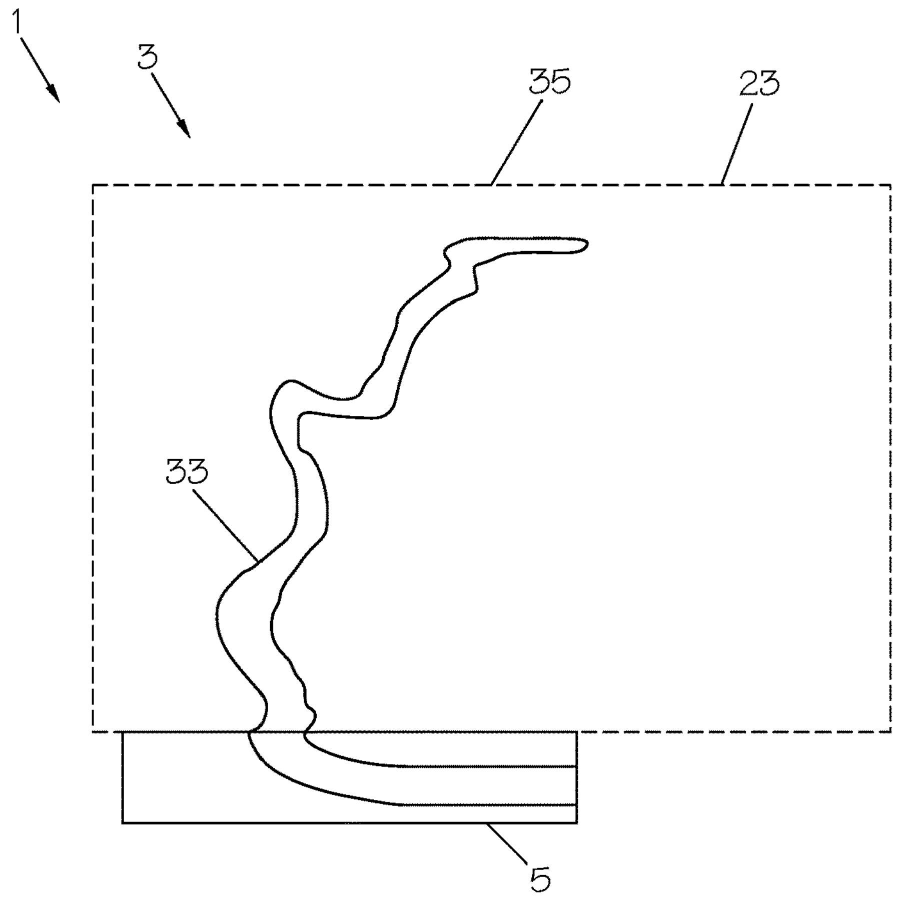
FIG. 3 illustrates a diagram of a side view of a portion of an example print liquid supply apparatus.

FIG. 3 illustrates a diagram of a side view of an example of a print liquid supply apparatus 1 wherein the container 3 includes a bag-in-box type structure. In the illustrated state, a reservoir 33 is illustrated that is substantially empty and collapsed. The reservoir 33 has air and vapor barrier walls to inhibit vapor exiting and air entering the reservoir 33. In the illustrated state, most or all liquid has been withdrawn from the reservoir 33 that has collapsed accordingly, in a relatively random fashion. In the illustrated example the reservoir 33 is a substantially completely flexible bag but in other examples the reservoir could have some rigid portions. The reservoir 33 may be rigid near the output 30 to facilitate connection with the interface structure 5.

In an example the container 3 further includes a support structure 35 at least partially around the reservoir 33, for example to support and protect the reservoir 33. The support structure 35 may also to facilitate relatively rough guiding of the supply apparatus 1 into the receiving station 7. In again other examples, the support structure 35 may facilitate stacking, storage, and presentation of usage, brand and contents information. In a filled state the reservoir 33 may occupy most of the inner volume of the support structure 35. For example, the outer volume of the reservoir 33 in a filled state may be more than 60%, more than 70%, more than 80% or more than 90% of the inner volume of the support structure 35. For example, the same reservoir 33 having a predefined volume capacity may be used for different support structures 35 of different volumes. For example, the reservoirs 33 may be filled partly or completely depending on the inner volume of the support structure 35. For example, the reservoir 33 can be filled with less than 90%, less than 80%, less than 70%, less than 60%, less than 50%, less than 40% or even lower percentages of its maximum volume capacity. For example, while a reservoir 33 may have a maximum capacity of 2 L, that same 2 L reservoir may be only partially filled and seated in a support structure 35 having a maximum capacity of less than 2 L, such as 500 ml or 1 L, whereby a supply apparatus 1 of 500 ml or a supply apparatus 1 of 1 L is provided, respectively.

Figure 4:
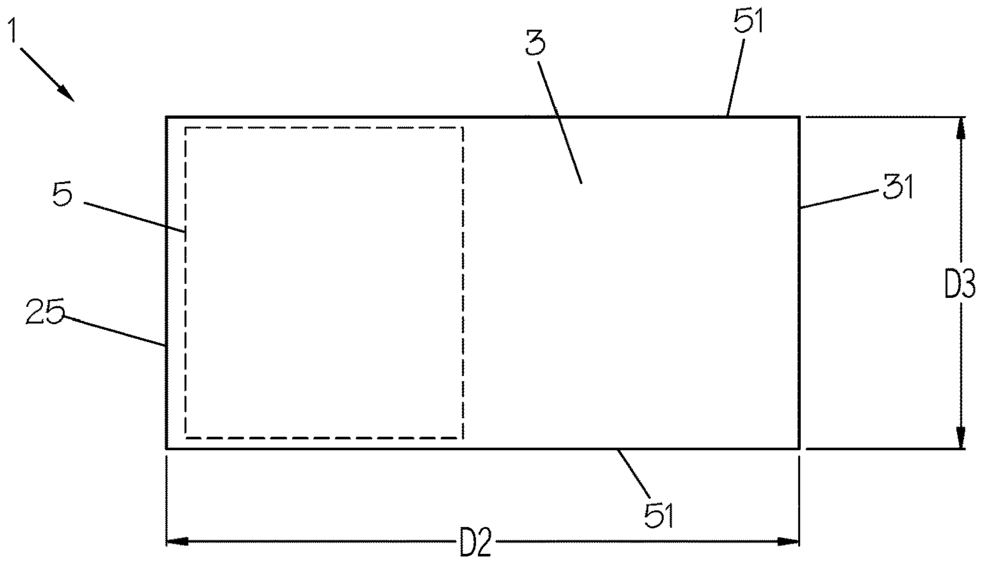
FIG. 4 illustrates a diagram of a top view of a similar example of a liquid supply apparatus.

As can be seen from FIG. 4, which is diagrammatic top view on an example supply apparatus 1 along the first container dimension D1 and interface structure projection direction, the interface structure 5 and its interface components may extend within an area or contour defined by an outer volume of the container 3, for example as defined by the outer walls 25, 31, 51. The illustrated outer walls 25, 31, 51 extend approximately parallel to the first container dimension D1, in the illustrated filled state of the container 3. In the illustrated example, the second and third interface dimension d2, d3 are less than the corresponding second and third container dimension D2, D3, whereby the second and third container dimension D2, D3 overlap the second and third interface dimension d2, d3 as seen in directions perpendicular to the respective second and third dimensions.

In an example the support structure 35 may be made of carton or other suitable material, such as for example other cellulose based material or plastics. In certain examples, the support structure material include corrugated cardboard and/or fiberboard. The support structure 35 may be relatively rigid as compared to the at least partially collapsible reservoir 33, for example to provide support, protection and stack-ability to the reservoir 33. The interface structure 5 is relatively rigid to facilitate relatively precise guiding with respect to the receiving station 7, for example, more rigid than the support structure 35. The interface structure 5 may include relatively rigid molded plastics. In one example liquid flow components of the reservoir 33 and interface structure 5 are relatively fluid impermeable, that is liquid, vapor and air impermeable, as compared to the support structure 35. The impermeability of the interface structure 5 facilitates its capping function. The supply apparatus 1 may be opened by opening, removing, rupturing, etc., the seal of the interface structure.

In an example, the interface structure 5 includes at least one straight guide surface 41, 43 to slide the interface structure 5 along corresponding receiving station surfaces to facilitate installation of the container 3 in the receiving station 7, as illustrated by FIGS. 1 and 2. The at least one straight guide surface 41, 43 may be elongate in the direction of, and extend approximately parallel to, the second dimension D2, d2 of the interface structure 5 and the container 3. The at least one straight guide surface 41, 43 may comprise opposite lateral guide surfaces 41 at external lateral sides or side walls 39, each lateral guide surface extending approximately parallel to the first and second interface dimension d1, d2. The at least one straight guide surface 41, 43 may comprise an intermediate guide surface 43 at a distal side 37, the intermediate guide surface extending opposite to the side 13 of the container 3 from which the interface structure 5 projects, and between the lateral sides 39. In the illustrated example, the distal side 37 defines a bottom of the interface structure 5. The intermediate guide surface 43 may be approximately parallel to the second and third interface dimension d2, d3.

The lateral and intermediate guide surfaces 41, 43 may be relatively flat. The lateral and intermediate guide surfaces 41, 43 may be relatively elongate along the direction of the second interface dimension d2, along at least a portion of the interface structure 5, at least sufficiently elongate to facilitate confining the movement of the supply apparatus to the second interface dimension d2 and positioning the liquid interface 15. The guide surfaces 41, 43 of the interface structure 41, 43 may be defined by relatively flat, flush and elongate outer surfaces of the interface structure 5 to facilitate sliding in a direction along the second interface dimension d2 and positioning of the liquid interface 15 in respective direction along the first and third interface dimension d1, d3. In one example the third interface dimension d3 extends between the external lateral guide surfaces 41. In one example, the second interface dimension d2 may be defined by the length of the intermediate guide surface 43 from the front to the back of the interface structure 5.

In this example, the lateral guide surfaces 41 are adapted to (i) guide the liquid interface 15 in a direction along the second interface dimension d2 and the main liquid flow direction DL, and (ii) facilitate positioning of the liquid interface 15 along an axis parallel to the third interface dimension d3 by limiting the degree of freedom of the interface structure 5 in the receiving station 7 in the opposite directions parallel to the third interface dimension d3. The intermediate guide surface 43 is adapted to (i) guide the liquid interface 15 in a direction along the second interface dimensions d2 and the main liquid flow direction DL, and (ii) to facilitate positioning of the liquid interface 15 along an axis parallel to the first interface dimension d1 by limiting the degree of freedom of the interface structure 5 in the receiving station 7 in at least one direction of the first interface dimension d1. In the example where during installation the interface structure 5 projects downwards from the bottom 13 the intermediate guide surface 43 may include a horizontal surface to facilitate vertical positioning of the liquid interface 15 with respect to the liquid input interface of the receiving station 7, by sliding over a corresponding horizontal bottom guide surface of the receiving station. To that end the intermediate guide surface 43 may extend at a predetermined distance from a central axis CP21 of the needle receiving liquid channel portion 21. The intermediate guide surface 43 may span a substantial portion of the distal side 37 of the interface structure 5, along the second and third interface dimensions d2, d3, whereby the first interface dimension d1 may extend between the side 13 of the container 3 from which the interface structure 5 projects and the intermediate guide surface 43.

Figure 5:
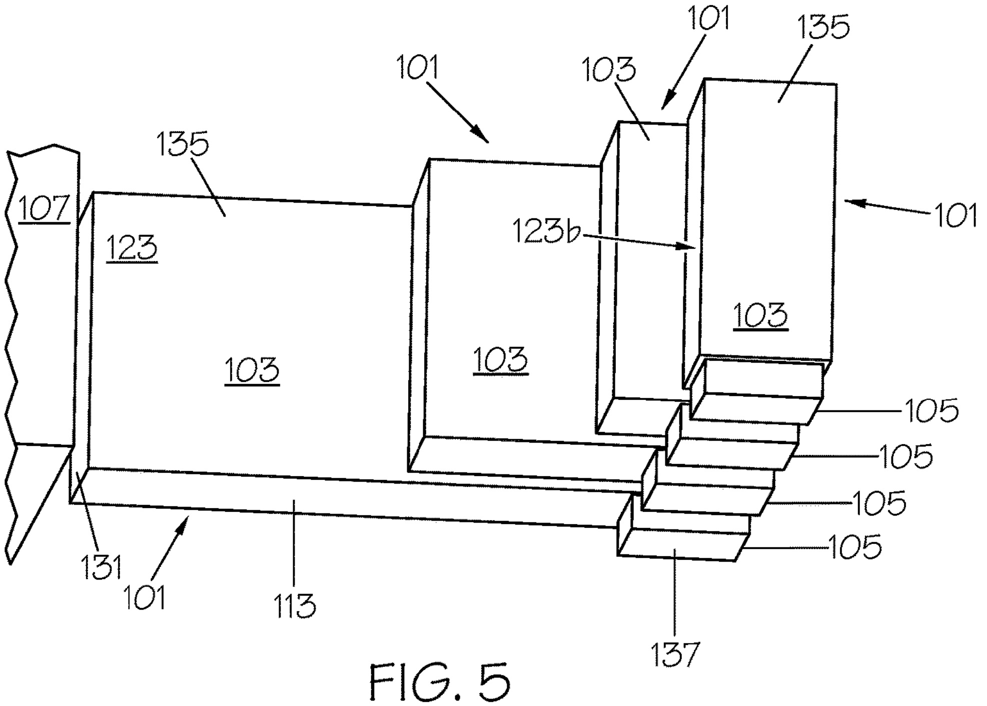
FIG. 5 illustrates a perspective view of a plurality of examples of liquid supply apparatuses and corresponding receiving stations.
Figure 6:
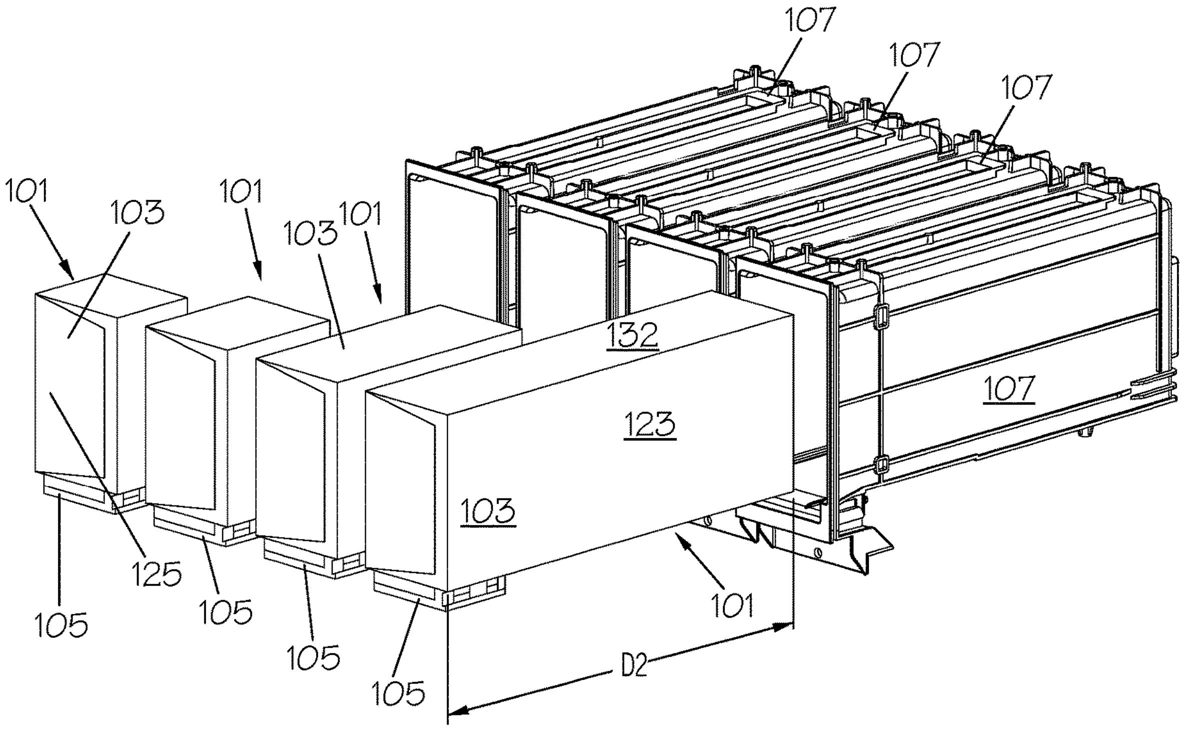
FIG. 6 illustrates another perspective view of a plurality of examples of liquid supply apparatuses and corresponding receiving stations.
Figure 7:
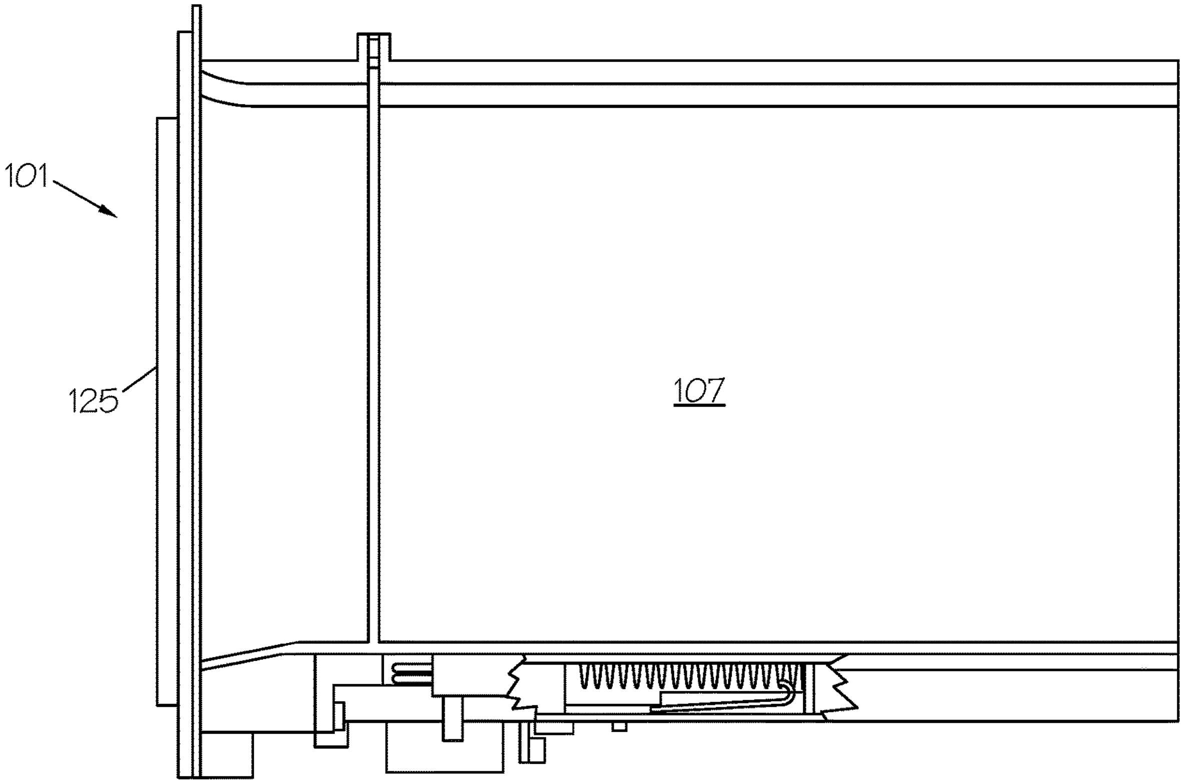
FIG. 7 illustrates a side view of an example of a receiving station having a liquid supply apparatus installed.
Figure 8:
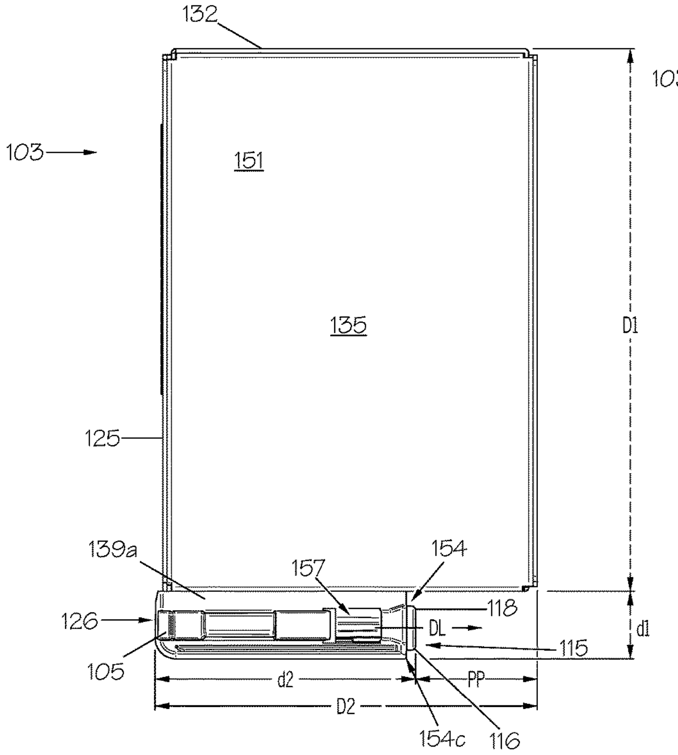
FIG. 8 illustrates a side view of an example of a liquid supply apparatus.
Figure 9:
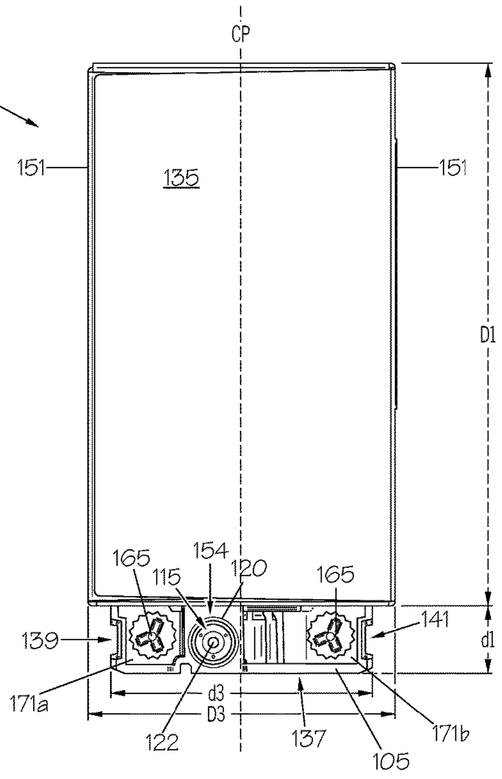
FIG. 9 illustrates a front view of the example liquid supply apparatus of FIG. 8.

FIGS. 5 and 6 illustrate perspective views of examples of sets of different volume print liquid supply apparatuses 101 and corresponding receiving stations 107. FIG. 7 illustrates any of these print supply apparatuses 101 installed in one of those receiving stations 107. FIGS. 8 and 9 illustrate a single, similar, example supply apparatus 101 in side and front view, respectively. Features, functions and definitions disclosed with reference to FIGS. 1-4 may similarly apply to the examples explained with reference to FIGS. 5-9.

In one example, the volumes of the four supply apparatuses 101 of FIGS. 5 and 6, from the smaller to the larger supply apparatuses 101, that is, from front to back in FIG. 5 and from left to right in FIG. 6, are 100, 200, 500 and 1000 ml, respectively. The interface structures 105 of the different illustrated supply apparatuses 101 have approximately the same dimensions d1, d2, d3 and some of the same interface components, except for certain differences such as for example key pen orientations and data stored on integrated circuits. The different volume supply apparatuses 101 have different container volumes, wherein the first and third container dimensions D1 and D3 are approximately the same, yet the second container dimensions D2 are different. Each container 103 is associated with a different liquid volume capacity and a different projecting length PP of the projecting portions 123. The illustrated example containers 103 include a box-shaped support structure 135 of folded carton or the like, and an inner collapsible reservoir. For example, the support structure 135 includes corrugated cardboard and/or fiberboard. Note that while the support structures 135 may provide for different volumes and second container dimensions D2, the reservoirs inside the support structures may be of the same design, as in having the same maximum capacity, but with different fill amounts, for example a fill amount approximately corresponding to the respective support structure volume.

In FIGS. 5 and 6, each interface structure 105 projects from the bottom 113 at an equal distance from the back 125 of the container 103, for example relatively close to the back 125. As illustrated in FIG. 8 a distance between a back 126 of the interface structure 105 and the back 125 of the container 103 along the second dimension D2, d2 of the container 103 and the interface structure 105, as defined by the distance between virtual reference planes over said backs 125, 126 parallel to the first and third dimension D1, d1, D3, d3, can be approximately 0 mm, or for example less than 1 cm. As illustrated in FIG. 8, the backs 125, 126 of the container 103 and the interface structure 105 could be approximately flush with respect to each other. In other examples the back 125 of the container 103 may extend further backwards than the back 126 of the interface structure 105 whereby the distance can be slightly larger than 0 mm, such as 1-5 mm, or substantially larger than 0 mm, such as greater than 1 cm, see for example the diagrammatic examples of FIGS. 44 and 45. In another, different example the back 126 of the interface structure 105 could protrude from the container back 125 whereby again there may be a distance between said backs 125, 126 greater than 0 mm but in the opposite direction as explained before.

Each different volume supply apparatus 101 of FIGS. 5 and 6 has a different container 103 with a different second container dimension D2, that is, a different length PP of the projecting portion 123 along the second container dimension D2, wherein the length PP of the projecting portion 123 may be defined by the extent in which the second container dimension D2 projects beyond an edge 116 of a liquid interface 115 and/or interface front 154, in the main liquid flow direction DL (FIG. 8).

The smaller supply volumes, for example of 100 ml or less such as the front supply apparatus 101 of FIG. 5 and the corresponding one in FIG. 6, may have a second container dimension D2 of similar length as the second interface dimension d2, or even less, where there is no or hardly any projecting portion 123 that projects beyond the interface edge 116, as indicated by reference number 123*b*. Hence, the projecting length PP of the container 103 may be zero or is relatively small. Larger volumes, for example greater than 100 ml as illustrated by the other supply apparatuses of FIG. 5 and the corresponding ones in FIG. 6, may have a second container dimension D2 that is greater than the second interface dimension d2. In certain examples, the second container dimension can be at least two times or at least three times the second interface dimension d2. In these examples the extent PP of the projecting portion 123 is greater than the second interface dimension d2. These different container volumes and projection extents PP may be associated with substantially the same interface structures 105 and substantially the same receiving stations 107. Also, the same reservoir bag capacity may be used for the different volumes and different support structures 135 but with different fill grades.

In a substantially horizontal orientation of the supply apparatus 101, the interface structure 105 may protrude from the bottom 113 of the box, near a back 125 of the box, and the box projects over the interface structure 105 towards the front, beyond a liquid interface 115 of the liquid output, whereby for the different examples the projection extent PP determines the maximum liquid volume capacity of the container 103.

The third interface dimension d3 may be defined by the distance between the external lateral sides 139, as defined by lateral side walls 139*a*, and the third container dimension D3 may be defined by the distance between outer surfaces of opposite lateral sides 151 of the container 103. In the illustrated examples, the width of the supply apparatuses 101 is determined by the third container dimension D3. The width is relatively small, providing for a relatively thin aspect ratio of the supply apparatuses 101, which in turn may facilitate a small foot print of the collection of receiving stations in a single printer, while being connectable to a relatively large supply volume range. In the illustrated examples, the third interface dimension d3 is slightly less than the third container dimension D3. For example, the third interface dimension d3 is approximately 80-100% of the third container dimension D3, for example approximately 85-100%, or for example approximately 90-100%. The third interface dimension d3 may be between approximately 30 and 52 mm, for example between approximately 48 and 50 mm. Correspondingly the third container dimension D3 may be greater such as between 30 and 65 mm, or between 45 mm and 63 mm, or between 50 and 63 mm. The third container dimension D3 could be varied depending on the internal width of the receiving station 107 and/or the pitch between adjacent receiving stations 107. In other examples the third container dimension D3 could be substantially larger than the third interface dimension d3 (see for example FIG. 46).

One example effect of the container 103 projecting in the main liquid flow direction DL, beyond the liquid interface 115, is that it facilitates consistent and relatively user-friendly mounting and unmounting of different supply apparatuses 101 of a relatively large range of volumes, including relatively large volumes. In the prior art, these large volume supplies can be relatively cumbersome to handle or install to the printer. In addition, printer OEMs sometimes have different supply designs to handle different liquid volumes for different platforms but in the present example, the supply apparatuses can be mounted and unmounted by a relatively simple push at the back 125, in the direction of the main liquid flow direction DL. As illustrated in FIG. 7, the back 125 may extend approximately in line with the receiving opening edge of the receiving station, again facilitating a ready push to the back 125 into the receiving station to mount and unmount the supply apparatus 101. Also, the liquid interface 115 is still relatively close to the back which may facilitate increased user control at installation, for positioning with respect to a liquid needle of the receiving station. Different, relatively long projection extents PP need not affect the robustness and ease of installation. In fact, in certain examples the projecting portion 123 may facilitate some pre-alignment of the supply apparatus 101 the receiving station 107.

The supply apparatus 101 of the present example allows for a first rough alignment to the receiving station 107 when placing the projecting portion 123 of the container 103 in the receiving station 107, and then a second, more precise alignment using the interface structure guide and/or key features, that may engage corresponding guide and/or key features of the receiving station, which will further align the liquid interfaces. Such stepped alignment may prevent damage to receiving station components such as the fluid needle, which could otherwise be easily damaged due to repetitive connection of heavy large volume supply apparatuses.

The extent of the projecting portion of the interface structure 105 is represented by the first interface dimension d1. In this example, the first interface dimension d1 may be measured between said the container side 113 from which the interface structure 5 projects and an external or distal side 137 of the interface structure 105, for example between proximal and distal front edges (e.g. respectively represented by 154*b* and 154*c* in FIG. 10) of the interface structure 105 at opposite sides of the liquid interface 115. In this example the external or distal side 137 is defined by a support wall 137*a* parallel to the second and third interface dimensions d2, d3 that also includes the intermediate guide slot 144.

The first interface dimension d1 can be at least six times smaller than the first container dimension D1. In the illustrated orientation this corresponds to a projecting height of the interface structure 105 being at least six times less than the height of the container 103. This provides for a relatively large liquid volume container 103 combined with a relatively low-profile interface structure 105, facilitating further volumetric efficiency, for example for on-the-shelf storage and transport, as well as for the print system with the supply apparatus installed. Also, a relatively small low-profile interface structure 105 may be more suitable for relatively smaller liquid volumes and relatively smaller printers. For example, the first container dimension D1 is at least 6 cm and the first interface dimension d1 of the projecting portion of the interface structure 105 is 20 mm or less. For example, the first container dimension D1 is at least 9 cm and the first interface dimension d1 is 15 mm or less. For example, the first container dimension D1 is at least approximately 9.5 cm and the first interface dimension d1 is approximately 13 mm or less.

For example, the profile height of the interface structure 105 may be the first interface dimension d1 and the distance over which the interface structure 105 projects from the respective container side 113, when assembled to the container 103. The low-profile height of the interface structure 105 may refer to a relatively small first dimension d1 of the interface structure 105 and the interface structure representing a relatively small projection from the container 103. The profile height may span several interface components including the needle receiving portion 121 (e.g. see FIG. 11) of the liquid channel 117, the liquid interface 105, the key pens 165, the integrated circuit 174, and the edge 154*b* of a front push area 154*a*. For example, also a secure feature 157 at an external lateral side of the respective key pen 165, that includes at least one of a clearance 159 and stop surface 163, may extend within the profile height, or first dimension d1, of the interface structure 105. The reservoir connecting liquid channel portion 129 may project outside of the profile height, into the container 103 when assembled to the container 103. There may be more projecting components of the interface structure 105 that project outside of the profile height, for example for attachment to the container, support to the receiving station, or for other purposes.

In an example the width (d3) of the interface structure 105 may be approximately 49 mm and the width (D3) of the container 103 may be approximately 58 mm. The height (d1) of the interface structure 105 may be approximately 12 mm and the height (D1) of the box may be approximately 10 cm. Hence, a total aspect ratio of the first dimensions D1+d1 and third dimensions D3 of the supply apparatus 101 may be 112:58, which could be rounded to approximately 2:1 or 11:6. The length (d2) of the interface structure, perpendicular to said height and width, may be approximately 43 mm, and the length (D2) of the box may be equal or more depending on said projection extent PP.

As said, example supply apparatuses 101 of this disclosure have a relatively thin aspect ratio. Hence, in one example the aspect ratio of the second container dimension D2 versus the third container dimension D3 is at least 1:2, at least 1:3 or at least 1:4, that is, the second container dimension D2 can be at least two, three or four times greater than the third container dimension D3 wherein the second container dimension D2 may correspond to a length and the third container dimension D3 may correspond to a width.

In one example an aspect ratio of the first dimension D1 versus the third dimension D3 of the container 103 is at least 3:2 or at least 5:3 or at least approximately 11:6. In a further example the aspect ratio of the total first dimension (or height) of the supply apparatus, which may be the sum of the first container dimension D1 and the first interface dimension d1, versus the third dimension D3 of the container 103 (or width of the supply apparatus) is at least approximately 2:1. In some of the larger volume supply apparatuses 101 with a similar thin aspect ratio the container 103 may have a relatively long shape whereby the aspect ratio of the first container dimension D1 versus the second container dimension D2 is 1:1 or less, or 2:3 or less, 1:2 or less, or 1:3 or less, whereby smaller ratios refer to smaller first dimensions D1 relative to greater second dimensions D2.

As illustrated in FIGS. 8 and 9 the interface structure 105 may project from a side 113 in a direction parallel to the first dimension D1 of the container 103 wherein the interface dimensions d2, d3 are smaller than the container dimensions D2, D3 so that the interface structure 105 extends within a contour formed by the second and third container dimensions D2, D3, similar to the example of FIG. 4.

The liquid output of the interface structure 105 includes a liquid channel 117. The liquid channel includes a liquid interface 115. The liquid interface 115 is provided at the downstream end of the liquid channel 117 along a main direction of flow. In FIG. 9 a center plane CP of the container 103 and interface structure 105 is illustrated, that may serve as a virtual reference plane. The center plane CP may extend approximately through a middle of the third dimension D3, d3 of the container 103 and/or interface structure 105. The center plane CP extends parallel to the first and second dimensions D1, d1, D2, d2, of the container 103 and interface structure 105, whereby the liquid interface 115 is laterally offset from the center plane CP of the interface structure 105 in one direction along the third interface dimension d3. Integrated circuit contact pads 175 are laterally offset from the center plane CP in the other direction along the third interface dimension d3, which is the opposite side of the center plane CP with respect to the liquid interface 115. Note that, in other examples a plane parallel to the first and second dimensions D1, d1, D2, d2, and between the liquid interface 115 and contact pad array 175, need not be exactly through the center of the supply apparatus.

In an example, a first recess 171*a* is provided laterally next to the needle receiving liquid channel portion 121 and houses a key pen 165, and a second recess 171*b* is provided at the other lateral side of the needle receiving liquid channel portion 121 and houses another key pen 165 and the integrated circuit contact pads 175. The recesses 171*a*, 171*b* may have entrances at each lateral side of the liquid interface 115 and interface structure front surface 154, whereby the front surface 154 may be part of a liquid channel block extending between the recesses 171*a*, 171*b*, through which the liquid channel 117 extends. The recesses 171*a*, 171*b* have a depth along the container side 113 from which the interface structure 105 projects. The key pens 165 protrude parallel to the second interface dimension d2.

Figure 10:
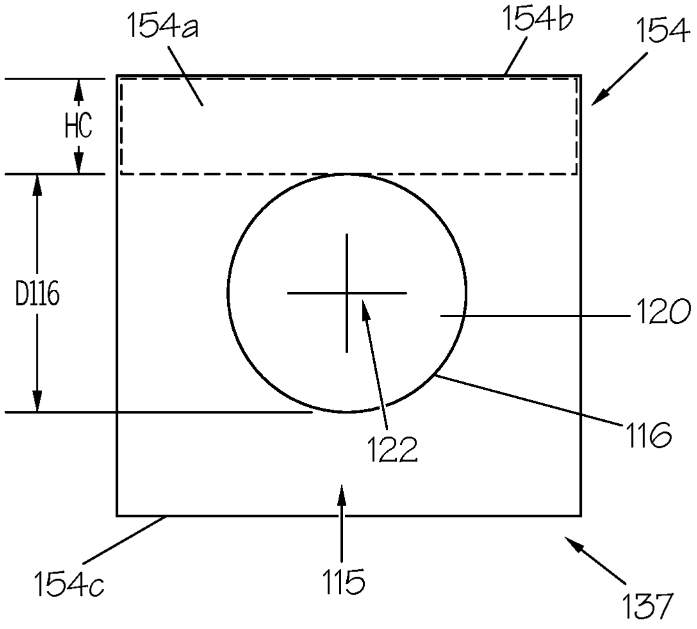
FIG. 10 illustrates a diagram of an example of a front push area and liquid interface of an interface structure.
Figure 11:
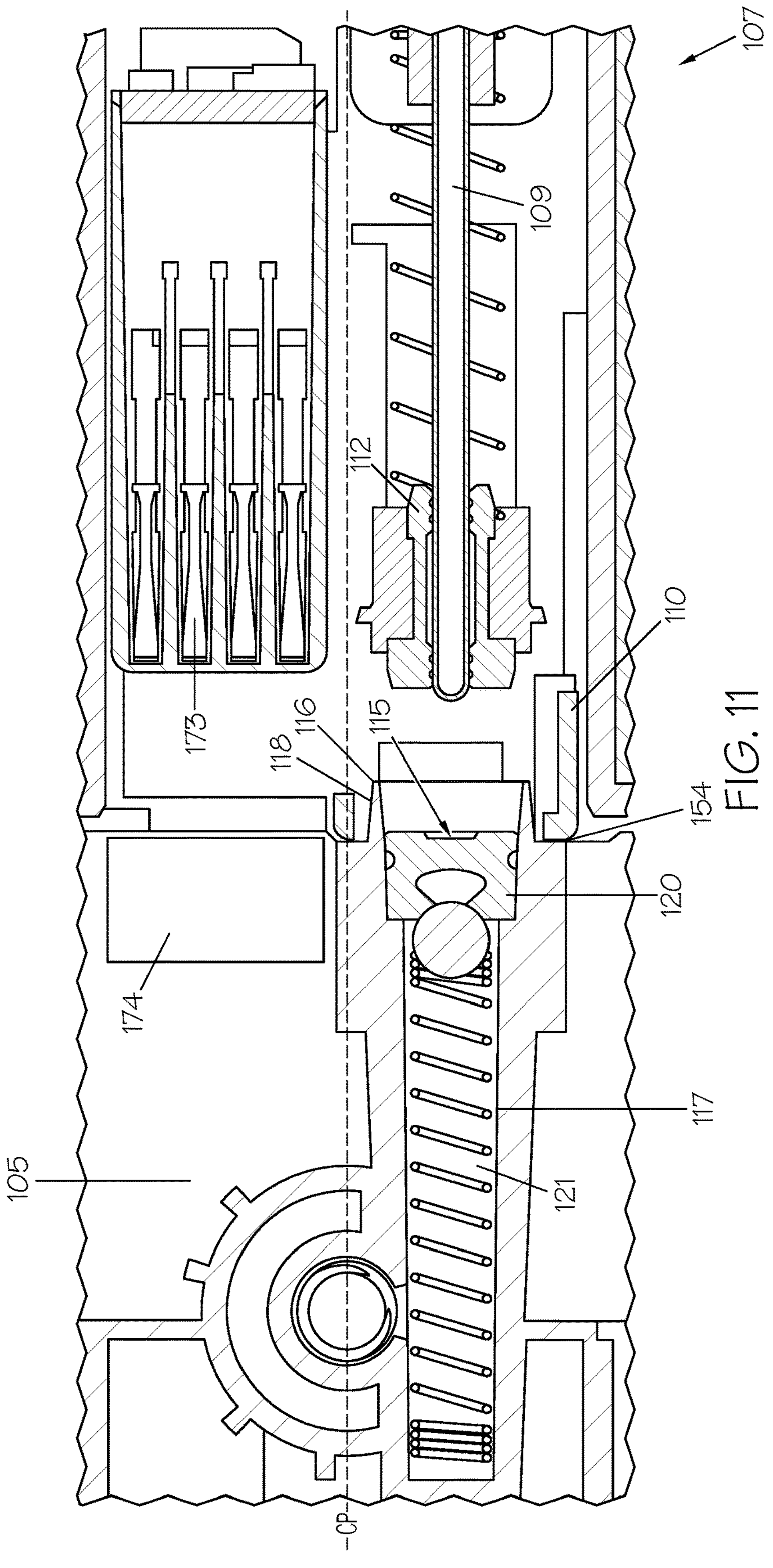
FIG. 11 illustrates a cross sectional top view on an example of an interface structure and receiving station, before or after fluidic connection.
Figure 12:
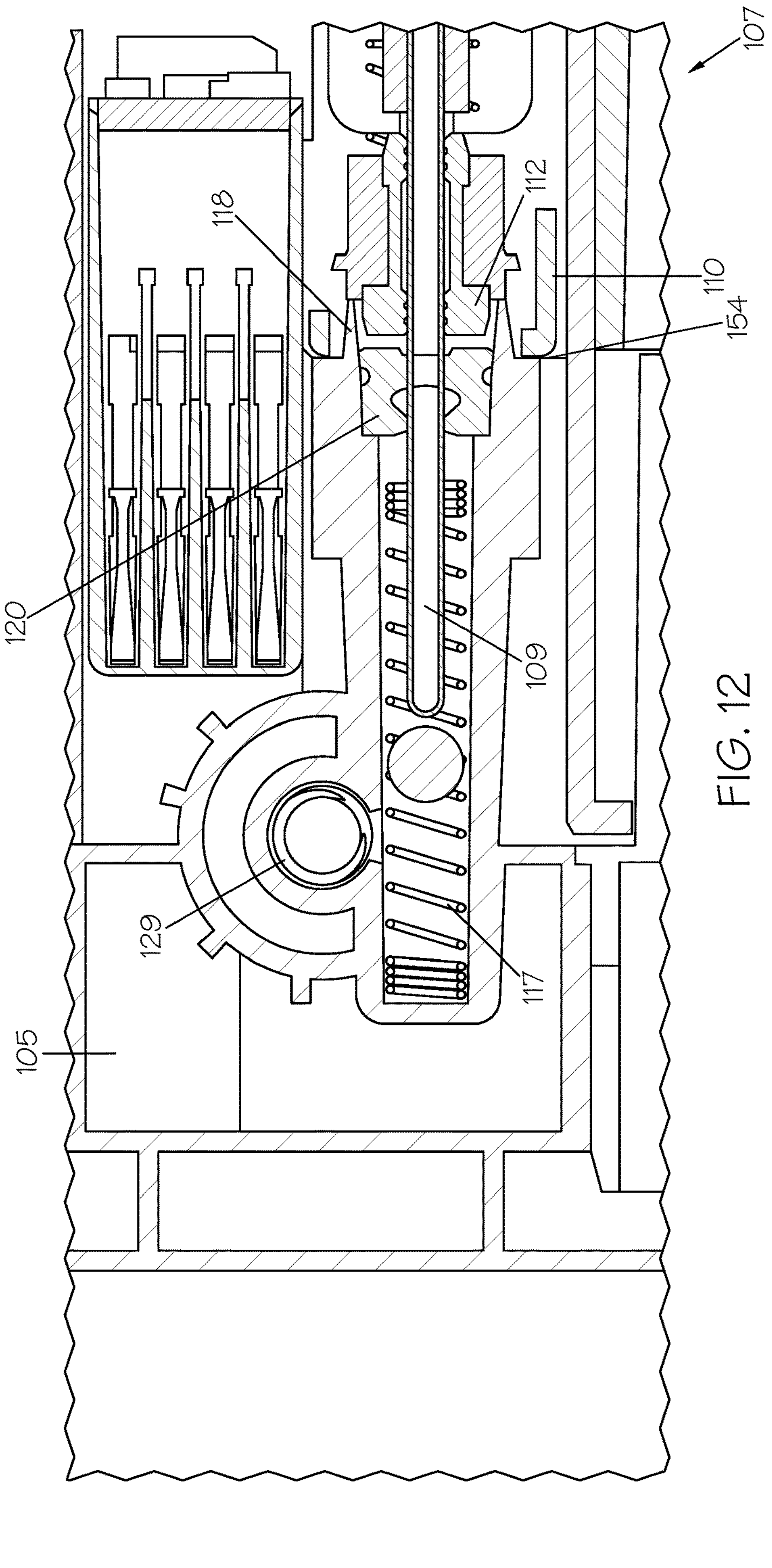
FIG. 12 illustrates a cross sectional top view on an example of an interface structure and receiving station, during fluidic connection.

FIGS. 10, 11 and 12 illustrate interface components of the interface structure according to certain examples. FIG. 10 is a diagrammatic amplification of an example liquid interface 115 and a front push area 154*b* of an interface structure front 154 as also illustrated in FIG. 9, and FIGS. 11 and 12 illustrate cross sectional top views of portions of the interface structure 105 and receiving station 107, in a disconnected and connected stage of interface components, respectively.

In an example the liquid interface 115 includes a seal 120 to seal the channel 117 around a fluid needle at insertion. The seal 120 may be of elastomer material. The seal 120 may include a central internal channel along its central axis and along the needle insertion direction NI, through which the needle protrudes in installed condition. The seal 120 can be a plug to be plugged into internal walls of the liquid interface 115 and needle receiving liquid channel portion 121, to extend along a length of the interface 115 and channel portion 121. The seal 120 may sit in a cylindrical or round fitting in an interface front 154 of the interface structure 105. The seal 120 may be sealed with respect to the liquid channel 117 and interface edge 116 by swaging. For example, during manufacture, a seal plug or other seal 120 is inserted into the liquid channel 117 after which a protruding ridge 118 of the edge 116 is pushed into a mushroom-like profile by an ultrasonically vibrating tool. The inner edge of the lip of the profile then retains the seal 120 and may also provide pressure to the seal 120 to obtain sufficient fluid tightness. In addition, or instead, adhesive and/or welding may be applied for establishing a proper seal structure in the interface structure 105.

The seal 120 may include a breakable membrane 122 at its center, for example downstream of its central internal channel, that is configured to open when a needle is inserted for the first time. The needle may pierce the membrane 122 at insertion. The needle receiving liquid channel portion 121, seal 120, membrane 122, and edge 116 may be centered around a single central axis, which for the purpose of illustration can be indicated in FIG. 8 by main liquid flow direction DL. The depth of the seal 120 extends along that central axis and the seal 120 is adapted to seal to the inserted needle, along said central axis. In certain instances, the seal 120 may, in use, push a humidor 112 of the fluid needle. The seal 120 and membrane 122 inhibit fluid/vapor transfer to seal the container 103 during transport or on the shelf life of the supply apparatus 101, as well as seal to the needle during needle insertion. Instead of a pierceable membrane 122, the seal 120 could also include any suitable plug, label, membrane or film or the like, adhered, welded, attached or integrally molded to the seal 120, for example for tearing, removing or piercing, that covers the internal channel of the seal 120 at the downstream end for sealing the container and liquid channel before usage. A separate lid or plug could be provided, or other measures, to seal the liquid channel 117 during transport and storage.

In this example, an edge 116 of the liquid interface 115 extends around the seal 120. The seal 120 is inserted in the liquid interface 115 and needle receiving channel portion 121 of the liquid channel 117. The seal 120 may partly lie against said edge 116. The edge 116 may be round and extend around a central axis of a similarly round needle receiving channel portion 121 and seal 120. The edge 116 may be part of the front 154 of the interface structure adjacent and around the liquid interface 115. In one example the edge 116 may be flush with the rest of the front 154 while in other examples the edge 116 may include a protruding ridge 118, before or after manufacture. In the example illustrated in FIGS. 9-12, the ridge 118 represents a state before swaging wherein the ridge 118 protrudes sufficiently to be swaged against and/or around the seal 120, whereby the ridge 118 relatively flatter after said swaging, which is not illustrated in this drawing.

The interface front 154 and/or edge 116 may form an extreme of the second interface dimension d2. Front edges of walls 139*a*, 137*a* that define the respective lateral sides 139 and/or distal side 137 may extend at the same level as the interface front 154, forming a circumferential interface front edge, that may serve as respective entrances to the recesses 171*a*, 171*b*. The interface front 154, adjacent and/or partially around the interface edge 116 may, in use, push against a protective structure 110 of the needle. In different examples a protective structure of the needle may include a shutter, plate, sleeve, sled or the like.

The illustrated example protective structure 110 includes a plate or sleeve to protect the fluid needle against mechanical damage, and may be retracted with respect to the needle by a pushing force of the interface front 154 against the protective structure when inserting the supply apparatus 101. In the illustrated example the protective structure 110 that protects the needle is separate from the humidor 112 whereby the protective structure 110 may be moved by the interface front 154, for example a push area 154*a* of the front 154, and the humidor 112 can be moved separately by the protective structure 110 and/or the interface 115. The humidor 112 may be adapted to keep the liquid needle wet and/or avoid leaking. In other example receiving stations the protective structure 110 and humidor 112 could be moved together as a single connected structure. In again other example receiving stations only one of a protective structure 110 and humidor 112 is provided. The front push area 154*a* can be used to push against the humidor 112 in addition to, or instead of the protective structure 110, to release the needle 109.

In the illustrated example, the interface front 154 extends between the recesses 171*a*, 171*b*. A distal edge 154*c* of the front extends further out towards the lateral sides to define the entrance of the recesses 171*a*, 171*b*, between the interface front 154 and the lateral sides 139. The interface front 154 extends at least partially around, and adjacent to, the liquid interface 115. The interface front 154 may be a straight surface at an approximately straight angle with the main liquid flow direction DL, parallel to the first and third interface dimension d1, d3.

The interface front 154 includes a push area 154*a*, which may be defined by a wall portion located between the liquid interface edge 116 and the container 103, at least when the interface structure 105 is assembled to the container 103. The wall portion that defines the front push area 154*a* may be part of a structure that is integrally molded with the liquid channel wall 117*b*, that protrudes from the support wall 137*a* with the recesses 171*a*, 171*b* on either side (e.g. see FIG. 26). The push area 154*a* includes and terminates on an outer edge 154*b* of the front 154 of the interface structure 105, that in the illustrated example terminates on the container side 113. The push area 154*a* is adapted to force the protective structure 110 backwards during insertion and/or in installed condition. The push area 154*a* may extend at least partially between the liquid interface edge 116 and the container 103. In certain examples indents, channels or recesses could be provided between the liquid interface edge 116 and the push area edge 154*b*, into the front 154, whereby the push area 154*a* may consist of only the edge 154*b*, which may be sufficient to serve as the push area to abut the protective structure 110 (e.g. see FIG. 48).

The interface structure 105 may be of relatively low profile. Hence, in one example a height HC of the push area 154*a*, along the first interface dimension d1, wherein said height HC represents a smallest distance between the liquid interface edge 116 and the container 103 or interface front edge 154*b*, is less than the inner diameter D116 of the liquid interface edge 116, or less than the outer diameter of the seal 120 when plugged into the outlet interface 115, for example the height HC is less than half of one of said diameters D116. Said inner and outer diameter may be the same so that any one or both of these diameters could serve as a reference to indicate the relatively small height of the push area 154*a* and in turn, the relatively low-profile height of the interface structure 105. For clarity, the liquid interface edge 116 may be defined by the transition between (i) plastic walls of the needle receiving portion 121 of the liquid channel 117 and (ii) the surface of the interface front 154. In some examples it may be difficult to determine what is exactly the liquid interface edge 116 because that edge may be rounded. In such examples the outer diameter of a plugged portion of the seal 120 in plugged condition, at a point near the interface front 154 but within the liquid channel 117, may be used. For example, said height HC of the push area 154*a* between said edges 116, 154*b* is equal to or less than approximately 6 mm, equal to or less than approximately 5 mm, equal to or less than approximately 4 mm, or equal to or less than approximately 3 mm. For example, in a relative sense, the height HC of the interface front push area 154*a* may be less than half of the diameter of said liquid outlet interface edge 116. A relatively small interface front push area 154*a* may be sufficient to move the protective structure with respect to the needle, while still facilitating a relatively low-profile interface structure. For example, the push area 154*a* need not be a flat front wall but could instead comprise only an edge (e.g. front edge 154*b*) or rounded shape, sufficient to push the protective structure 110 to release the needle.

In the example of FIG. 11, the interface front 154 initiates pushing the protective structure 110 backwards with respect to the needle 109 to expose the needle 109 to facilitate insertion of the needle 109 into the liquid interface 115. For example, first the push area 154*a* of the interface front 154 pushes the protective structure 110, and then the protective structure 110 itself, or the front 154 or seal 120 pushes the humidor 112. The latter is illustrated in FIG. 12, wherein the interface structure 105 has moved in the direction of the liquid output DL as compared to the position of FIG. 11, whereby the protective structure 110 and humidor 112 have been moved backwards with respect to the needle 109 by the push area 154*a*, thereby extracting the needle 109. In FIG. 12, the needle 109 has pierced the seal membrane 122, and a fluidic connection between the liquid channel 117 and the needle 109 has been established.

In one example, the distal side 137 spans the extent of the third interface dimension d3. A support wall 137*a* of the interface structure 105 may define the distal side 137. The support wall 137*a* may be partly to guide and support the supply apparatus 101 in the receiving station, for example through its intermediate guide surfaces 143, 143*b*, 147, which may form part of the support wall 137*a*. A portion of the support wall 137*a* may support the integrated circuit 174. A relatively shallow cut out may be provided in the support wall 137*a* to seat the integrated circuit 174. For example, the shallow cut out may be less than 2 or less than 1 mm deep. The support wall 137*a* may have a distal front edge 154*c* opposite to the push area front edge 154*b*, along the third interface dimension d3, the first interface dimension d1 extending between these opposite front edges 154*b*, 154*c*.

The view of FIG. 11 exposes integrated circuit contact pads 175 laterally next to the liquid interface 115 and in a respective recess 171*b*. The pads 175 are arranged on a line parallel to the third interface dimension d3 and in a virtual reference plane parallel to the second and third interface dimension d2, d3. In an example, the contact pads 175 are arranged on one side of the center plane CP, while the liquid interface 115, or the center axis of the liquid interface 115, is arranged on the opposite side of the center plane CP. During connection, as illustrated by FIG. 12, a data connector 173 of the receiving station 107 passes into the recess 171*b* to connect to the integrated circuit contact pads 175.

Figure 13:
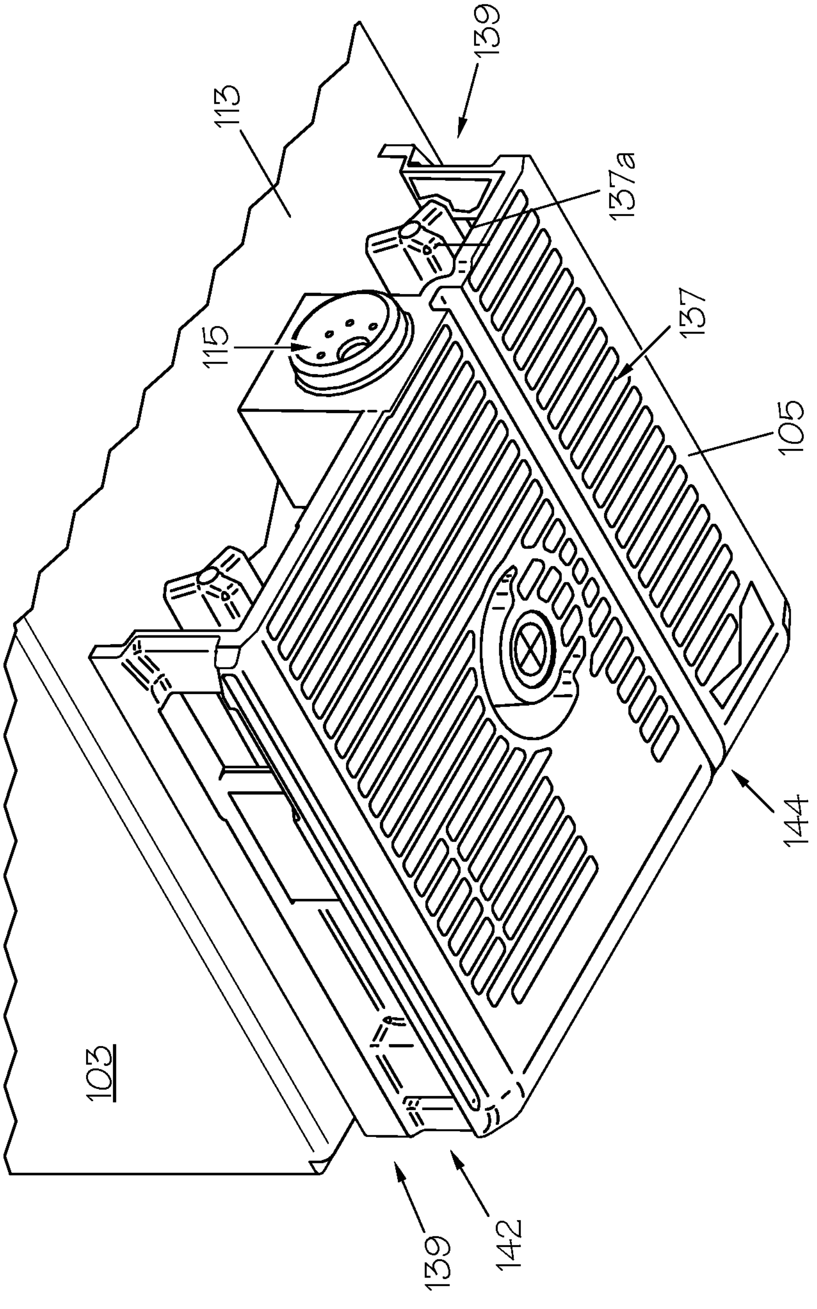
FIG. 13 illustrates a perspective view on an example of an interface structure projecting from a side of a container.
Figure 14:
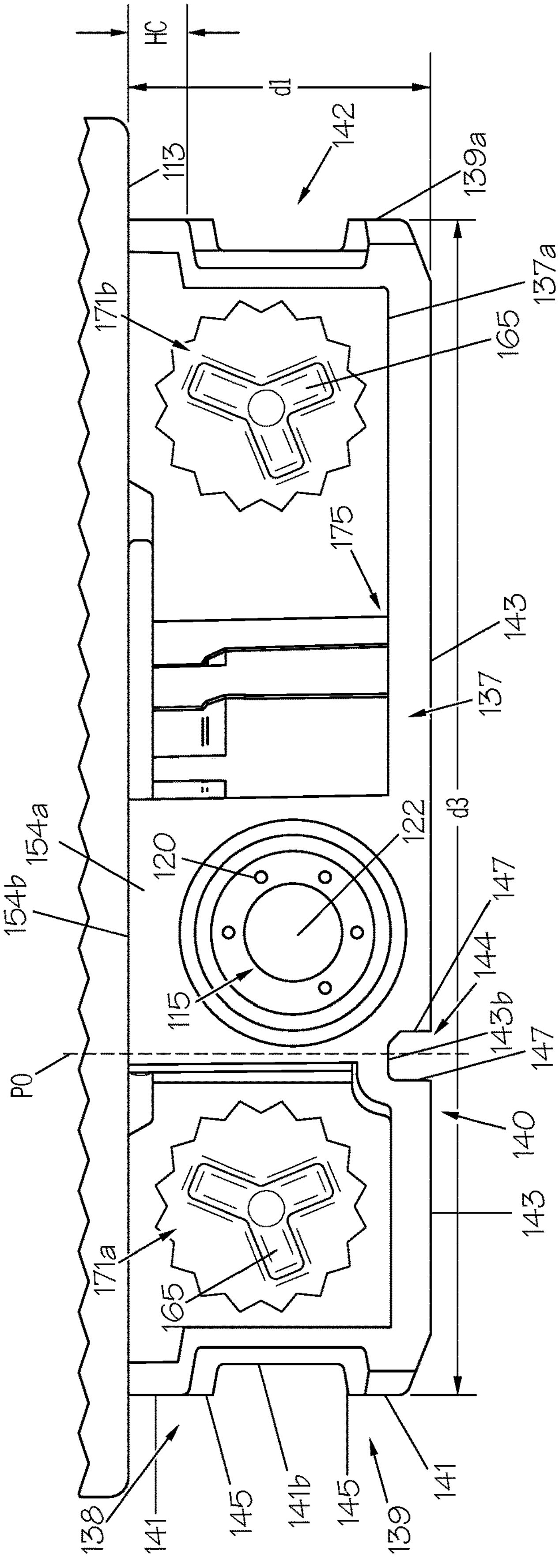
FIG. 14 illustrates a front view on an example of an interface structure.
Figure 15:
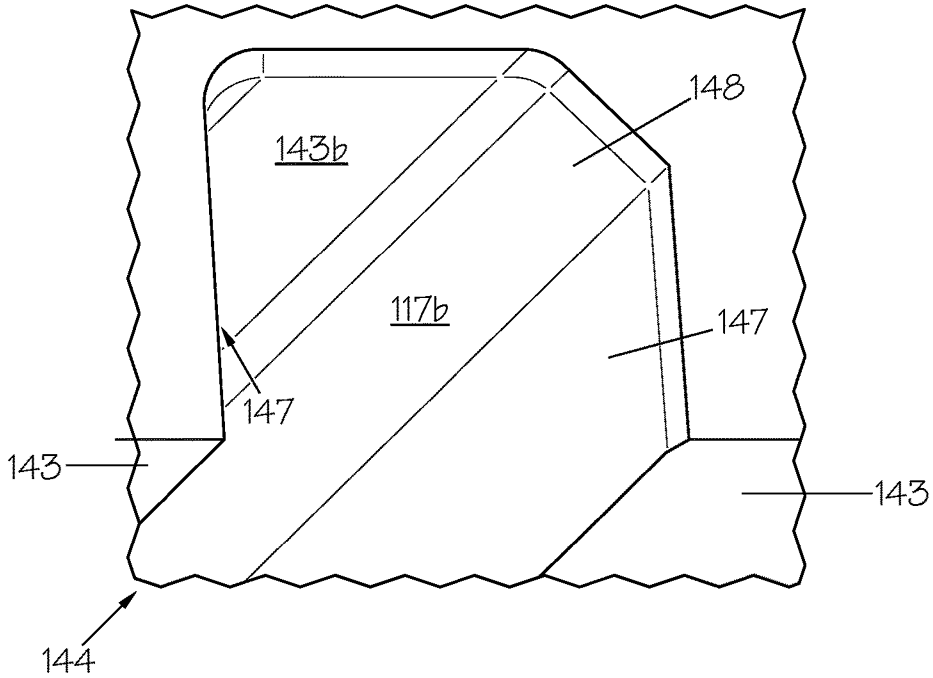
FIG. 15 illustrates a perspective, detailed view on an example guide slot of the interface structure of FIG. 14.
Figure 16:
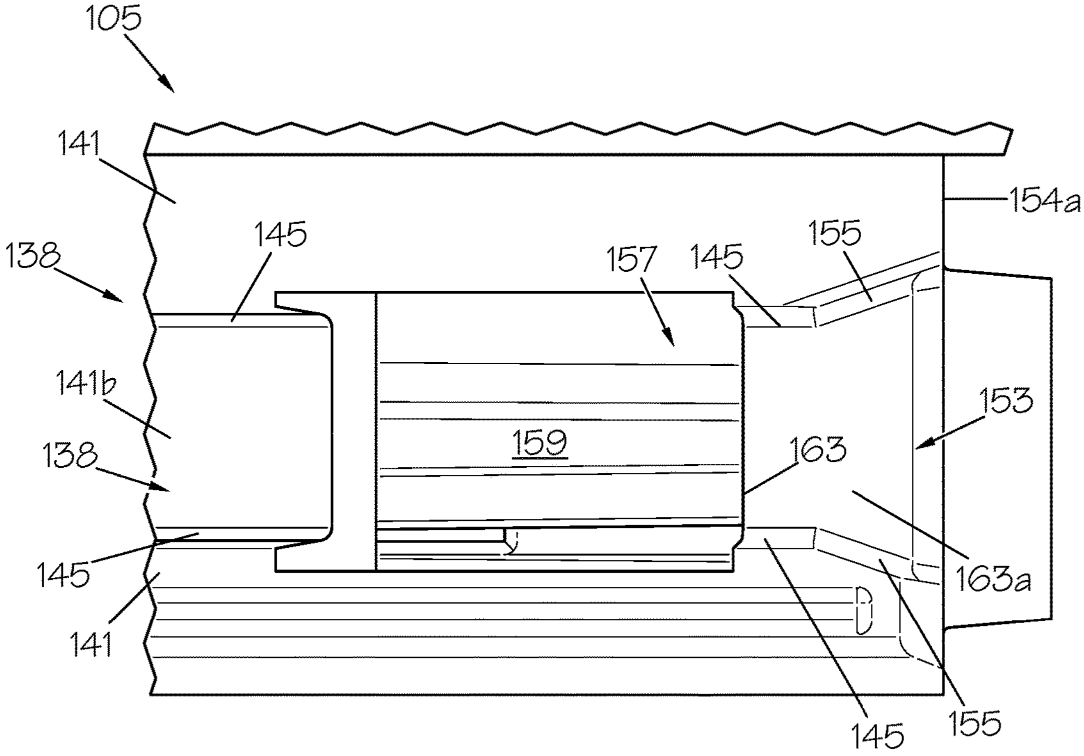
FIG. 16 illustrates a side view of a detail of the example interface structure of some of the previous figures.

FIGS. 13 and 14 illustrate an example of an interface structure 105 protruding from a respective container 103, in perspective and front view, respectively. The interface structure 105 may be the same as the interface structure 105 illustrated in one of FIGS. 5-12. FIG. 15 illustrates an example of a detail of an intermediate guide of the interface structure 105 of FIGS. 13 and 14. FIG. 16 illustrates and example of a detail of a lateral guide of the interface structure 105, near a front side of the interface structure 105, and a secure feature 157.

Figure 17:
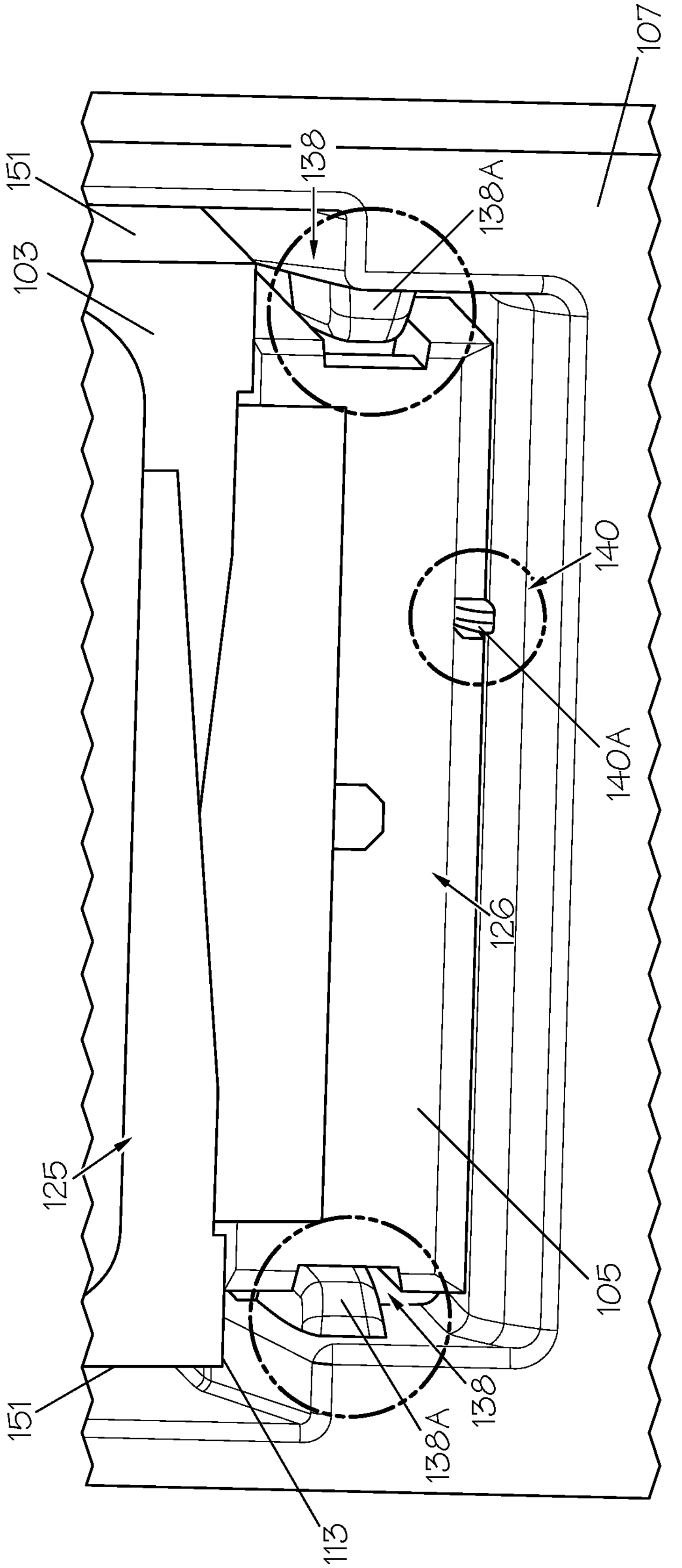
FIG. 17 illustrates a perspective view of an example of a liquid supply apparatus pushed into a receiving station.

In the examples illustrated in FIGS. 13-16, the interface structure 105 includes lateral guide features 138 at its external lateral sides 139 and intermediate guide features 140 at its distal side 137. FIG. 17 illustrates how the lateral and intermediate guide features 138, 140, respectively, may be connected to corresponding lateral and intermediate guide rails 138A, 140A, respectively, of the receiving station 107. FIG. 17 also illustrates how the container support wall 113 and outer lateral walls 151 may receive rough guidance from corresponding walls of the receiving station 107.

As can be seen from FIG. 13, the guide features 138, 140 may be relatively elongate, for example extending along at least 1, 2, 3 or 4 cm of the second interface dimension d2, for example at least 50% or at least 75% or most or all of the length of the second interface dimension d2. The guide features 138, 140 are to guide the interface structure 105 with respect to the receiving station, to align the fluidic interfaces. For example, the receiving station could include corresponding lateral guide rails 138A and/or an intermediate guide rail 140A (FIG. 17, 20). Note that, in other examples, key pens 165 could be used for guidance purposes instead of, or in addition to, at least one of the guide features 138, 140.

In the illustrated example, the lateral guide features 138 include first and second lateral guide surfaces 141, 141*b*, 145 at angles with respect each other. As will be explained, the first and second lateral guide surfaces 141, 141*b*, 145 define a lateral guide slot 142 in the side 139. The lateral side walls 139*a* may include at least one first lateral guide surface 141, 141*b* to facilitate positioning the liquid interface 115 with respect to a liquid needle of the receiving station in a direction parallel to the third interface dimension d3 and/or at least one second lateral guide surface 145 to facilitate positioning the liquid interface 115 with respect to the needle of the receiving station in a direction parallel to the first interface dimension d1. Accordingly, in an example where the supply apparatus 101 is installed approximately horizontally, the at least one first lateral guide surface 141, 141*b* may facilitate horizontal positioning of the liquid input 115 and the at least one second lateral guide surface 145 may facilitate vertical positioning.

The first lateral guide surfaces 141, 141*b* may extend approximately parallel to the first and second interface dimension d1, d2. The first lateral guide surfaces 141, 141*b* may be substantially flat in a plane approximately parallel to said first and second interface dimension d1, d2, wherein approximately parallel may for example include 10 degrees or less deviation from absolutely parallel. The first lateral guide surfaces 141, 141*b* may be elongate along the second interface dimension d2, that is, relatively long along the second interface dimension d2 and relatively short along the first interface dimension d1. Where during installation of the supply apparatus 101 the interface structure 105 projects downwards from the bottom 113, the first lateral guide surfaces 141, 141*b* may facilitate approximately horizontal positioning of the liquid interface 115 with respect to a liquid input of the receiving station.

A single lateral side wall 139 may have a plurality of first lateral guide surfaces 141, 141*b* at a plurality of levels along the third interface dimension d3. The lateral guide feature 138 may include two outer first lateral guide surfaces 141 and an inner first lateral guide surface 141*b* that is offset in an inwards direction along the third interface dimension d3 with respect to the outer first lateral guide surfaces 141. The inner first lateral guide surface 141*b* may extend between two outer first lateral guide surfaces 141. The inner and outer first lateral guide surfaces 141, 141*b* may span the first interface dimension d1, at least approximately. In certain examples only an inner first lateral guide surface 141*b* without the outer first lateral guide surfaces 141, or only one inner and one outer first lateral guide surface 141, 141*b* may be provided, which can be sufficient for positioning the liquid interface 115 along the first and/or third interface dimension d1, d3. In other examples only one first inner or outer lateral guide surface 141, 141*b* may be sufficient to serve the purpose of guiding and positioning, for example together with an intermediate guide feature 140. In yet other examples, only one of the lateral and intermediate guide features 138, 140 is provided.

In the illustrated orientation the support wall 137*a* defines the bottom of the interface structure 105. The support wall 137*a* may include an intermediate guide feature 140, for example adjacent the liquid interface 115. The intermediate guide feature 140 may include at least one first intermediate guide surface 143, 143*b*, to facilitate positioning the liquid interface 115 with respect to the liquid needle while limiting freedom of movement in a direction along the first interface dimension d1 and/or at least one second intermediate guide surface 147, to facilitate positioning the liquid interface with respect to the liquid needle while limiting freedom of movement in a direction along the third interface dimension d3. The at least one first intermediate guide surface 143, 143*b* may extend parallel to the second and third interface dimension d2, d3. The at least one second intermediate guide surface 147 may extend parallel to the first and second interface dimension d1, d2

In one example first intermediate guide surfaces 143, 143*b* include an inner intermediate guide surface 143*b*, which may extend inwards with respect to the outer surface of the distal side 137, and two outer intermediate guide surfaces 143 which may define the outer surface of the distal side 137. Hence, the first intermediate guide surfaces 143, 143*b* may extend over multiple levels along the first interface dimension d1. The inner first intermediate guide surface 143*b* is adapted to receive and slide over a counterpart guide of the receiving station. The inner first intermediate guide surface 143*b* may be flat along a plane approximately parallel to said second and third interface dimension d2, d3.

The inner first intermediate guide surface 143*b* may be relatively narrow and of elongate shape, that is, relatively long along the second interface dimension d2 and relatively short along the third interface dimension d3.

The inner first intermediate guide surface 143*b* may extend between two outer first intermediate guide surfaces 143. The inner first intermediate guide surface 143*b* may extend adjacent the liquid interface 115 to facilitate positioning of the interface 115 with respect to the needle 109. The inner and outer first intermediate guide surfaces 143, 143*b* may together span a substantial portion of the third interface dimension d3, at least approximately. In certain examples only an inner first intermediate guide surface 143*b*, without the outer first intermediate guide surfaces 143, or only one inner and one outer first lateral guide surface 143, 143*b* may be provided, which can be sufficient for positioning the liquid interface 115 along the first interface dimension d1.

Where during installation of the supply apparatus 101 the interface structure 105 projects downwards from the bottom 113, the first intermediate guide surface 143, 143*b* may facilitate vertical positioning of the liquid interface 115 with respect to the liquid input of the receiving station and the first lateral guide surfaces 141, 141*b* may facilitate horizontal positioning of the liquid interface 115.

In the illustrated example, the lateral side 139 further includes at least one second lateral guide surface 145 at at least one of the external lateral sides of the interface structure 105, for example a pair of opposite second lateral guide surfaces 145 at each lateral side, to limit the degree of freedom of the interface structure 105 in a direction along the first interface dimension d1. The second lateral guide surfaces 145 can be adjacent to and at an angle with the at least one first lateral guide surface 141, 141*b*. Said angle can be approximately straight but need not be exactly straight, for example to provide for lead in, manufacturing tolerance or other reasons whereby the angle between the first and second lateral guide surfaces 141, 145 could be between approximately 80 and 100 degrees. The at least one second lateral guide surface 145 can be provided between and along the opposite outer first lateral guide surfaces 141 of the same lateral side 139. The at least one second lateral guide surface 145 can be provided along the inner first lateral guide surface 141*b*. The second lateral guide surfaces 145 may extend approximately parallel to the second interface dimension d2 and third interface dimension d3 but need not be exactly parallel to achieve said function of limiting the freedom of movement in a direction along the first interface dimension d1.

For example, the second lateral guide surfaces 145 may be substantially flat, for example along a plane approximately parallel to the second and third interface dimension d2, d3, wherein approximately parallel may include a 10 degrees deviation from absolutely parallel. The second lateral guide surface 145 may be elongate, that is, relatively long along the second interface dimension d2 and relatively short along the third interface dimension d3. As can be best seen in FIG. 16, lead-in ramps 155 can be provided near the front entrance of the second lateral guide surfaces 145.

A pair of opposite second lateral guide surfaces 145 may extend along and on both sides of the inner first lateral guide surface 141*b*, for example so that the pair of second lateral guide surfaces 145 and the inner first lateral guide surface 141*b* together form a lateral guide slot 142. In another example the slot may extend through the side wall 139 without the inner first lateral guide surface 141*b*. The outer first lateral guide surfaces 141 may extend at the outsides of the slot 142 parallel to the first interface dimension d1. The second lateral guide surfaces 145 and the first lateral guide surfaces 141, 141*b* at the opposite lateral sides 139 may facilitate guiding and translating the interface structure 105 in a direction along the second interface dimension d2 while limiting translations and rotations along and around other axes. The first 141, 141*b* and/or second lateral guide surfaces 145 may span a significant portion of the second dimension d2 of the interface structure 105, such as at least 50%, at least 75% or most or all of the second dimension d2. One or more openings or interruptions can be provided in the guide surfaces 141, 145, such as said lead in ramp 155 or clearances 159.

In other examples, a clearance slot may be provided at the lateral side 139 to clear a corresponding guide rail to facilitate the interfaces structure 105 to be inserted into the receiving station 107 without guidance by the guide rail. In such examples, guidance, if any, may be obtained through walls of the support structure 135 and/or other sides or edges of the interface structure 105 and/or key pens 165. Such clearance slot may be defined by opposite edges of the lateral side 139, or between a respective lateral edge and the container side 113 from which the interface structure 105 projects.

The intermediate guide feature 140 may be provided with at least one second intermediate guide surface 147 to position the interface structure 105 with respect to the receiving station 107 while limiting a freedom of movement of the interface structure 105 in a direction along the third interface dimension d3. The second intermediate guide surface 147 may be at an angle with respect to the first intermediate guide surfaces 143, 143*b*. For example, such angle could be approximately straight, wherein some margin or tolerance may be included. For example, the angle could be between approximately 80 and 100 degrees. A pair of opposite second intermediate guide surfaces 147 may be provided forming a slot 144. The second intermediate guide surfaces 147 may be substantially flat, for example along a plane approximately parallel to the first and second interface dimension d1, d2 wherein approximately parallel may include a 10 degrees or less deviation from exactly parallel. The second intermediate guide surface 147 may be of relatively elongate and narrow shape, that is, relatively long along the second interface dimension d2 and relatively short along the first interface dimension d1.

The pair of opposite second intermediate guide surfaces 147 may extend at both sides and along the inner first intermediate guide surface 143*b* so that the inner first intermediate guide surface 143*b* and the second intermediate guide surfaces together form an intermediate guide slot 144 in the support wall 137*a* of the interface structure 105. However, the intermediate guide slot 144 may extend further inwards without the inner first intermediate guide surface 143*b*. The outer first intermediate guide surfaces 143 may extend at both sides of the slot 144 parallel to the third interface dimension d3.

In another example (not illustrated), an intermediate clearance slot is provided at the distal side 137 but the slot is to clear a corresponding guide rail to facilitate the interfaces structure 105 to be fully inserted into the receiving station 107 while avoiding guidance along a corresponding guide rail. For example, as compared to FIG. 14, opposite edges of a clearance slot may correspond to second intermediate guide surface 147 whereby the distance between opposite edges of the clearance slot may be greater than the distance between the opposite second intermediate guide surfaces 147. Guidance, if any, may be obtained through walls of the support structure 135 of other sides or edges of the interface structure 105.

In one example, the intermediate guide feature 140 or the clearance slot is intersected by a virtual reference plane P0 parallel to the first and second interface dimension d1, d2, whereby the plane P0 extends between a center of the liquid interface 115 and a respective key pen 165, while integrated contact pads 175 extend at another lateral side of the liquid interface 115 opposite to the plane P0.

Figure 22:
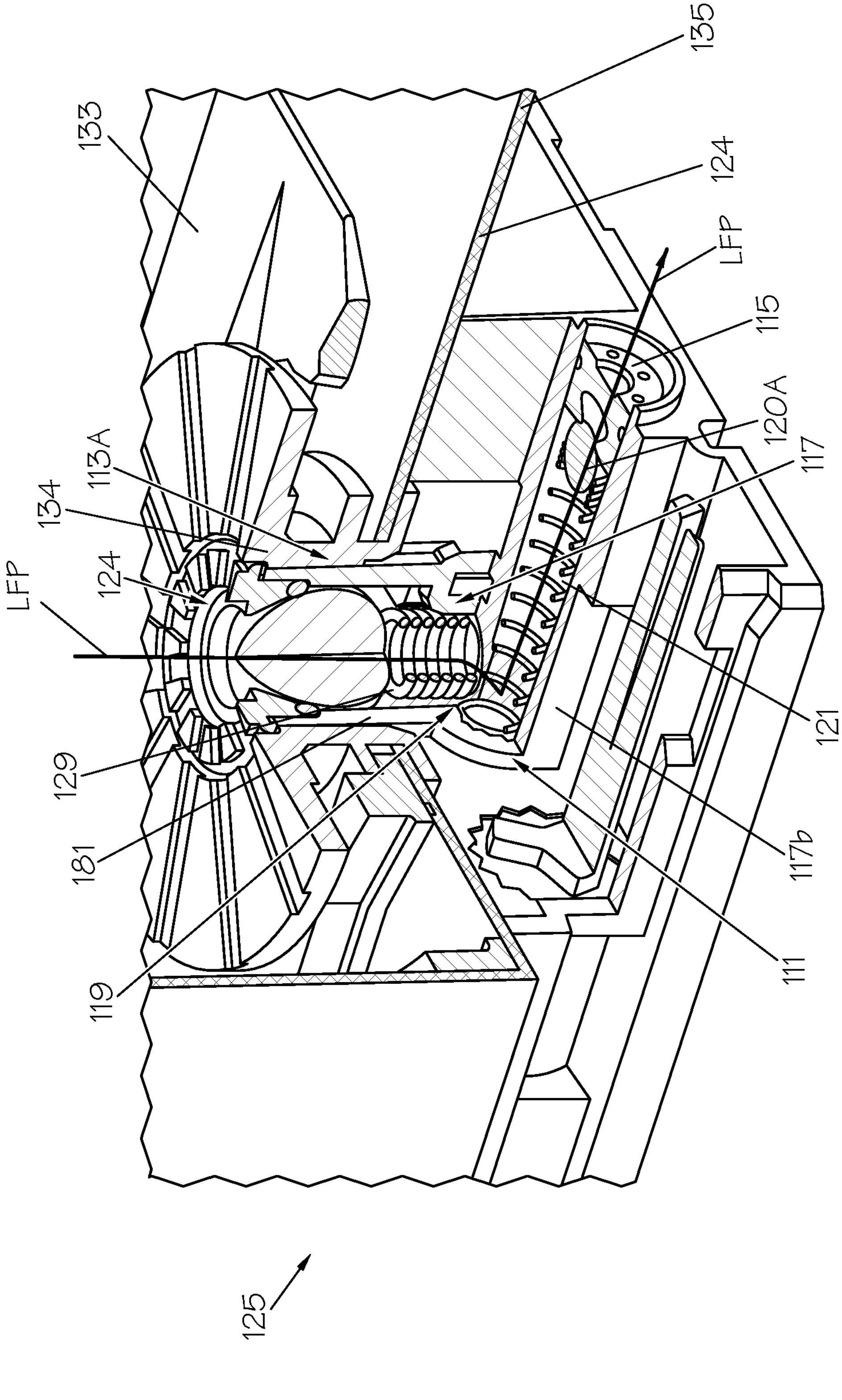
FIG. 22 illustrates a cross sectional perspective view of an example liquid supply apparatus.

As best seen in FIGS. 14 and 15, one second intermediate guide surface 147 of the pair of second intermediate guide surfaces 147, that is closer to the liquid channel 117 and/or interface 115, may be shorter along the first interface dimension d1 than the opposite second intermediate guide surface 147 of said pair. The second intermediate guide surface 147 that is closer to the needle receiving liquid channel portion 121 may be narrower to facilitate a thick enough liquid channel wall 117*b* (FIG. 22). Accordingly, in the illustrated example the intermediate guide slot 144 may include a chamfer 148 in its cross section, between the first and second intermediate guide surfaces 143*b*, 147, respectively, and along at least part of the length of the guide surfaces 143*b*, 147, adjacent and parallel to the liquid channel 117, to facilitate space for the channel walls without impeding the guiding and liquid interface positioning function of the intermediate guide feature 140. Hence, the intermediate guide feature 140 may include approximately perpendicular guide surfaces 143*b*, 147, including a pair of opposite approximately parallel guide surfaces 147, perpendicular to an inner guide surface 143*b*, wherein said chamfer 148 defines a third guide surface that extends between, and at an angle with, one of the parallel guide surfaces 147 and the inner guide surface 143*b*, adjacent to and along the liquid channel 117.

The above-mentioned guide features 138, 140 and/or surfaces 141, 141*b*, 143, 143*b*, 145, 147 may be elongate in a direction of the second interface dimension d2, and/or flat and flush, to facilitate installation of the interface structure 105 with respect to respective straight counterpart guides of the receiving station. Some of or all the above-mentioned guide surfaces 141, 141*b*, 143, 143*b*, 145, 147 may be provided to facilitate guiding and translating the interface structure 105 along an axis parallel to the needle insertion direction NI while limiting translations and rotations along and around other axes, to align and fluidically connect the liquid interface 115 to the at least one needle 119. In one example the interface structure may include only one or two of each of the illustrated lateral and intermediate guide features 138, 140, respectively. In one example, at installation, predominantly the second lateral guide surfaces 145 are used for alignment of the interface structure 105 along the first dimension d1, D1 and predominantly the second intermediate guide surfaces 147 are used for alignment along the third dimension d3, D3, whereby in a sub-example at least one of the other, that is first lateral and first intermediate, guide surfaces 141, 141*b*, 143, 143*b* need not engage the receiving station guide surfaces or rails 138A, 140A at installation or could be omitted from the interface structure design 105. In a further example the lateral and/or intermediate guide feature 138, 140 may include only one or two respective second lateral or intermediate guide surfaces 145, 147 without the first lateral or intermediate guide surfaces 141, 141*b*, 143, 143*b*, which in certain instances may be sufficient for guiding and positioning. In again other examples respective guide features 138, 140 and/or guide slots 142, 144 may include edges which need not be exactly flat and straight surfaces where the edges may be elongate along the second interface dimension d2.

In an example the first lateral guide surfaces 141, 141*b* are approximately parallel to the second intermediate guide surfaces 147. In an example the first lateral guide surfaces 141, 141*b* and/or the second intermediate guide surfaces 147 are approximately parallel to outer lateral walls 151 of the container 3. In an example the first intermediate guide surfaces 143, 143*b* are approximately parallel to the second lateral guide surfaces 145. In an example the first intermediate guide surfaces 143, 143*b* and/or the second lateral guide surfaces 145 are approximately parallel to the side 113 of the container 103 from which the interface structure 105 projects, and/or to an opposite side 132 of the container 103 opposite to the side 113 from which the interface structure 105 projects. Some of these aspects may facilitate a first rough alignment of the container 103 followed by a more precise alignment of the interface structure 105, as explained earlier.

To facilitate proper engagement one or each guide feature 138, 140 may be provided with lead-in features. For example, as illustrated in FIG. 16, the lateral guide feature 138 includes a lateral lead-in feature 153 near at a front level (in this view indicated by 154) of the interface structure 105 to lead in the rest of the guide feature 138 with respect to an external guide rail. In the illustrated example lead-in ramps 155 are provided at the front of both lateral guide slots 142. The lead-in ramps 155 are defined by opposite diverging lateral guide surfaces, diverging from back towards the front level of the interface structure. The lead-in ramps 155 are a bended or inclined surface with respect to the trailing portion the lateral guide feature 138. The trailing portion includes the second lateral guide surfaces 145 that may be contiguous with the ramps 155. The lead-in ramps 155 may be at an angle with respect to the first lateral guide surface 141, 141*b*, for example at an approximately straight angle, or for example between approximately 80 and 100 degrees with respect to the first lateral guide surface 141, 141*b*. In an example only one lateral lead-in ramp 155 is provided at one lateral side 139.

A relatively fine alignment may be facilitated by the guide surfaces 141, 141*b*, 143, 143*b*, 145, 147 of the interface structure 105, for example with the aid of corresponding guide rails and/or surfaces of the receiving station. In a stepped yet relatively fluent fashion, the projecting portion 123 may first engage to the receiving station, providing for relatively rough alignment, then the lead-in features 153 may engage, and then the guide features 138, 140 may provide for a finer alignment. For example, the lateral lead-in and guide features 153, 138 may provide for first fine alignment while the intermediate guide feature 140 may again allow for a finer alignment. Hence, a proper insertion of the needle with relatively low risk of breaking the needle may be established. The intermediate guide feature 140 extends adjacent to, and along, the liquid interface 115 and channel 117, to facilitate the relatively precise insertion of the needle. The intermediate guide feature 140 may be connected to the guide rails after the other guide features 138 are connected to provide a final and finest alignment. In certain instances, the liquid volume and associated weight of the supply apparatus 101 can be relatively high which would increase a risk of breaking a fluidic needle, especially in case of relatively uncontrolled push insertion, but this does not need to impede the supply apparatus 101 of some of the examples of this disclosure to readily slide into a relatively precise fluidic connection with the receiving station. In again other examples, some but not all of the disclosed guide features 138, 140 are provided and some user control is required for establishing the fluidic connection.

Figure 17A:
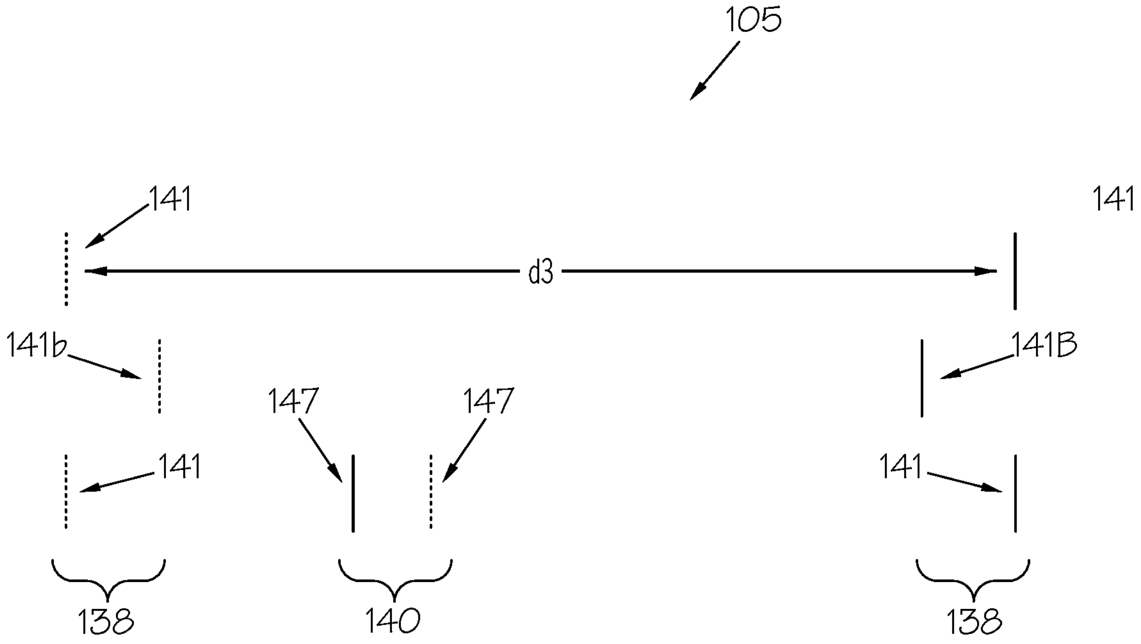
FIGS. 17A and 17B illustrate diagrams examples of respective guide features of interface structures.

FIG. 17A illustrates a diagram of the guide features 138, 140 of the interface structure 105, in a diagrammatic front view, wherein the guide features 138, 140 are adapted to limit the freedom of movement in directions along the third interface dimensions d3. For example, the guide features to limit the freedom of movement in a direction along the third interface dimension d3 include at least one of (i) the inner first lateral guide surfaces 141*b*, (ii) the outer first lateral guide surfaces 141*b*, and (iii) the second intermediate guide surfaces 147. In one example each of those surfaces 141, 141*b*, 147 may be relatively elongate in the second interface dimension d2 and may be defined by a ridge or flat surface that engages guide surfaces of the receiving station. A distinction can be made between guide features that limit movement in one direction along the third interface dimension d3 and guide features that limit movement in the opposite direction along the third dimension d3, which is illustrated by continuous lines versus dotted lines in FIG. 17A. In one example the interface structure 105 includes at least two guide surfaces to limit movement in one direction along the third interface dimension d3 (e.g. 141, 141*b*, 147 in dotted lines) and at least two guide surfaces to limit movement in the opposite direction along the third interface dimension d3 (e.g. 141, 141*b*, 147 in continuous lines).

Figure 17B:
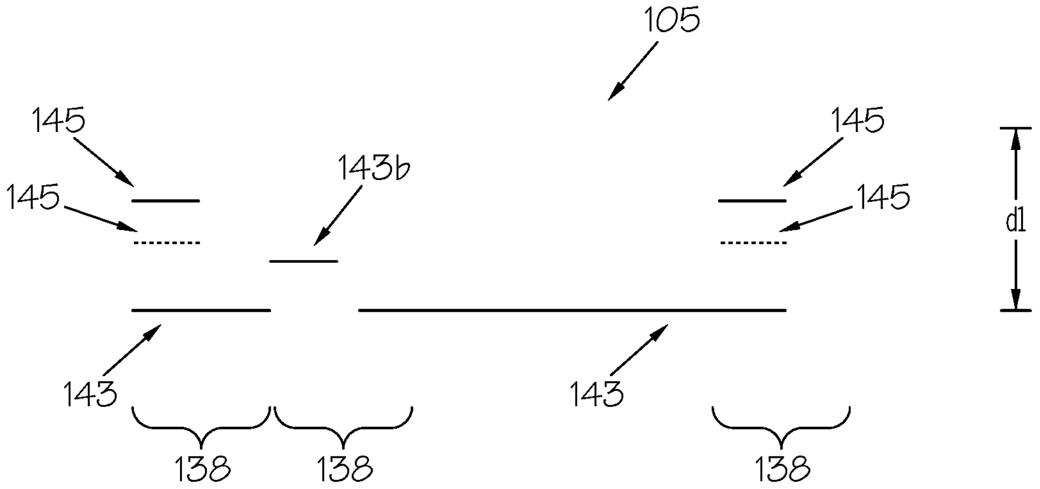

FIG. 17B illustrates a diagram of the guide features 138, 140 of the interface structure 105, in a diagrammatic front view, wherein the guide features 138, 140 are adapted to limit the freedom of movement in directions along the first interface dimensions d1. For example, the guide features to limit the freedom of movement in a direction along the first interface dimension d1 include at least one of (i) the second lateral guide surfaces 145, (ii) the first inner intermediate guide surfaces 143*b*, and (iii) the first outer intermediate guide surfaces 143. In one example each of those surfaces 145, 143*b*, 143 may be relatively elongate in the second interface dimension d2 and may be defined by a ridge or flat surface that engages guide surfaces of the receiving station. In FIG. 17B, a distinction can be made between guide features that limit movement in one direction along the first interface dimension d1 and guide features that limit movement in the opposite direction along the first interface dimension d1, which is illustrated by continuous lines versus dotted lines. In one example the interface structure 105 includes at least two guide surfaces to limit movement in one direction (e.g. 145, 143, 143*b* in continuous lines) and at least two guide surfaces to limit movement in the opposite direction (e.g. 145 in dotted lines). In one example the interface structure may be provided with lateral guide surfaces 145 that are adapted to limit movement of the interface structure 105 in a direction opposite to the projection direction of the interface structure 105, at least when in contact with corresponding lateral guide rails.

Figure 18:
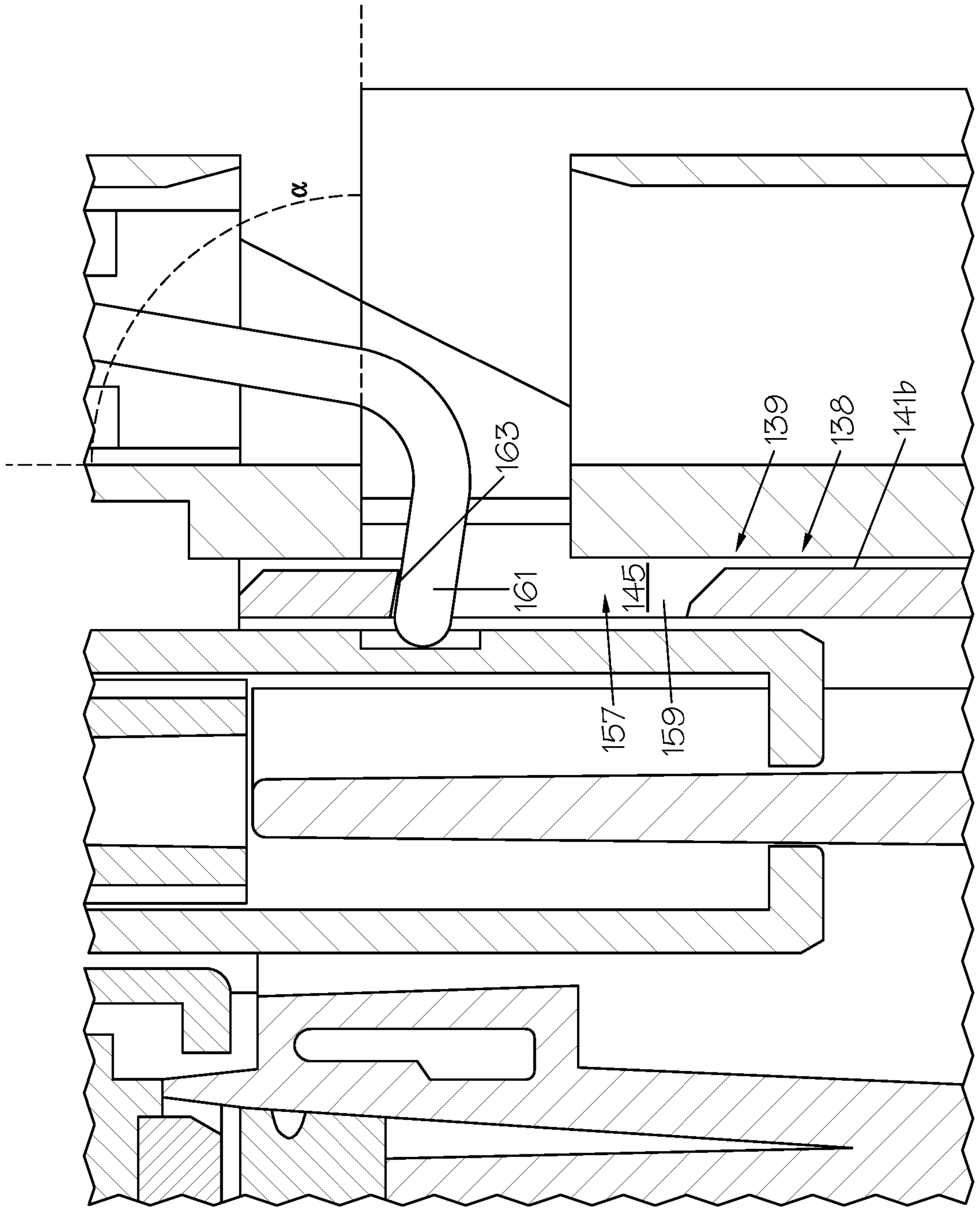
FIG. 18 illustrates a cross sectional top view of an example illustrating an example hook and an example secure feature of a receiving station and interface structure, respectively.

FIG. 18 illustrates a cross sectional top view of a system where an example interface structure 105 is connected to a receiving station. The example interface structure 105 includes a secure feature 157, as also illustrated in FIGS. 8 and 16. The secure feature 157 may facilitate operational installation, and in some instances, retention, of the supply apparatus to the receiving station.

In these drawings, the secure feature 157 includes a clearance 159, here in the form of an opening through the lateral wall that defines the lateral side 139, into which a corresponding secure element of the receiving station 107 may project, wherein the secure element may be a catch or detent, wherein the secure element may be a catch or detent. For example, one secure feature 157 can be provided at one lateral side 139, or two secure features 157 can be provided at opposite lateral sides 139. The clearance 159 may be provided near a front side of the interface structure 105, next to the key pen 165. In the illustrated example the protruding secure element is a catch hook 161. However, depending on the application, secure elements other than hooks may be used to facilitate securing the supply apparatus to the receiving station. The secure elements may include blocking features, as is the case for the illustrated hook 161, audible or tangible feedback features, trigger or switch features, etc. That is, while in one example the secure element may directly lock an interface structure to the receiving station, in other examples the secure element may only trigger a switch or provide for some feedback functionality.

In the illustrated example, the secure feature 157 is provided in the lateral guide feature 138. The clearance 159 may be defined by a cut out in the lateral side 139, for example in the slot 142 and/or through the inner first lateral guide surface 141*b*. In the illustrated example, the clearance 159 is a through hole in the respective side wall, opening into the respective recess 171*a*, 171*b*. In other examples, instead of a through hole the clearance 159 could be an indent. Each lateral side 139 may include a secure feature 157, to interact with secure elements at both sides 139. The clearance 159 may facilitate that a biased secure element 161 can project partially into the clearance 159

The secure feature 157 may further include a stop surface 163, hereafter also referred to as stop, next to the clearance 159. The stop 163 can be defined by an edge of the clearance 159 at a side of the clearance 159 that is near the front edge of the interface structure 105. The stop 163 is provided near a front level of the interface structure as indicated by 154 in FIG. 16, for example next to a distal portion of the key pen 165. The stop 163 may be part of a lateral front wall portion 141*b* that defines the stop as well as an edge of the front of the interface structure 105, at the entrance of the respective recess. The stop surface 163 may extend at an angle with respect to the adjacent surface of the respective wall portion 141*b* of the lateral side 139. In one example system, the stop 163 provides for resistance against moving the interface structure 105 with respect to the secure element. In another example system, the stop 163 and/or lateral front wall portion 163*a* may push a finger, trigger or switch or the like to switch into a certain operational mode or to provide certain feedback.

As seen in FIG. 16 a front lateral side wall portion 163*a* may extend between, and define, the stop 163 and the edge around the front. The front lateral side wall portion 163*a* may extend next to a distal portion of the key pen 165, providing for some protection of the key pen 165 against breaking by falling. The front lateral side wall portion 163*a* may extend between the lead-in ramps 155.

In the illustrated example of FIG. 18 the secure element is a hook 161. The hook 161 is shown in a position whereby it projects through the clearance 159. As will be explained below, this position of the hook 161 can be imposed by a key pen 165 that pushes an actuator of the receiving station that in turn triggers a the hook 161 through a mechanism arranged to transmit the translation to the hook, hereafter referred to as transmission mechanism. In the illustration, some distance is shown between the hook 161 and the stop 163, which illustrates a moment of installation where the supply apparatus 101 is pushed fully into the receiving station just before the operator manually releases the supply apparatus 101 for completing the insertion. After such release a pushing force of a biased spring will move the stop 163 against the hook 161 in an outward direction out of the receiving station. Thus, the hook 161 counteracts the opposing force F (FIG. 21) of that spring, blocking removal or ejection of the supply apparatus 101 whereby the supply apparatus 101 is retained in fluidic connection. Subsequent retraction of the hook 161 would automatically eject the supply apparatus 101.

A second manual push against the back 125 of the supply apparatus 101 pushes the key pen 165 against the actuator, which may again trigger said transmission mechanism to release the hook 161 with respect to the stop 163 and clearance 159, whereby the hook 161 is pulled out of the clearance 159. Thereby, the interface structure 105 is unblocked, which causes the biased spring to expand and push the interface structure 105 out of the receiving station 105.

The stop surface is the stop portion against which a part of the hook 161 is to engage. That engagement surface of the stop 163 may be relatively flat and extend at an angle α with respect to the respective lateral side surface 141*b*, for example at an angle α of at least approximately 90 degrees, or slightly more than 90 degrees, for example at an angle α of at least approximately 91 degrees. An angle α of more than 90 degrees may allow for additional retention of the hook 161, inhibiting slipping of the hook 161 with respect to the stop 163, or at least inhibit unintended disengagement of the hook 161 to some extent to avoid unintended ejection of the interface structure 105.

Other example supply apparatuses may not have a secure feature. In one example the receiving station may have a hook, grip or arm or the like that retains the supply apparatus 101 against a back of the apparatus. In another example, the supply apparatus 101 is installed to a receiving station in a hung condition (e.g. see FIG. 43) whereby the fluidic connection may be sufficiently secured by the weight of the supply itself, or by manual retention, or by an under-pressure created by a printer pump between the liquid interfaces. In again other examples, the supply apparatus may include a clearance or clearance slot to clear both the guide rail and hook of the receiving station.

Other example supply apparatuses may apply other types of secure features than the explained secure feature 157. These other type secure features may suitably retain a fluidic connection between the supply apparatus and liquid input. For example, the supply apparatus 101 may be provided with a similar secure feature 157 but at a different location, for example at the distal side 137 of the interface structure 105. For example, the supply apparatus may be provided with a hook, grip or click finger, to hook or unhook to a receiving station, or with high friction surfaces such as elastomeric cushions to press-fit to walls of the receiving station.

Figure 19:
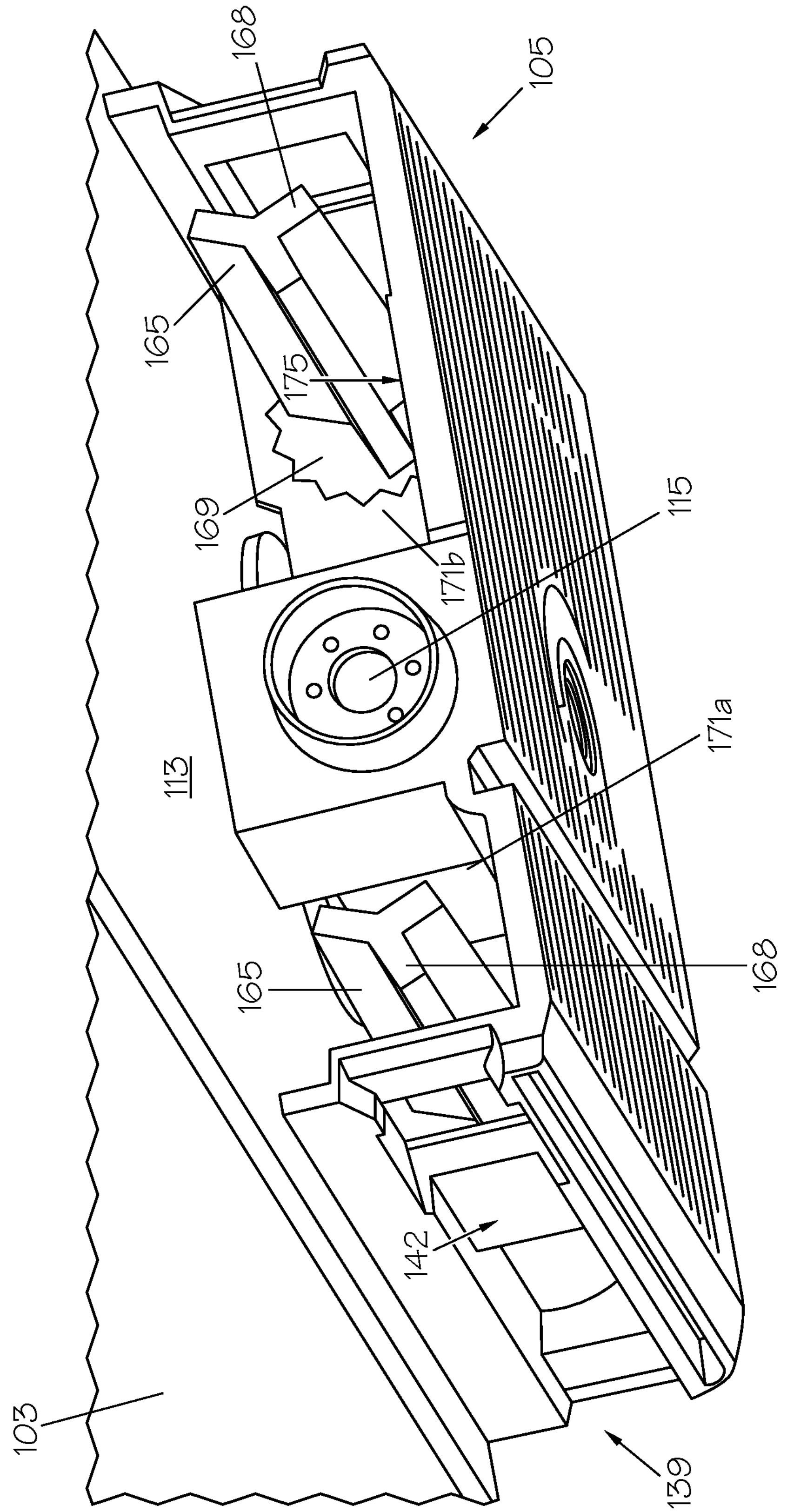
FIG. 19 illustrates another perspective view of an example of an interface structure projecting from a container side.
Figure 20:
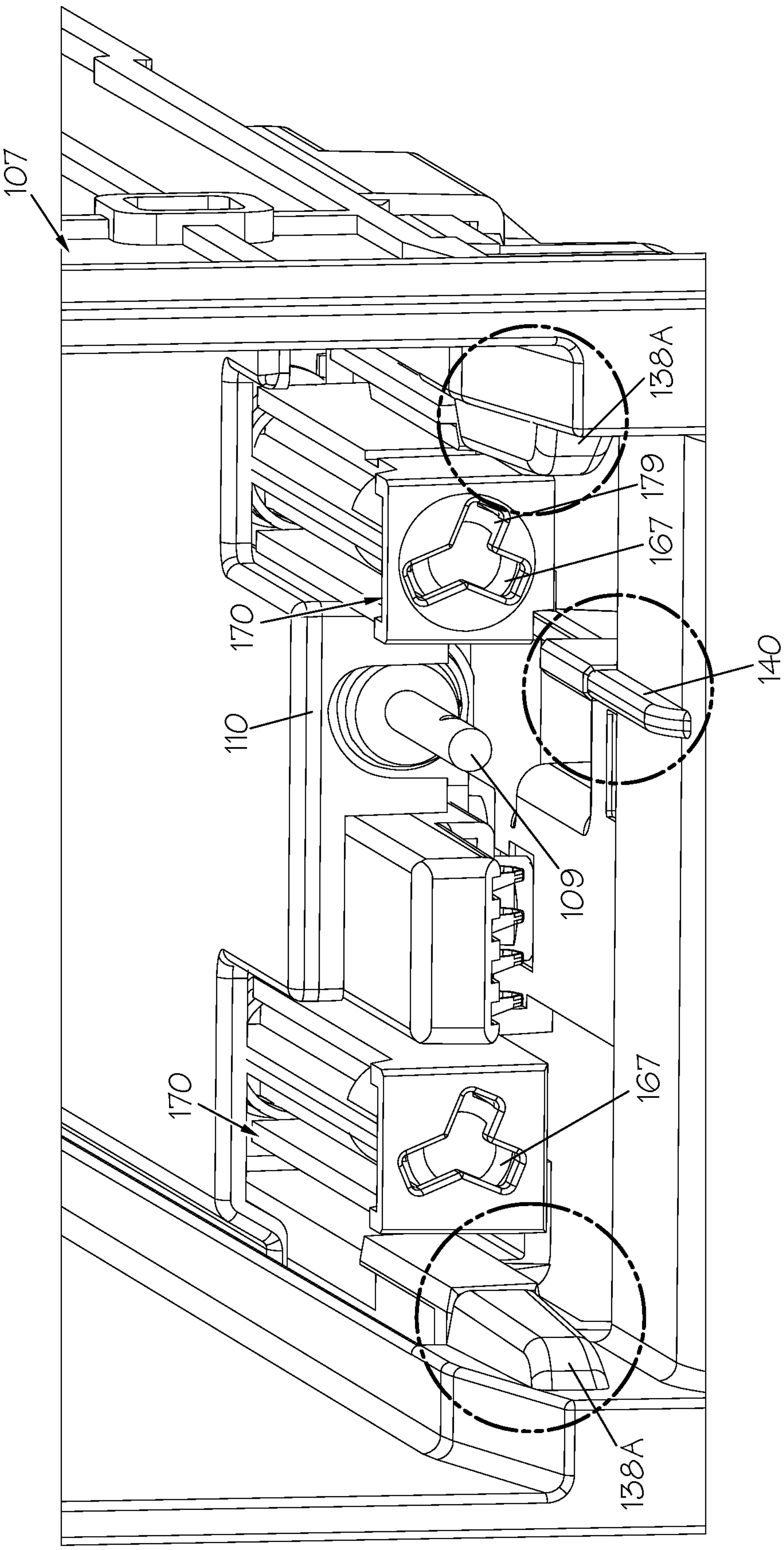
FIG. 20 illustrates a perspective view on an example receiving station.
Figure 21:
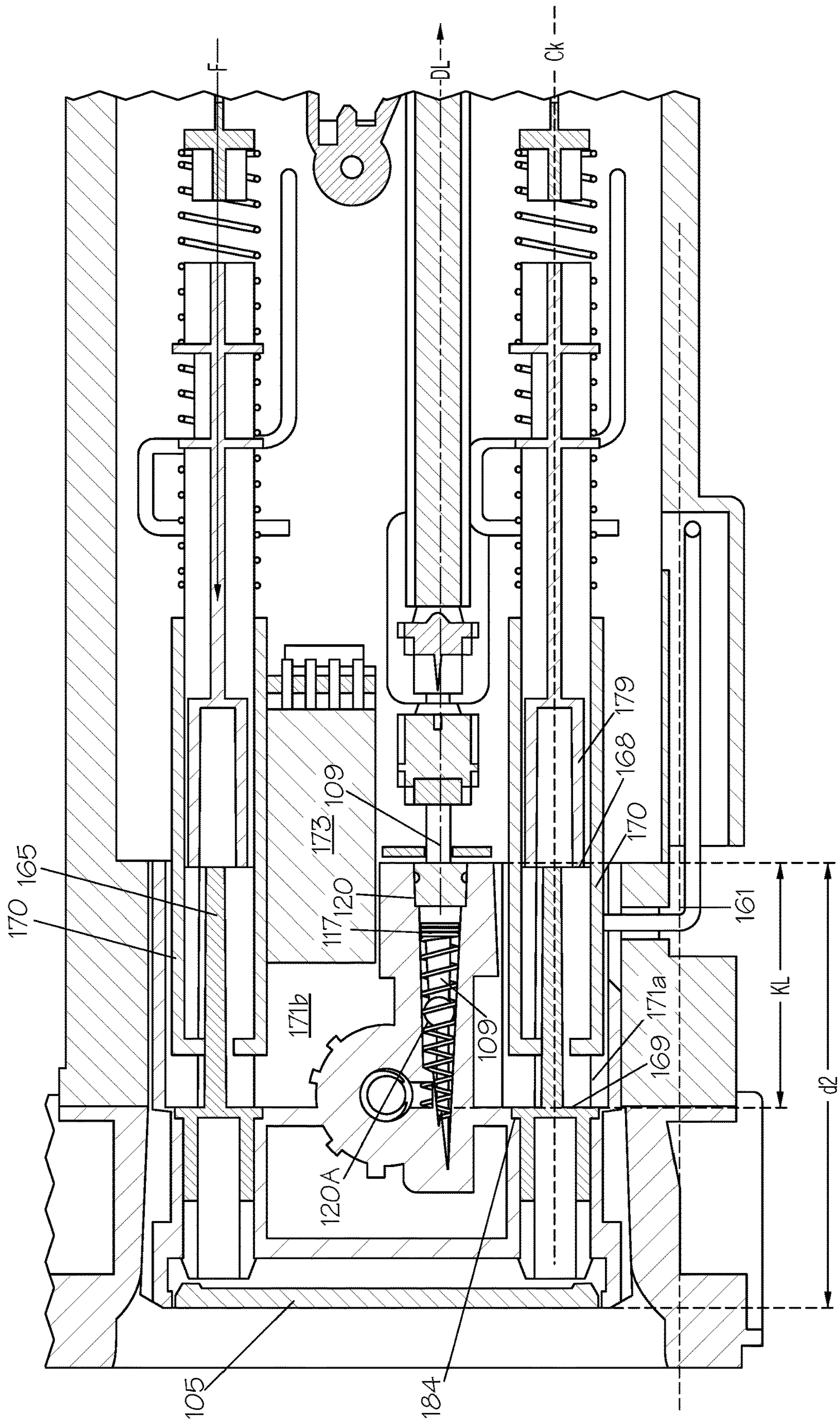
FIG. 21 illustrates a cross sectional top view on an example interface structure and receiving station in fluidically connected state.

FIG. 19 illustrates an example interface structure 105 in a perspective view, projecting from a respective side 113 of the container 103. FIG. 20 illustrates part of an example receiving station 107 for the example interface structure 105. A humidor 112 has been omitted in this drawing. FIG. 21 illustrates a cross-sectional top view of an example where the interface structure 105 and the receiving station 107 are in secured and fluidically connected condition. Amongst others, certain functions and features related to protruding key pens 165 of certain examples of this disclosure will be explained with reference to these FIGS. 19-21.

The key pens 165 of this disclosure may have a generally longitudinal shape, for example protruding along a longitudinal axis Ck for at least approximately 10, at least approximately 12, at least approximately 15, at least approximately 20 or at least approximately 23 mm. In a first, broader definition of this disclosure a key pen has a "keying" function because it is to pass through a printer key slot to act upon an actuator, for example a switch and/or transmission. In a further example a key pen also has a liquid type (e.g. ink color or agent) discriminating function because it allows for connection to a corresponding receiving station with a matching key slot, while it may be blocked from connection to receiving stations with non-matching key slots. In other examples the key pen may be adapted to have the discriminating function without necessarily having the actuating function. As will be clarified with reference to various example drawings throughout this disclosure, the key pen may have different shapes, ranging from relatively simple protruding pins up to shapes with more complex cross sections.

In the illustrated examples, the interface structure 105 comprises a pair of key pens 165. The key pens 165 extend within the second interface dimension d2, as defined by opposite external lateral sides 139. Correspondingly, the key pens 165 extend within the container dimension D2. A pair of key pens 165 may facilitate distribution and/or balancing of forces to actuate respective secure elements as compared to a single key pen. The corresponding actuators that are actuated by the key pens 165 may receive the actuation force in a balanced or distributed manner. Opposite key pens 165 may facilitate better guidance and/or alignment of the interface structure 105 and liquid interface 115. More than two key pens could be provided, for example with more than one key pen at either side of the liquid channel 117. The interface structure 105 may also include a pair of secure features 157, each secure feature at a respective lateral side 139 next to each key pen 165. In other examples the interface structure 105 comprises only a single key pen 165 or more than two key pens 165.

The key pens 165 may protrude from a base 169, for example a base wall. The base 169 may be a wall, foot or column. For example, the base 169 may be a wall or foot at a deep end of a respective recess 171*a*, 171*b* within which the key pen 165 protrudes. The base 169 may be offset in a direction backwards, along the needle insertion direction NI, with respect to the interface front 154.

The key pen 165 may extend approximately parallel to the second interface dimension d2. The key pen 165 may extend approximately parallel to the respective side 113 the container 103 from which the interface structure 105 projects, for example below a bottom of the container 103. The container side 113 can be relatively planar and the key pens 165 may extend parallel to that side 113. In FIGS. 19-21, the at least one key pen 165 protrudes along its longitudinal axis Ck that is approximately parallel to the needle insertion direction NI, main liquid flow direction DL, second interface dimension d2 and/or second container dimension D2. The longitudinal axis Ck of the key pen 165 may represent an axis along which the key pen protrudes. The longitudinal axis Ck may be a central axis of the key pen 165. The key pens 165 extend next to, at opposite sides of, the liquid channel 117 and/or liquid interface 115, for example generally along a longitudinal direction approximately parallel to a central axis of the needle receiving portion 121 of the liquid channel 117 and/or a central axis of the seal 120.

A distance between a first key pen 165 and the needle receiving liquid channel portion 121, along the third interface dimensions d3, may be greater than a distance between an opposite second key pen 165 and the needle receiving liquid channel portion 121. The distance could be defined by a distance between an axis representing the needle insertion direction NI and a longitudinal axis Ck along which the key pens 165 extend. The integrated circuit 174 and/or contact pads 175 thereof extend between the first key pen 165 and the needle receiving liquid channel portion 121. Said greater distance facilitates a data connector 173 to pass between the first key pen 165 and molded structure of the front push area 154*a* and the liquid channel wall 117*b*.

The key pen 165 is adapted to be inserted in a corresponding key slot 167 of the receiving station 107 (FIG. 20). The key slot 167 may be adapted to facilitate blocking non-corresponding key pens 165 to prevent that non-matching print liquids are connected to the receiving station 107, for example to prevent contaminating the liquid needle 109 or further liquid channels downstream of that needle 109 with a non-compatible liquid type. In the example of FIG. 20 the key slot 167 has the shape of a Y in a predetermined orientation, intended to receive only key pens 165 having a correspondingly shaped cross section and corresponding orientation. Other key slots 167 could for example have T-, V-, L-, I-, X- or one or multiple dot shapes or other geometrical shapes.

In certain examples, master key pens may be provided that can connect to different key slots 167, even if the purpose of these key slots is to discriminate between key pens. Master key pens may be provided for service fluid supplies or simply as alternative solutions to color discriminating key pens, and in this disclosure also fall within the definition of a "key pen".

The key pens 165 may be adapted to actuate upon corresponding actuators of associated key slot components. Suitable actuators of a receiving station may include electrical switches and/or mechanical transmission mechanisms. In the example of FIG. 21, the actuator is a transmission mechanism including a spring-loaded rod 179.

As illustrated in FIG. 21, a distal actuating surface area 168 of the key pen 165 passes through the key slot 167 to actuate upon the rod 179 at insertion of the interface structure 105 into the receiving station 107. The rod 179 at least partially extends inside a key slot housing component 170 here embodied by a sleeve-shaped housing. At insertion of the supply apparatus 101 into the receiving station 107, for example by a push of an operator, the housing component 170 is inserted into the recess 171*a*, 171*b*, through the recess entrance at the front of the interface structure, towards the base. Thereby the key pen 165 is inserted into the housing component 170 and pushes the rod 179. In the illustrated example, the corresponding movement of the rod 179 along the main liquid flow direction DL is transmitted to the hook 161 by a suitable transmission mechanism (not shown), whereby an end of the hook 161 is inserted into the clearance 159. Once the hook 161 is inserted into the clearance and the supply apparatus is released by the operator, the hook 161 may engage the stop 163, retaining the supply apparatus 101 in the receiving station 107. The hook 161 may retain the interface structure 105 in seated condition against the spring force F of the rods 179. In the seated condition, the needle 109 protrudes inside the liquid channel 117 and seal 120, opening a ball valve 120A and establishing liquid flow between the supply apparatus 101 and the receiving station 107. Also, a data connector 173 is connected to the integrated circuit contact pad array 175 whereby data communication may be established. The interface structure 105 may include secure features 157 at both lateral sides 139, each with clearances 159 and stops 163. Correspondingly, two opposite hooks 161 may be triggered through the pair of rods 179.

A subsequent push of the operator again moves a rod 179 which again transmits its actuation to the hook 161. Thereby, the hook 161 is released from the clearance 159 and stop 163, triggering ejection of the supply apparatus 101. At ejection, the rod 179 pushes the key pen 165 backwards inside its rod housing component 170 by decompression of the spring, whereby the fluid needle 109 exits the liquid interface 115 and the data connection is broken.

In the illustrated example, the interface structure 105 includes two recesses 171*a*, 171*b* both laterally next to the needle receiving portion 121 of the liquid channel 117, having a depth along the second interface dimension d2. The recesses 171*a*, 171*b* may surround the key pens 165, for example to facilitate intrusion of the key pens 165 into respective key slot housing components 170.

The recess 171*a*, 171*b* may be defined by recess walls. The recess 171*a*, 171*b* may extend next to the needle receiving liquid channel portion 121, and on the other side the recess 171*a*, 171*b* can be delimited by the inner wall surface of the respective lateral side 139 of the interface structure 105. The recess 171*a*, 171*b* may further be delimited by, on one side, the side 113 of the container 103 from which the interface structure 105 projects, and, on the opposite side, the inner wall surface of the distal side 137.

The liquid interface 115 and needle receiving channel portion 121 can be laterally offset from a center plane CP of the interface structure 105 (e.g. see also FIGS. 24 and 25), whereby a smaller and larger recess 171*a*, 171*b*, respectively, are provided at both sides of the interface 115 and needle receiving channel portion 121. One key pen may extend at a greater distance from the liquid channel than the other key pen, with an integrated circuit extending between said one key pen and the liquid channel. In one example, the larger recess 171*b* houses the integrated circuit contact pads 175, that extends on the other side of the center plane CP with respect to the liquid interface 115. The recess 171*b* may house the entire integrated circuit 174 of which the pads 175 are a part. The integrated circuit 174 can be a microcontroller or other customized integrated circuitry. The integrated circuit contact pads 175 may extend over an inner wall portion of the distal side 137 of the interface structure 105, in a plane parallel to the second and third interface dimension d2, d3 and along an axis parallel to the third interface dimension d3. The distal side 137 includes a support wall portion for the integrated circuit 174. The integrated circuit contact pads 175 may extend between the liquid channel 117 and the respective key pen 165. During installation of the supply apparatus 101 a data connector 173 for the integrated circuit contact pads 175 may pass into the respective larger recess 171*b*, between the needle receiving channel portion 121 and the respective key pen 165 housed by the respective recess 171*b*.

The key pen 165 may have an elongate shape in a direction along the second interface dimension d2, for example along its longitudinal axis Ck, protruding from the base 169 of the recess 171*a*, 171*b*. In one example, the extent of protrusion KL from the base 169 may be based on (i) a desired insertion length of the liquid needle, (ii) an insertion length of the data connector 173, and (iii) an actuator push length for sufficiently triggering the actuator. In an example, the key pen 165 protrudes inside the respective recess 171*a*, 171*b* along the second interface dimension d2, without surpassing the liquid output edge 116 whereby the actuating surface area 168 of the pen 165 may be approximately at level with the liquid output edge 116. In one example, each protruding key pen 165 is housed in the respective recess 171*a*, 171*b* between the walls 117*b* adjacent to the liquid channel 117, and walls that define the lateral side 139. The depth of the recess 171*a*, 171*b*, between the interface front 154 and the base 169 along the second interface dimension d2, may be approximately the same as the length of the key pen 165, as measured between that base 169 and a distal actuating surface area 168 of the key pen 165. In one example some of the walls that extend along the recesses 171*a*, 171*b* may mechanically protect the protruding key pens 165, for example against damage by falling.

The key pen 165 may have a length KL between the base 169 and the actuating surface area 168 of at least approximately 10 mm, at least approximately 12 mm, at least approximately 15 mm, at least approximately 20 mm, or at least approximately 23 mm. Correspondingly, the base 169 of the key pen 165 may extend at least said length KL backwards from the outer edge 116 of the liquid interface 115, as measured along the second interface dimension d2. In the illustrated example the actuating surface area 168 of the key pen 165 extends approximately up to the liquid interface edge 116 but does not extend beyond the liquid interface edge 116, as measured along the second interface dimension d2, or for example up to 1, 2, 3 or 5 mm short of or beyond the edge 116. In other examples, the distal actuating surface area 168 of the key pen does not protrude further than 3 or further than 5 mm from the outer edge 116 of the liquid interface 115, as measured along the main liquid flow direction DL or second interface dimension d2, while in yet other examples the key pen may extend over more than 5, 10 or 15 mm beyond the liquid interface 115 (e.g. see FIG. 37A).

In one example the recesses 171*a*, 171*b* are defined by the lateral sides 139, the support wall 137*a*, walls 117*b* that define, or are parallel and adjacent to, the liquid channel 117, and the respective container side 113 opposite to the support wall 137*a*. The lateral side 139 and support wall 137*a* may extend along the key pens 165 for protection, for example at least up to the distal actuating surface areas 168, or at least up to approximately 5 mm behind the distal actuating surface areas 168.

In the different example supply apparatuses 101, the container 103 spans along the length KL of the key pen 165, surpassing the distal actuating surface area 168, surpassing the liquid interface edge 116 and key pen 165, and projecting in the main liquid flow direction DL beyond the interface structure 105 over a projection length PP, as illustrated, for example, in FIG. 8.

FIG. 22 illustrates a cross sectional perspective view of an example of an interface structure 105 and container 103. For some of the details that will be discussed now with reference to FIG. 22, also FIGS. 5, 6, 8, 9 and 41 may be consulted. In the illustrated example, a reservoir 133, support structure 135 and interface structure 105 are separately manufactured components that are assembled together after their respective individual fabrication. The example supply apparatus 101 may facilitate using relatively environmentally friendly materials and structures. At the same time, the supply apparatus 101 and receiving station may be implemented in a plurality of different print platforms. The supply apparatus 101 may provide for a relatively user-friendly mounting and unmounting to the receiving station, for example, by a push-push motion.

In one example, the support structure 135 is made of carton, or other cellulose based material, for example f-flute cardboard with approximately 2 mm or less, or 1 mm or less thick corrugation.

The support structure 135 may be include a generally box-shaped folded carton structure to support and protect the reservoir bag, as well as providing for descriptions, instructions, advertisements, figures, logos, etc. on its outside. The support structure 135 may provide for protection against leakage of the reservoir 133 such as by shocks and/or during transport. The support structure 135 can be generally cuboid, including six generally rectangular sides, defined by carton walls, whereby at least the side 113 from which the interface structure 105 projects may include an opening 113A to allow liquid to flow from the reservoir 133 through the support structure 135 and the interface structure 105. The opening 113A can be provided adjacent a second side 125 that is at approximately right angles with the first mentioned side 113. In some of the illustrated examples the opening 113A is provided in the bottom wall near the back wall to allow for the interface structure to project from the container bottom near the back whereby the container volume may project beyond the liquid interface in the main direction of outflow of the liquid, along the main liquid flow direction DL. The support structure 135 may include a push indication on or along said second side 125, e.g. the back side, to indicate to an operator to push against that side 125 for mounting and/or unmounting the supply apparatus 101, respectively.

In one example, the reservoir 133 includes a bag of flexible film walls, the walls comprising plastic film that inhibits transfer of fluids such as gas, vapor and/or liquids. In one example, a laminate of multi-layered thin film plastics may be used. Thin film material may reduce the use of plastic material, and consequently, the potential environmental impact. In a further example a thin metal film may be included in the multiple layers to increase impermeability. The flexible film reservoir walls may include at least one of PE, PET, EVOH, Nylon, Mylar or other materials.

In different examples, the reservoirs 133 of this disclosure may facilitate holding at least 50 ml, 90 ml, 100 ml, 200 ml, 250 ml, 400 ml, 500 ml, 700 ml, 1 L, 2 L, 3 L, 5 L or more print liquid. Between different volume containers 103, the same reservoirs 133, having the same maximum liquid volume capacity, can be used for different support structures 135 and/or different liquid volumes of the supply apparatus 101.

The reservoir 133 may include a relatively rigid interconnect element 134 more rigid than the rest of the flexible bag, for fluidic connection to the interface structure 105, allowing the liquid in the reservoir 133 to flow to the receiving station. In the illustrated example of FIG. 22 the interconnect element 134 may be a neck of the reservoir including a central output channel through which liquid is to flow out of the reservoir 133, the neck including flanges extending outwards from the central output channel to facilitate attachment to the respective support structure wall at the edge of the opening 113A, as well as a central channel to channel the liquid to the liquid channel 117. The interconnect element 134 may connect to the reservoir connecting portion 129 of the liquid channel of the interface structure 105, for example to a protruding portion of the reservoir connecting portion 129 that extends beyond the first interface dimensions d1 into the support structure 135, that is, beyond the profile height of the interface structure 105.

The interconnect element 134 may facilitate interconnection of the reservoir 133, support structure 135 and reservoir connecting liquid channel portion 129. The different flanges may connect to different components. For example, a first flange of the interconnect element 134 may connect to the reservoir 133 and a second flange may connect to the support structure 135. In one example the reservoir comprises film laminate where by one film layer is attached over one side of the flange and another film layer is attached over the other side of the flange in a fluid tight manner. The film layers may be welded to the flange. A mechanical connection structure 106 may be provided to clamp the reservoir 133 and support structure 135 to the reservoir connecting liquid channel portion 129, for example between flanges of the interconnect element 134 and wedged arms of the mechanical connection structure 106, whereby the arms of the mechanical connection structure 106 may extend around the tubular reservoir connecting liquid channel portion 129 and clamp the reservoir and support structure walls between flanges of the interconnect element 134 and its wedges.

Figure 41:
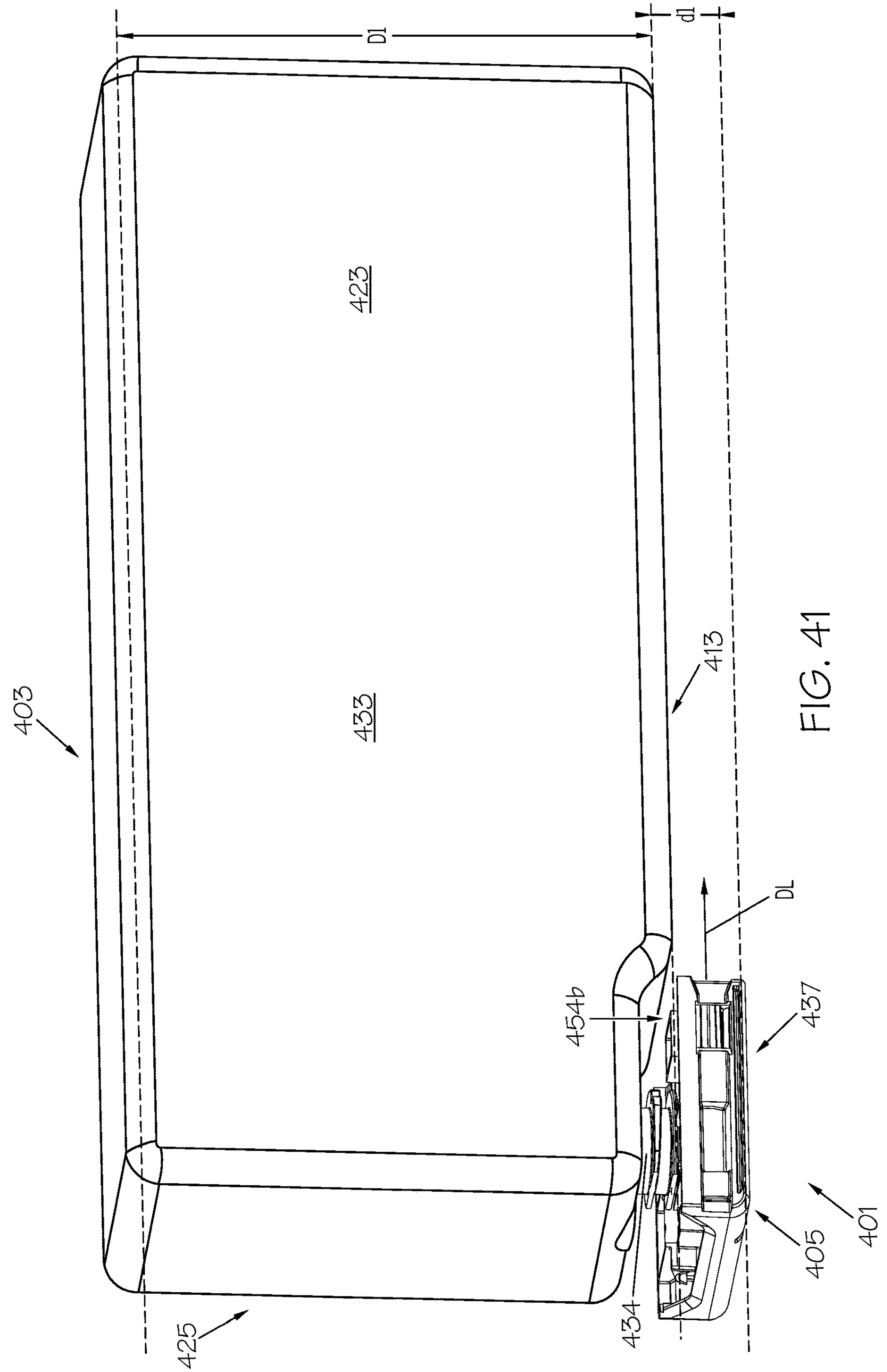
FIG. 41 illustrates a perspective view of an example liquid supply apparatus.

The reservoir bag may project inside the projecting portion 123 of the support structure 135 beyond the liquid interface edge 116, for example, as can be seen with reference to FIG. 41. For example, more than 60, 70, 80, or 90% of a length of the reservoir along the second container dimension D2 projects away from the interconnect element 134, in an operational and at least partially filled condition of the reservoir 133. To that end, the interconnect element 134 may be provided in the reservoir at an asymmetrical position, for example near an edge or corner of an unfilled and flat reservoir bag.

The interface structure 105 comprises relatively rigid molded plastics. The walls of the interface structure may inhibit transfer of fluids such as gas, vapor and/or liquid, so that the separate reservoir and interface structure may together form a relatively fluid tight liquid supply system. Most of the interface structure 105, such as the base 169, back 126 and side walls 139, 137, may be made of recycled fiber filled plastics material, such as a non-glass fiber recycled PET. In one example the non-glass fill provides for better retention of the seal 120 in the liquid channel 117. For example, the key pens 165 and an example separate mechanical connection structure 106 (FIG. 40) may be made of glass fiber filled plastics.

While the materials of the interface structure and reservoir may be relatively impermeable to fluids, in practice, some fluids may be transferred through walls of the reservoir and interface structure over time for various reasons. Correspondingly, a certain limited shelf life may be associated with the supply apparatus 101. For example, a choice of materials may be based on reducing the reservoir film thickness while maintaining a certain minimum shelf life. In one example, an interconnect element 134 separate from the reservoir 133, in use assembled between the interface structure 105 and the reservoir 133, may be more fluid permeable than the interface structure 105 and reservoir 133 to facilitate attachment of the interconnect element 134 to the interface structure 105 and reservoir 133 that are of different materials, for example to facilitate both welding and gluing.

The liquid throughput 111 of the interface structure 105 and its main liquid flow path LFP are illustrated in FIG. 22. The main direction of flow of the liquid flow path LFP is out of the container and interface structure 205 as explained earlier but in certain examples there may be a bi-directional flow path associated with the liquid flow path LFP, or opposite flow where there are two liquid channels 117. Upstream of the main direction of flow along the main liquid flow path LFP, the interface structure 105 may be provided with a liquid channel input 124, for example aligned with the interconnect element 134 of the reservoir 133, to receive liquid from the reservoir 133, as part of the liquid receiving liquid channel portion 129. Downstream of that input 124 the liquid channel of the supply apparatus 101 includes the rest of the reservoir connecting channel portion 129, followed by the intermediate channel portion 119, the needle receiving channel portion 121, and the liquid interface 115.

In the illustrated example, the intermediate liquid channel portion 119 facilitates (i) an angle β between the reservoir connector portion 129 and the needle receiving portion 121 in a plane parallel to the first and second interface dimension d1, d2 and (ii) and a lateral offset between the reservoir connector portion 129 and the needle receiving portion 121 along the third interface dimension d3.

Figure 23:
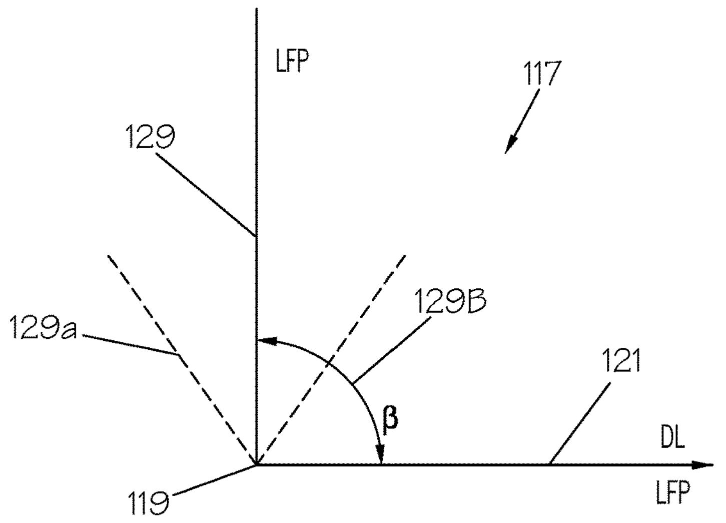
FIG. 23 illustrates a diagram illustrating an example liquid channel and its liquid flow path.

The needle receiving channel portion 121 is adapted to receive a straight fluid needle 109 of a receiving station when inserted through the liquid interface 115. The needle receiving portion 121 is at angles with the reservoir connecting portion 129 to allow liquid to first flow from the reservoir 133 to the interface structure 105 and then along a curve towards the liquid input 124 of the liquid channel 117. The angle β between central axes of the reservoir connecting channel portion 129 and the needle receiving channel portion 121 may be approximately straight, as seen in a direction along the third interface dimension d3, as diagrammatically illustrated in FIG. 23. For example, in an approximately horizontally installed supply apparatus with a downwards protruding interface structure 105 the reservoir connecting portion 129 may have an approximately vertical central axis and the needle receiving portion 121 may have an approximately horizontal central axis. In other examples the angle β may be different, for example between 45 and 135 degrees, as shown by the dotted lines 129*a*, 129*b* that illustrate potentially differently inclined central axes of the reservoir connecting portion 129*a*, 129*b* with respect to the needle receiving liquid channel portion 121. The reservoir connecting liquid channel portion 129 may project from the interface structure 105 to connect to the reservoir 133.

Figure 24:
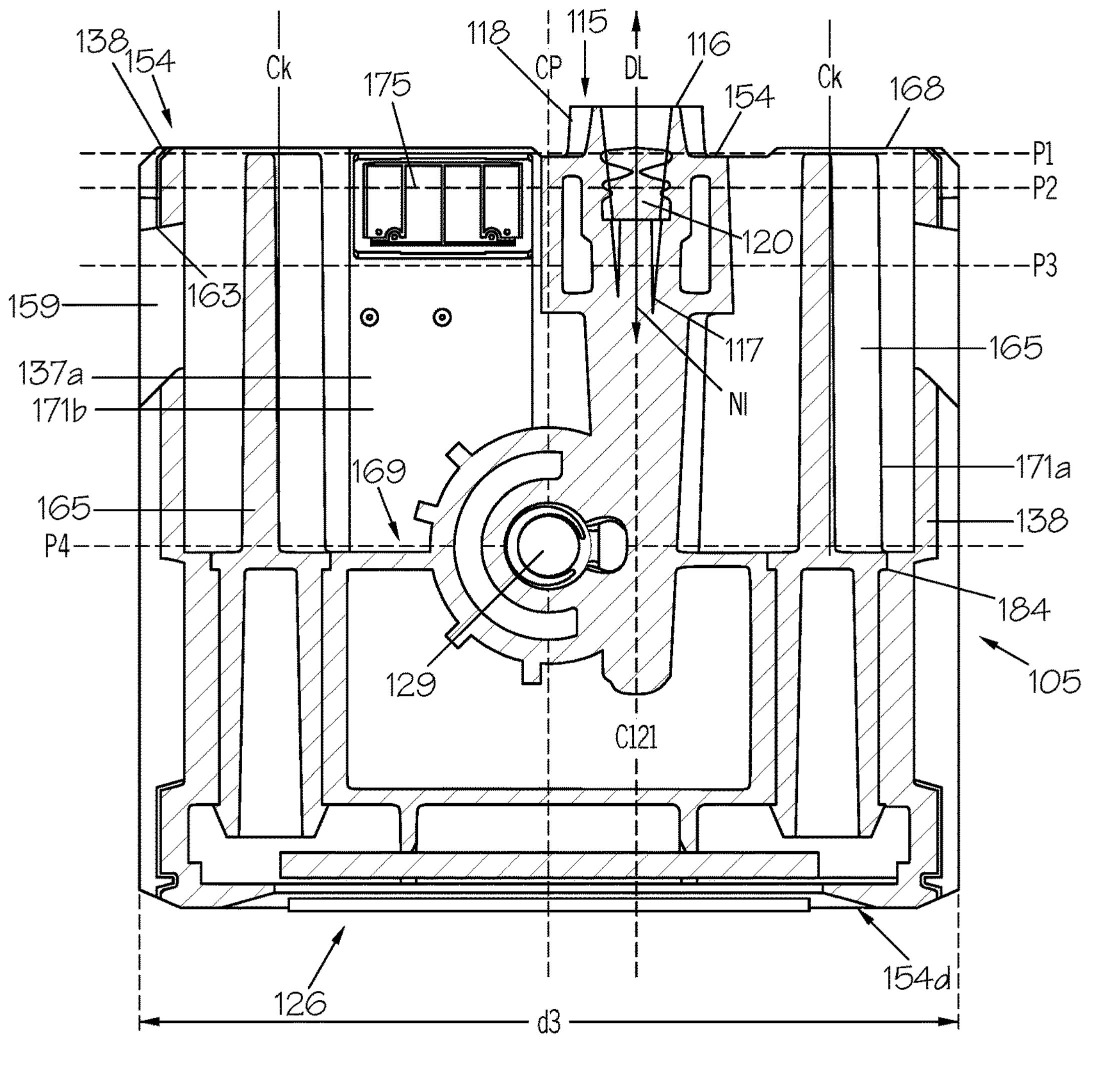
FIG. 24 illustrates a cross sectional top view of an example interface structure.

In a further example, the needle receiving portion 121 is laterally offset from the reservoir connecting portion 129 along the direction of the third interface dimension d3, as can be seen in FIGS. 22 and 24. For example central axes of the needle receiving channel portion 121 and the reservoir connecting channel portion 129 may extend in different reference planes C121, CP, respectively, each of these planes C121, CP being (i) parallel to the first and second interface dimensions d1, d2, and (ii) offset with respect to each other. The lateral offset distance of the channel portions 121, 129, e.g. as measured between the planes C121, CP, can be approximately the sum of the channel radii of the reservoir connecting channel portion 129 and the needle receiving channel portion 121. In the illustrated example a central axis of the reservoir connecting channel portion 129 extends approximately in the center plane CP of the interface structure 105, wherein the needle receiving channel portion 121 is offset and parallel with respect to the center plane CP of the interface structure 105.

Off centering the needle receiving channel portion 121 with respect to the center plane CP may facilitate a larger recess 171*b* next to the needle receiving channel portion 117 which in turn facilitates housing the integrated circuit and contact pads 175 and respective key pen 165, and the corresponding insertion of the data connector 173 and the key slot housing component 170. The integrated circuit contact pads 175 and the liquid interface 115 may be disposed on laterally different sides of the center plane CP.

The explained aspects of the dimensions, positions and orientations of the different interface components in the interface structure 105 may facilitate relatively small-width and low-height profile interface structure 105, e.g. with relatively small first and third interface dimensions d1, d3, which in turn may facilitate compatibility with a relatively wide range of different container liquid volumes and different print systems. For example a first dimension d1 versus third dimension d3 (e.g. height versus width) aspect ratio of the projecting portion of the interface structure 105 can be less than 2:3, or less than 3:5, or less than 2:5, or less than 3:10, for example approximately 1.3:4.8, respectively. For example, a first dimension d1:second dimension d2 (e.g. height:length) aspect ratio of the projecting portion of the interface structure 105 can be less than 2:3, or less than 3:5, or less than 2:5, or less than 3:10, for example approximately 1.3:4.3, respectively. In one example said first dimension d1 is between approximately 10 and 15 mm. A relatively small first dimension d1 of the projecting portion of the interface structure 105 may facilitate connecting an interface structure 105 to mount to both relatively large volume containers 103 such as more than 500 ml as well as to relatively small volumes such as for example approximately 100 ml or less. Reservoir volumes may include at least 50 ml, 90 ml, 100 ml, 200 ml, 250 ml, 400 ml, 500 ml, 700 ml, 1 L, 2 L, 3 L, 5 L, etc.

Also, the small interface dimension d1 may facilitate relatively efficient stacking and transport of the supply apparatuses 101. In certain examples the ratio of the first dimensions D1:d1 of the container 103 versus the projecting portion of the interface structure 105 could be more than 5:1, more than 6:1 or more than 7:1.

Figure 25:
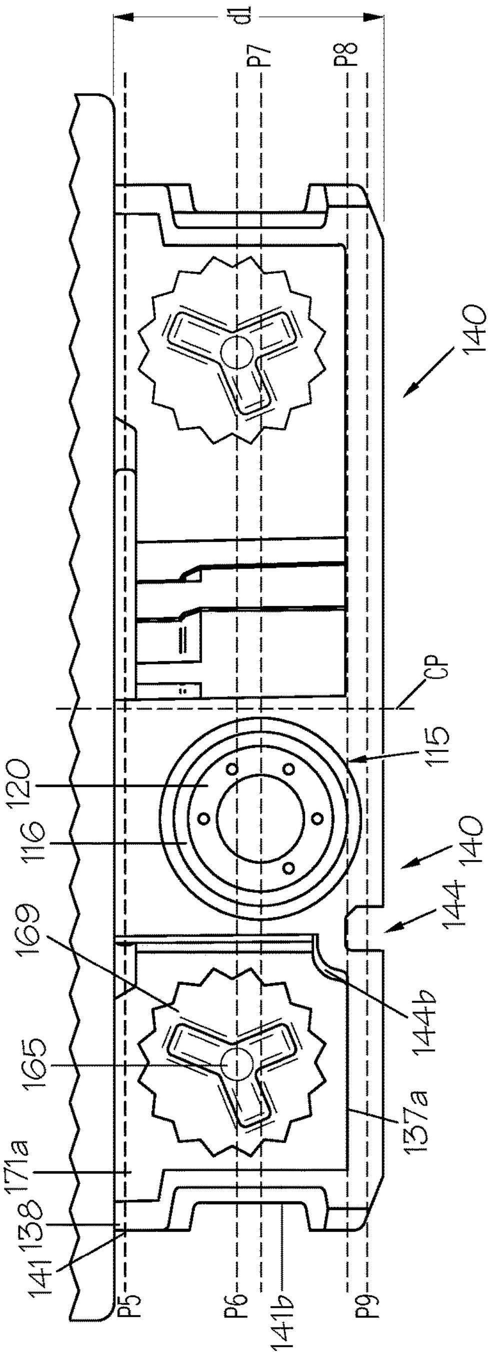
FIG. 25 illustrates a front view of the example interface structure of FIG. 24.

FIGS. 24 and 25 illustrate examples of interface structures 105 in a cross sectional top view and in a front view, respectively. FIG. 24 illustrates virtual reference planes P1, P2, P3, P4, each plane P1, P2, P3, P4 parallel to the first and third interface dimension d1, d3, and offset with respect to each other along the second dimension d2 from a front 154 to a back 126 or the interface structure 105. One or more of these virtual planes P1, P2, P3, P4 can be used to describe the relative position and shape of the different interface components of the interface structure 105.

In the illustrated example of FIG. 24, the first plane P1 tangentially touches or intersects at least one of the interface front 154 and the key pen 165. In one example, the interface front 154 comprises an approximately straight surface whereby the surface extends approximately parallel to the first plane P1 and the first plane P1 touches the interface front 154. In a further example the first plane P1 intersects or touches the key pen 165 near or through its distal actuating surface area 168. In another example the key pen may include an extended pen portion that protrudes beyond the interface front 154 whereby the first plane P1 intersects the extended pen portion. In yet another example the key pen stops short of the interface front 154 whereby the first plane P1 does not touch or intersect the key pen. In the illustrated example, the first plane P1 does not touch or intersect the integrated circuit contact pads 175 but in another example the contact pads 175 could be moved somewhat and the first plane P1 could touch or intersect the contact pads 175.

The second plane P2 is provided parallel to the first plane P1, and away from the front 154 along the needle insertion direction NI. For example, the second plane P2 is provided at a distance from the interface front 154 and/or the key pen actuating surface areas 168. The second plane P2 intersects, along the third interface dimension d3, from left to right in the figure, at least, one of the lateral side walls 139, the support wall 137*a*, one of the recesses 171*b*, one of the key pens 165, the array of integrated circuit contact pads 175, the needle receiving liquid channel portion 121 (for example including the seal 120), another one of the recesses 171*a*, another one of the key pens 165 and another one of the lateral side walls 139. In an example the lateral side walls 139 include lateral guide features 138 and the second plane P2 intersects these lateral guide features 138. In another example, the support wall 137*a* includes the intermediate guide feature 140 (not visible in FIG. 24) and the second plane P2 intersects the intermediate guide feature 140. The intermediate guide feature 140 may be provided under the first recess 171*a* and next to the liquid throughput 117 opposite to the second recess 171*b*. Most or all of said interface features may be integrally molded portions of a single molded, monolithic interface structure 105, while for example the key pens 165 and seal 120 may form separate plug-in components, although the pens 165 could be integrally molded with the rest. The integrated contact pads 175 may form part of separate elements of an integrated circuit that stores and controls certain print related functions, that is separately adhered to an inner surface of the support wall 137*a* of the interface structure 105, in the second recess 171*b*. In use, the contact pad contact surfaces face the container 103, and the contact pads 175 are disposed in the respective recess 171*b* on the inside of the support wall 137*a*, between the liquid channel 117 and one of the key pens 165. The integrated circuit 174 may be separately assembled to the integrally molded, monolithic structure, for example by adhering a carrier board of the circuit to the support wall 137*a*.

The third plane P3 is provided parallel to the second plane P2, offset from the second plane along the needle insertion direction NI, further distanced from the interface front 154 than the second plane P2, and intersects, along the third interface dimension d3, from left to right in the figure, at least, a clearance 159, one of the recesses 171*b*, one of the key pens 165, the liquid channel 117 (for example the needle receiving channel portion 121), another one of the recesses 171*a*, another one of the key pens 165 and another clearance 159. The third plane P3 may intersect portions of the lateral side walls 139 and the support wall 137*a*. For example, the third plane P3 is provided at a distance from the integrated circuit contact pads 175. The third plane P3 may also be provided at a distance from the seal 120. In an example the lateral side walls 139 include lateral guide surfaces 141, 145 and the third plane P3 intersects these lateral guide surfaces 141, 145, wherein the lateral guide surface may include first and second lateral guide surfaces 141, 145 as explained elsewhere in this disclosure. In another example, the support wall 137 includes the intermediate guide feature 140 (not visible in FIG. 24) and the third plane P3 intersects the intermediate guide feature 140. The intermediate guide feature 140 may be provided next to the liquid throughput 117 and under the first recess 171*a*. In other examples only one or none of the two clearances 159 are provided.

As illustrated in FIG. 24, a center plane CP may intersect the interface structure 105 through a middle of the third interface dimension d3 and may extend parallel to the first and second interface dimensions d1, d2. The center plane CP may also intersect the container 103 through a middle of the third container dimension D3. The center plane CP may intersect the interface front 154 and the liquid interface 115. The integrated circuit contact pads 175 may be provided on one side of the center plane CP, and the needle receiving liquid channel portion 117 and liquid interface 115 are provided on the other side of the center plane CP. Key pens 165 may be provided on opposite sides of the center plane CP. The second recess 171*b*, that houses the integrated circuit contact pads 175, is larger than the first recess 171*a*. The center plane CP may intersect part of the second recess 171*b* so that most of the second recess 171*b* extends on the opposite side of the center plane CP with respect to the first recess 171*a*.

The fourth virtual plane P4 is provided parallel to the third plane P3 further removed from the front 154 along the needle insertion direction NI. The fourth plane P4 intersects, along the third interface dimension d3, the lateral side walls 139, the support wall 137*a*, and the reservoir connecting portion 129 of the liquid channel 117. In a further example, the fourth plane P4 also intersects an intermediate portion 119 of the liquid channel 117. The reservoir connecting portion 129 of the liquid channel 117 may include an at least partly cylindrical wall (e.g. see FIG. 26) around a second central axis parallel to the first interface dimension d1, the central axis indicated in FIG. 24 by the intersection of the center plane CP and the fourth plane P4. The fourth plane P4 may extend along the base walls 169, for example near the base walls 169 at approximately 0 to 5 or 0 to 3 mm from the base walls 169. The fourth plane P4 may be provided at a distance from the contact pads 175, seal 120 and clearance 159.

FIG. 24 also illustrates the generally rectangular contour of the interface structure 105, along its second and third interface dimension d2, d3. The generally rectangular contour may be defined by a front edge of the distal side 137, a back 126, and two opposite lateral sides 139. The front edge of the distal side 137 and/or a back 126 may include an approximately straight outer edge or surface approximately parallel to the third interface dimension d3. The lateral sides 139 may include approximately straight edges or surfaces approximately parallel to the second interface dimension d2, such as first lateral guide surfaces 141. The extents of the rectangular contour may be approximately 5 cm or less along the third interface dimension d3 and/or approximately 6 cm or less along the second interface dimension d2, for example 48 and 43 mm, respectively.

FIG. 25 illustrates the example interface structure 105 of FIG. 24 intersected by virtual reference planes P5, P6, P7, P8, P9 each parallel to the second and third interface dimension d2, d3, and offset with respect to each other along the first dimension d1, in a projection direction of the interface structure 105, that is, each plane closer to the distal side 137 of the interface structure 105. In the direction towards the distal side 137, the planes include, respectively, a fifth plane P5, a sixth plane P6, a seventh plane P7, an eighth plane P8, and a ninth plane P9, respectively.

The fifth plane P5 intersects the edge 154*b* of the interface front 154, and for example a protruding reservoir connecting portion 129 of the liquid channel 117. For example, the fifth plane P5 may further intersect at least one of the lateral side walls 139, the recesses 171*a*, 171*b*, and the bases 169 of the recesses 171*a*, 171*b* and keys 165. The fifth plane P5 may intersect a first lateral guide surface 141, 141*b*, for example an outer first lateral guide surface 141. The fifth plane P5 may extend at a distance from the key pens 165, for example at least at a distance from the actuating surface area 168 of the key pens 165 and/or at a distance from the edge 116 of the liquid interface 115.

The sixth plane P6 intersects the lateral side wall 139, one of the recesses 171*a*, the key pen base 169, one of the key pens 165, the needle receiving liquid channel portion 121 at a distance from the central axis of the liquid interface 115 and/or needle receiving portion 121, the seal 120 above its central axis, the second recess 171*b*, another key pen base 169, the other key pen 165 and the other lateral side wall 139. Said central axes may extend in the middle of the seal 120 straight into the drawing. In the illustrated example, the sixth plane P6 intersects the key pens 165 through their central axes Ak that extend at a straight angle with the base 169 of the key pen 165, through the middle of the key pen 165, along the length of the key pen 165. The sixth plane P6 may intersect a first lateral guide surface 141, 141*b*, for example an inner first lateral guide surface 141*b*, and/or the clearance 159 and/or the stop 163.

The seventh plane P7, at a distance from the sixth plane P6, intersects the lateral side wall 139, one of the recesses 171*a*, the key pen base 169, one of the key pens 165, a central axis of the liquid interface 115 and the needle receiving portion 121 of the liquid channel 117, the second recess 171*b*, another key pen base 169, another key pen 165 and the other lateral side wall 139. The seventh plane P7 may intersect the first lateral guide surface 141, 141*b*, for example the inner first lateral guide surface 141*b*, and/or the clearance 159 and/or the hook stop 163. The seventh plane P7 may extend at a distance from the central axes of the key pens 165. The fifth, sixth and seventh plane P5, P6, P7 extend at a distance from the integrated circuit contact pads 175.

In other examples, the key pens 165 could be moved downwards in the drawing of FIG. 25, as compared to how he key pens 165 are currently positioned in the drawing, so that the central axes Ak of the key pens 165 would be intersected by (i) the same plane, or (ii) a plane at the other side of, the plane that intersects the central axes of the liquid interface and needle receiving channel portion. In the first example the central axes of the key pens and liquid interface would be at the same level along the first interface dimension d1.

The eighth plane P8, at a distance from the seventh plane P7, intersects the integrated circuit contact pad array 175 and/or rest of the integrated circuit 174. The eight plane P8 may extend adjacent, and/or just touching, the support wall 137*a* that defines the external distal side 137 of the interface structure 105. The support wall 137*a* supports the integrated circuit 174. The integrated circuit contact pads 175 may have contact surfaces extending, at least approximately, in and/or parallel to said eighth plane P8. The contact surfaces may be planar whereby the planes of the contact surface may approximately extend in said eight plane P8, although it will be understood that these surfaces are in practice not exactly planar so that some deviation of portions of the contact surfaces from the eight plane P8 may be taken into account. In one example the integrated circuit contact pads 175 are part of a circuit that is provided in a relatively shallow cutout in the inner support wall 137*a*, whereby the eighth plane P8 may also intersect or touch the support wall 137 at lateral sides of the contact pads 175. The eighth plane P8 may extend at a distance from the key pens 165. Depending on the size and shape of the liquid interface edge 116, the eighth plane P8 may approximately tangentially touch or intersect the liquid interface edge 116, or may be slightly distanced from that edge 116. The eighth plane P8 intersects the lateral sides 138. The eighth plane P8 may intersect a wall or rib 144*b* extending along, and partly defining, the intermediate guide slot 144, the wall or rib 144*b* protruding into the respective recess 171*a*.

The ninth plane P9 extends at a small distance from the eighth plane P8, and intersects the support wall 137*a* at a distance from the contact pads 175, whereby the wall 137*a* supports the integrated circuit contact pads 175 and/or the integrated circuit 174 and defines the distal side 137. The ninth plane P9 may intersect the intermediate guide feature 140, here embodied by the guide slot 144. The ninth plane P9 extends at a distance from the key pens 165, the liquid interface edge 116, and the needle receiving liquid channel portion 121. The ninth plane P9 extends adjacent the external surface of the distal side 137 of the interface structure 105.

As illustrated, the interface structure 105 can be defined by a series of virtual planes P5-P9 that are parallel to the second and third dimension d2, d3 of the interface structure 105, including (i) an intermediate plane P6 or P7 that intersects the liquid interface 115, and the recesses 171*a*, 171*b* and respective key pens 165 at both sides of the liquid interface 115, (ii) a first offset plane P8, P9, parallel to and offset from the intermediate plane P6 in the projection direction of the interface structure 105, the first offset plane P8, P9 intersecting a support wall 137*a* that supports the integrated circuit and/or an integrated circuit contact pad array 175, said contact pad array extending along a line parallel to that plane P8, P9 and the third interface dimension d3, and (iii) a second offset plane P5 parallel to and offset from the intermediate plane P6 or P7 in a direction opposite to the projection direction of the interface structure 105, the second offset plane P5 intersecting the interface front edge 154*b* of the interface structure 105 at a distance from the liquid interface 115, and intersecting a reservoir connecting liquid channel portion 129 that connects to the liquid supply container 103. The first offset plane P8, P9 and second offset plane P5 extend (i) at opposite sides of the intermediate plane P6 or P7, (ii) at a distance from the key pens 165, and (iii) at a distance from inner walls of the needle receiving channel portion 121. The inner walls of the needle receiving channel portion 121 extend between the offset planes P5, P9. In the illustrated example the offset planes P5, P9 also extend at a distance from the liquid interface edge 116, which in one example is defined by edges for the interface front 154 in which the seal 120 is inserted. When the interface structure 105 is attached to the container 103, these planes P5, P6 or P7, P8 may extend parallel to the container side 113 from which the interface structure 105 projects. As explained, the interface structure 105 may be of relatively low profile, whereby the distance between the opposite offset planes P5, P9 may be between less than approximately 20 mm, less than approximately 15 mm, less than approximately 13 mm, or less than approximately 12 mm, approximately corresponding to the extent of the first interface dimension d1 which may correspond the height of the projecting portion of the interface structure 105. In further examples the intermediate plane P6 or P7 intersects the clearance 159 and/or the stop 163 and/or the lateral guide features 138. The offset planes P5, P9 may be provided at a distance from the clearance 159.

Figure 26:
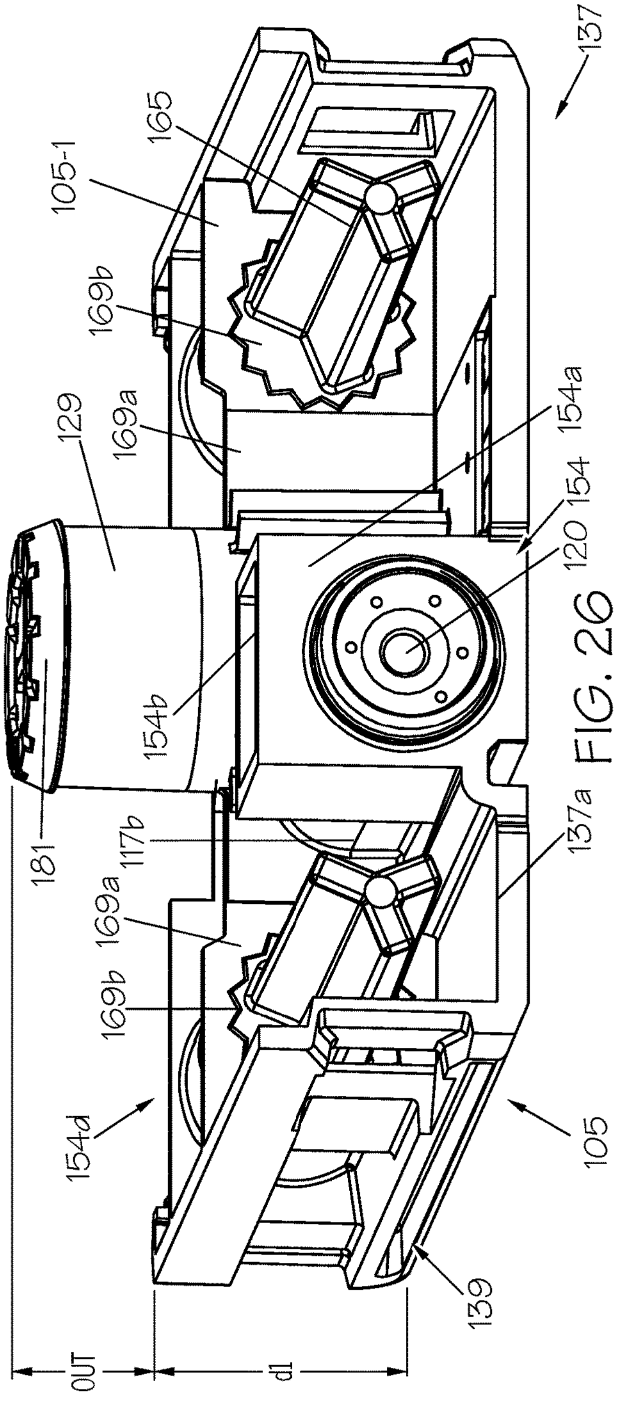
FIG. 26 illustrates a perspective view on an example interface structure.

FIG. 26 illustrates a separate interface structure 105. The interface structure 105 comprises a single relatively rigid molded plastic base structure 105-1, whereby for example the key pens 165 and seal 120 may be separate components, for example plugged into corresponding complementary holes and a channel, respectively. Further separate components may be assembled to the single relatively rigid molded plastic structure, such as a channel connector component 181 to connect to the reservoir 133.

As can be seen the lateral sides 139 project from the support wall 137*a* in a direction of the first dimension d1. The external side of the support wall 137*a* is referred to as distal side 137 elsewhere in this disclosure. The explained projecting components project from the internal side opposite to the external side 137. The support wall 137*a* and its external side 137 generally extend parallel to the second and third interface dimensions d2, d3. The liquid channel 117 may be part of a protruding structure protruding from the support wall 137*a* in the direction of the first interface dimension d1 along the second interface dimensions d2, the structure including the tubular liquid channel wall 117*b* and a block that defines the front push area 154*a* and liquid interface 115. Said structure of the liquid channel 117 extends between the recesses 171, 171*b*. The bases 169*a*, 169*b* of the recesses 171*a*, 171*b* and/or key pens 165 may also project from the wall 137*a* in the direction of the first interface dimension d1. Each recess 171*a*, 171*b* extends between said liquid channel structure, a lateral side wall 139 and the base 169*a*, 169*b*. Further walls, such as a back wall 154*d* may also project from the support wall 137*a* in the direction of the first interface dimension d1.

The reservoir connecting channel portion 129 includes a channel connector component 181 to connect or seal to the reservoir 133. The reservoir connecting channel portion 129 protrudes in a direction parallel to the first dimension d1, for example at a straight angle with the main liquid flow direction DL or needle insertion direction NI, to connect to a liquid reservoir 133. The reservoir connecting channel portion 129 may include a cylindrical liquid channel extending partly inside and partly outside of the first interface dimension d1, with the connector component 181 at its upstream end, for example to further facilitate connecting to the reservoir 133 inside the support structure 135. As illustrated, the protruding reservoir connecting channel portion 129 protrudes outside of the extent of the first interface dimension d1, by a certain extent OUT, to pass through an opening 113A (FIG. 22) in a respective support structure side 113.

In other examples (not illustrated) the reservoir connecting liquid channel portion 129 may not protrude beyond the height of the interface structure 105, fully extending inside the first interface dimension d1, whereby for example the reservoir-side interconnect element 134 may extend through the support structure opening 113A at least partly into or up to the interface structure 105 to fluidically connect to the liquid channel 117.

The connector component 181 and/or the liquid interconnect element 134 may include a ring, neck, screw-thread or the like, as illustrated in both FIGS. 22 and 26. The connector component 181 and/or the liquid interconnect element 134 may connect to the reservoir connecting liquid channel portion 129 and a neck of the reservoir 133, respectively. The internal diameters of the connector component 181, liquid interconnect element 134 and reservoir neck may correspond. An internal diameter of the liquid interconnect element 134 and/or reservoir neck is smaller than total width of the reservoir 133 along the third container dimension D3. For example, the internal diameter may be less than half the width of the reservoir 133. In some examples (such as FIGS. 46, 47), the neck of the reservoir 133 may be relatively small as compared to the dimensions of the reservoir 133.

The first interface dimension d1 may be defined by a distance between an outer edge of the distal side 137 and the front edge 154*b*. Also, opposite edges of the lateral side 139 may approximately define the first interface dimension d1.

As illustrated in FIG. 26, the single molded structure may be open opposite to the support wall 137. For example, the recesses 171*a*, 171*b* of the interface structure 105 are open opposite to the support wall 137*a*, whereby in assembled condition the respective container side 113 closes that opening to form a recess wall opposite to the support wall 137*a*.

The lateral walls 139 and support wall 137*a* terminate at edges at the front 154 of the interface structure 105. The edges extending at the entrance of the recesses 171*a*, 171*b*, whereby a proximal and distal front edge 154*b*, 154*c* may is provided adjacent the liquid interface 115.

The recesses 171*a*, 171*b* are each provided with a base 169*a*, 169*b*, which may also be the base 169*a* of the respective key pen 165. The base 169*a*, 169*b* forms an inner wall of the recess 171*a*, 171*b*, extending between a liquid channel wall 117*b* and the lateral side walls 139. The base 169*a*, 169*b* may extend parallel to the third interface dimension d3. The base 169*a*, 169*b* may be defined by a wall parallel to the first and third interface dimensions d1, d3. The base 169*a*, 169*b* is offset in a direction backwards (opposite to the main flow direction DL) with respect to the interface front 154, wherein the offset distance may be approximately the same as the length of the key pens 165. In other examples the base 169*a*, 169*b* may be offset further backwards than as shown in the drawing and the key pen length may be correspondingly extended such that the actuating end area 168 of the pen is approximately aligned with the liquid interface edge 116. In a further example the base 169*a*, 169*b* may be an inner wall that is offset from a back wall 154*d* of the interface structure 105 in a direction inwards along the second interface dimension d2. Space 154*d* may be provided between the back wall 154*d* and the base 169*a*, 169*b*, for example for click fingers of the key pen 165.

Figure 27:
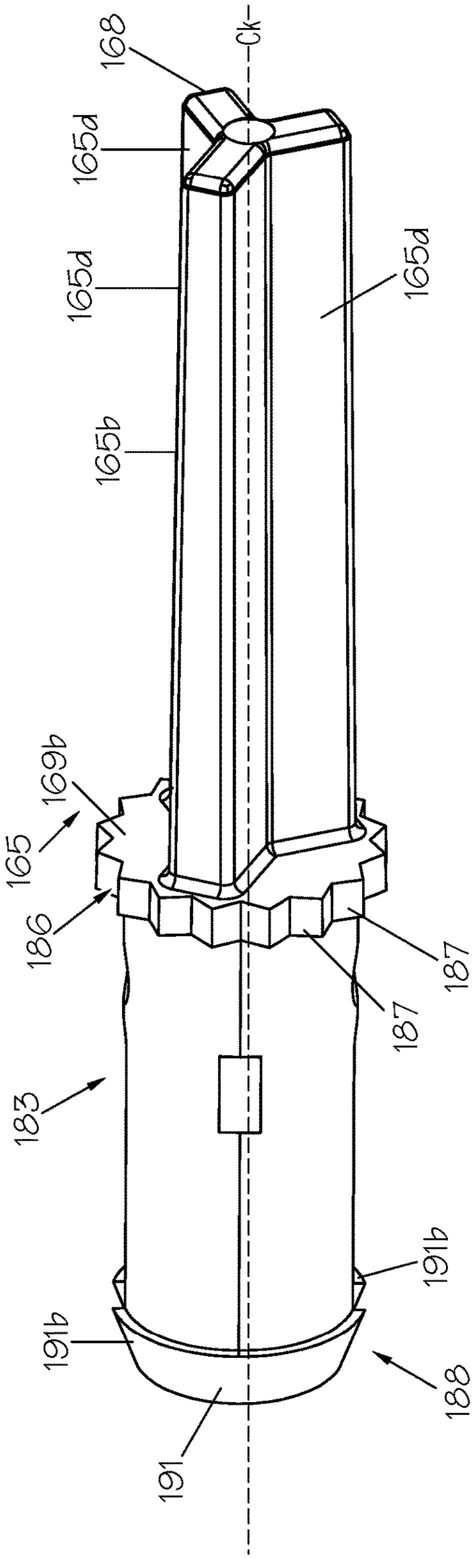
FIG. 27 illustrates a perspective view on an example key pen.

FIG. 27 illustrates an example of a key pen 165, attachable to a base wall 169*a* of a corresponding interface structure 105. The key pen 165 includes a protruding longitudinal key pen portion 165*b* of at least approximately 10 mm, at least approximately 12 mm, at least approximately 15 mm, at least approximately 20 mm, or approximately 23 mm, extending from the key pen base 169*b* up to the key pen actuating surface area 168. In use, the protruding longitudinal key pen portion 165*b* may protrude from the key pen base 169*b*, along a pen axis Ck of the key pen 165, the pen axis Ck extending in an insertion direction which may be parallel to the main liquid flow direction DL. In the illustrated example, the pen axis Ck extends at a straight angle with the key pen base 169*b* and parallel to the second interface dimensions d2. The key pen base 169*b* may form part of the base 169*a*, 169*b* of the recess 171*a*, 171*b* when the key pen 165 installed in the interface structure 105.

In this disclosure, when referring to a "base" of the key pen, a base of the key pen may refer to any base wall portion adjacent the key pen and from which the key pen protrudes, at least a condition where the key pen is assembled to its respective base wall. Such base could in one example be an integrally molded portion 169*b* of the key pen, or in another example a portion that is separately molded from the key pen. In disassembled condition of the key pen the base may refer to a base portion 183 of the disassembled key pen from which the rest of the key pen protrudes towards its actuating surface area 168, for example such as illustrated in FIG. 27. In examples where the key pen is integrally molded with a base wall 169 of the recess 171*a*, 171*b*, or where the key pen is pre-assembled to such base wall 169, any base wall portion 169, 169*a*, 169*b* adjacent the key pen from which the key pen protrudes may define the base of the key pen.

At installation (e.g. see FIG. 21), the protruding longitudinal key pen portion 165*b* may at least partially protrude inside the key slot housing component 170 over a pen insertion distance of at least 10 mm, 12 mm, 15 mm, or 20 mm. The pen insertion length should be sufficient to activate the actuator. For example, the pen insertion length includes a first distance to engage a transmission mechanism (e.g. rod 179), for example 1.5 mm, and a second distance to further push the transmission mechanism for actuation, for example, actuating upon a switch or hook 161. The second distance could be at least 8.5 mm, at least 10.5 mm, at least 13.5 mm, at least 18.5 mm, etc. The total length of the key pen 165 between the base 169, 169*a*, 169*b* and the distal actuating surface area 168 should span at least that pen insertion distance.

Figure 28:
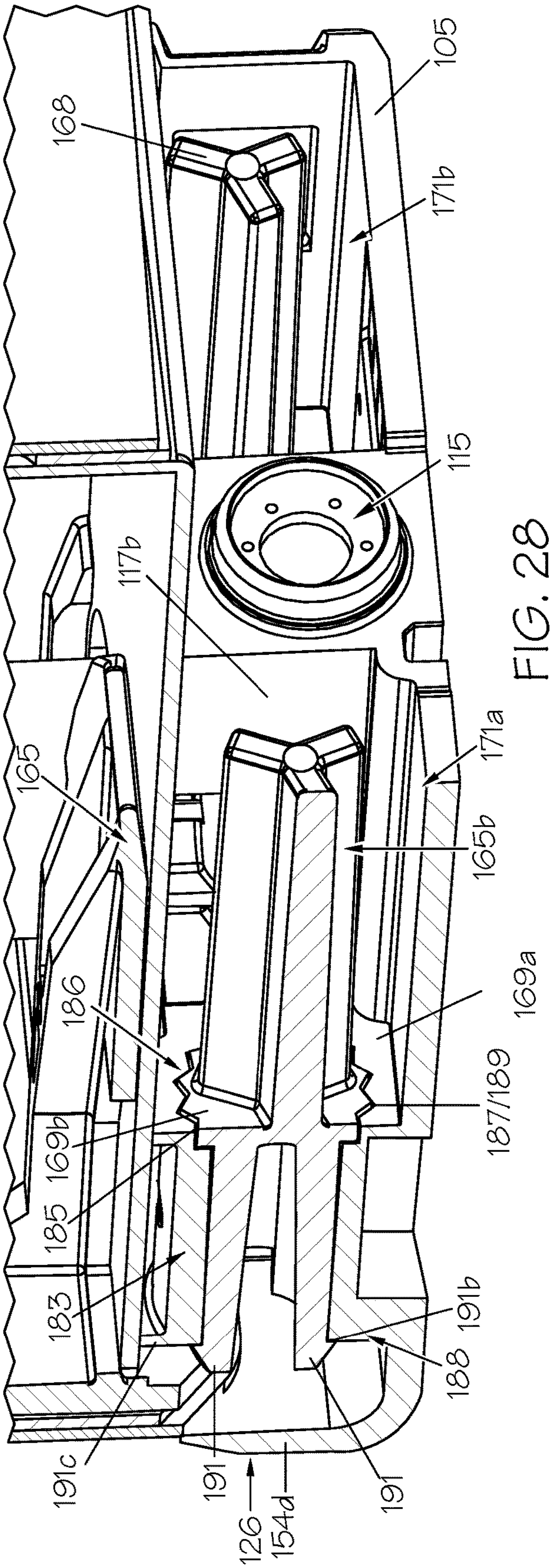
FIG. 28 illustrates a cross sectional perspective view on an example liquid supply apparatus.
Figure 29:
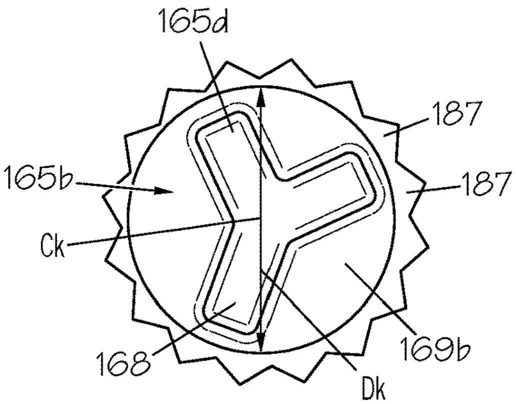
FIGS. 29-32 illustrate front views of an example key pen in different rotational orientations.
Figure 30:
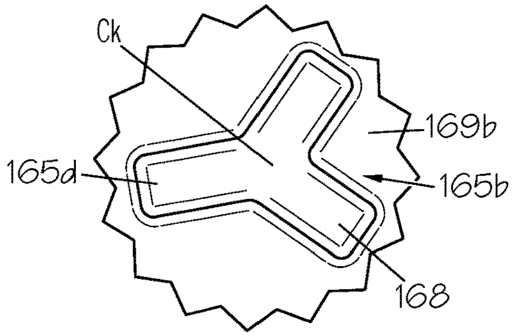
Figure 31:
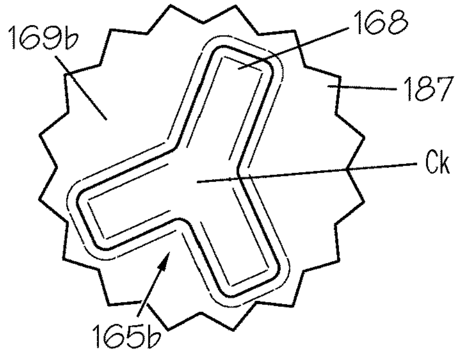
Figure 32:
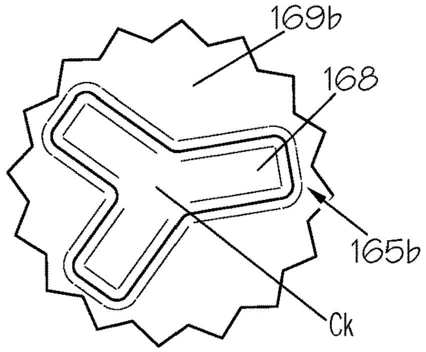

FIG. 28 illustrates an example of a key pen 165 inserted in an interface structure 105. As can be seen the key pen base 169*b* is defined by a base portion 183 that in use is inserted in the interface structure 105, co-defining the base 169*a*, 169*b* of the longitudinal key pen portion 165*b*. The base portion 183 may be substantially cylindrical or differently shaped, extending along the longitudinal axis Ck, backwards from the key pen base 169*b*. The pen axis Ck may extend through the center of the cylindrical base portion 183.

In an example, the base portion 183 and the longitudinal key pen portion 165*b* form an integrally molded single piece. The base portion 183 is inserted in a corresponding pen base hole 185 of the interface structure 105. The pen base hole 185 is provided in the base wall 169*a* of the respective recess 171. The base wall 169*a* extends next to the liquid throughput 111, offset with respect to the liquid interface 115 along the needle insertion direction. In the illustrated example the key pen base 169*b* is approximately leveled with the surface of the surrounding base wall 169*a*, the key pen base 169*b* and base wall 169*a* together forming the base of the respective recess 171*a*, 171*b*. The longitudinal key pen portion 165*b* protrudes in the main liquid flow direction DL approximately up to a level of the liquid interface 115, for example less than approximately 5 mm from, or approximately level with, the liquid interface edge 116 along the second interface dimension d2. The longitudinal key pen portion 165*b* may extend over a length KL (e.g. see FIG. 21) from the base 169*a* of at least approximately 15, at least approximately 20, or approximately 23 mm. The interface structure 105 includes a pair of pen base holes 185 for a corresponding pair of key pens 165, at opposite sides of the liquid channel 117, in the recess base 169*a*.

In one example, the base portion 183 includes at least one datum 187 to facilitate correct positioning of the key pen 165 in the pen base hole 185 of the interface structure 105 of the supply apparatus 101. The key pen datums 187 may facilitate determining and fixing a rotational orientation of the key pen 165 with respect to the base wall 169*a*. In turn, the base 169*a* may include at least one counter datum 189 at the pen base hole 185. The number of datums 187 of the key pen 165 and/or counter datums 189 of the key pen hole 185 may determine the maximum number of predetermined rotational orientations.

Examples of different predetermined rotational orientations of the key pen 165 are illustrated in FIGS. 29-32. Each predetermined rotational orientation of the key pen 165 in the interface structure 105 may be associated with a correspondingly shaped key slot 167 of a corresponding receiving station 107. Hence, each rotational orientation can be associated with a specific color or type of print liquid in the container 103. A plurality of datums 187 may be provided directly at the base 169*b* of the key pen 165, around the base portion 183 in a plane parallel to the first and third interface dimensions d1, d3. In turn, the pen base hole 185 may include at least one counter datum 189 to facilitate aligning the at least one key pen datum 187 to the at least one counter datum 189.

Figure 33:
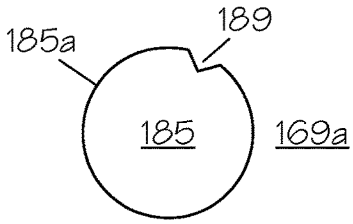
FIG. 33 illustrates a diagram of an example of a base hole in a base wall.

In the illustrated example, the base portion 183 and the base wall 169*a* both include a plurality of matching datums 187, 189. In other examples, the number of datums 187 on the key pen 165 can be different than the number of counter datums 189 on the base wall 169*a* while still facilitating the predetermined number of rotational orientations of the key pen 165. In one example the base wall 169*a* includes only one datum 189, and the corresponding key pen 165 includes a plurality of datums 187, or vice versa, the key pen 165 includes only one datum 187 and the base wall 169*a* includes a plurality of datums 189. In examples that use a plurality of datums 187 and/or counter datums 189, these datums 187, 189 can be provided at regular positions, for example at equal distances from each other around a circle. In the illustrated examples the datums 187 and counter datums 189 are embodied by teeth, whereby each key pen datum tooth is associated with a correspondingly shaped space between adjacent counter datum teeth. Correspondingly, FIGS. 29-32 illustrate orientations of an example key pen 165 with pluralities of datums 187 around the key pen 165, wherein the datums 187 are in the form of teeth, while FIG. 33 illustrates a pen hole 185 in a base 169*a* with only a single counter datum 189, here also in the shape of a tooth that is to engage between two key pen datum teeth 187. The distal ends of the key pen datum teeth 187 will engage the internal edge 185*a* of the pen hole 185 also where there are not counter datum teeth. This to illustrate that the rotational orientation of the key pen 165 can be chosen and fixed with different numbers of datums 187, 189.

Figure 34:
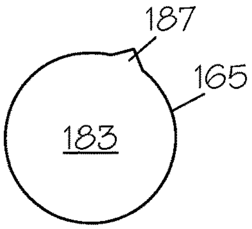
FIG. 34 illustrates a diagram of a cross section of an example key pen base portion.

According to the same principle, the key pen base portion 183 could be provided with only a single datum 187 as illustrated in FIG. 34 whereby the pen hole 185 may be provided with a plurality of counter datums 189. The key pen 165 may be aligned in predetermined rotational orientation by aligning its datum tooth 187 between two counter datums 189 of the pen hole 185.

In other examples, the datums 187 and/or counter datums 189 could be defined by visual marks, other marks, corners, ribs, cuts, cut outs, undulations, or other suitable features, whereby again the opposite datum and counter datum may be provided in different suitable numbers. In further examples outer edges of the base portion 183 and/or inner edges of the pen hole 185 may have the contour of a polyhedron having three, four, six, twelve or any number of faces around the longitudinal pen axis Ck, to similarly allow for a predetermined number of different rotational orientations of the key pen 165 with respect to the base wall 169*a*, whereby in this disclosure the outer faces and corners of the polyhedron may be considered datums 187, 189, respectively.

In one example the key pen 165 and/or base wall 169*a* include at least twelve datums, which would facilitate attaching the same key pen 165 in at least twelve different rotational orientations, with respect to the base wall 169*a*, and in turn associating the same interface structure features with twelve different liquid types. In other examples, for example six, three, sixteen, twenty-four or different numbers of datums 187 and/or counter datums 189 could be used, for example for association with different numbers of liquid types.

In one example, the base portion 183 includes a flange or disc 186 that defines the key pen base 169*b*, from which the rest of the cylindrical base portion 183 extends backwards, along the needle insertion direction, and the longitudinal key pen portion 165*b* protrudes forwards from the disc 186, along the main liquid flow direction DL in assembled condition. In one example, the pen axis Ck approximately intersects the middle of the disc 186. The disc 186 is adapted to fit in the key pen base hole 185 in the recess base 169*a*. The disc edge may include the datum teeth regularly positioned around the disc edge and at equal distances from each other, as described earlier. In assembled condition a back of the disc 186 and the datum teeth, at the opposite side of the disc 186 with respect to the key pen base 169*b*, may support against a disc support surface 184 in a wall that defines the recess base 169*a*, best illustrated in FIGS. 21 and 24. The support surface 184 is recessed in the recess base 169*a* to facilitate positioning of the pen base 169*b* (e.g. the disc 186) and counteracts against an inward pushing force of the key pen 165 on the support surface 184 for example when the key pen 165 pushes against an opposite actuator such as the rod 179.

In further examples, the base portion 183 includes at least one snap finger 191 at its back end 188 to plug and snap the key pen 165 to the interface structure 105. In the illustrated example, the back end 188 of the base portion 183 includes two opposite snap fingers 191, best seen perhaps in FIGS. 27 and 28. The snap fingers 191 may include abutting edges 191*b* that abut against a further support wall surface 191*c* of the interface structure 105, for example that is offset from the base 169*a* in a backwards direction. In the illustrated example, the support wall 191*c* extends between the base 169*a* and the back wall 154*d*. Hence, the disc 186 and the snap fingers 191 of the key pen 165, and said support surfaces 184, 191*c* of the interface structure 105, may retain or clamp the key pen 165 with respect to the interface structure 105 in both directions along the pen axis Ck. In turn, protruding datums may fix the rotational orientation of the key pen.

In other examples, the key pen 165 may be attached in a different way to a wall of the interface structure 105 or may be integrally molded with a wall of the interface structure 105. In one example, the base portion 183 may include a screw thread to screw the key pen into the base 169*b*.

The protruding longitudinal key pen portion 165*b* is adapted to provide at least one of a keying function, guiding function, and actuating function. Regarding the latter function, the key pen 165 may be adapted to actuate upon an actuator, such as at least one of a mechanical actuator and switch that are provided in the receiving station. In certain examples the protruding longitudinal key pen portion may only facilitate two of said functions, for example only guiding and actuating, not keying, or only keying and guiding, not actuating. In other examples the key pen only guides or actuates without exercising the other functions such as keying. In again another example the key pens are used for relatively precise guiding of the liquid interface 115 with respect to a liquid needle of the receiving station, whereby some or all of the guide surfaces 141, 141*b*, 145, 143, 143*b*, 147 described above may be altered or omitted.

For example, the key pen 165 is associated with a supply apparatus of a certain color or type of print liquid and is adapted to pass through a corresponding receiving key slot 167 (e.g. see FIGS. 20, 21). In a first example, a key pen 165 is shaped to pass through a key slot 167 of a first receiving station of a printer, and is to be blocked by a non-matching key slot 167 of another receiving station of the same printer to avoid color or liquid-type mixing. In a second example, a single shape key pen 165 may be adapted to pass through different key slots 167 associated with different liquids, of respective different receiving stations of the same printer, whereby the key pen 165 has only a guiding and/or actuating function but not necessarily a color/type keying function. The first example may be referred to as a discriminating key pen and the second example may be referred to as an actuating key pen or master key pen. For example, master key pens could be used for service fluids to connect to different receiving stations of a single print system, or simply for alternative supply apparatuses. Actuating key pens could be applied in supply apparatuses for monochrome print systems with only a single receiving station, for the purpose of actuating an actuator only, without needing color discrimination. Different types of key pens may be applied for different functions.

In line with the previously mentioned first example, a set of supply apparatuses 101 may be provided that includes a similar interface structure 105 and container 103 construction for each supply apparatus, wherein one of the containers 103 contains a different liquid type than another one of the containers 103 and the corresponding interface structures 105 have different key pens configurations, for example key pens 165 in different rotational orientations around the respective pen axis Ck, to inhibit installation to a receiving station that does not correspond with the particular liquid type. For example, different supply apparatuses 101 such as illustrated in FIG. 5 may include different liquids and different corresponding key pen cross-sections and/or different key pen orientations.

FIGS. 29-32 illustrate examples of key pen shapes, as viewed along the longitudinal axis Ck of the pen straight onto the key pen base 169*b*, wherein the cross-sectional key-shapes along the longitudinal key pen portion 165*b* are the same, yet the rotational orientations are different. When installed into the interface structure the plane of the cross section may be parallel to the first and third interface dimension d1, d3. Pairs of key pens may be provided in each corresponding interface structure wherein the key pens of the pair may have the same rotational orientation, or a different orientation, with respect to each other, and the key slots of the corresponding receiving stations have corresponding configurations. The different orientations of FIGS. 29-32 may be associated with different liquid types and with matching rotational orientations of corresponding key slots 167.

In the examples of these figures, each key pen cross section is in the form of a Y, for example to pass through a matching Y-shaped key slot 167. Other example cross-sectional key-shapes may be in the form of a T, V, L, I, X or one dot or a series of dots or other geometrical shapes. In this description, a V-shape includes an L-shape and an X-shape includes a +-shape, for example because the key pen 165 may be rotated. The key-shapes may match corresponding Y, V, L, I, T, X-shaped key slots shapes. For example, the cross-section of the protruding key pen portion 165*b* may correspond to a Y, V, L, I, T, X or the like, but may have interrupted portions with notches in between the actuating surface areas 168. For example, the cross-section of the protruding key pen portion 165*b* may generally follow the Y, V, L, I, T, or X-shaped contour, for example corresponding to the respective key slot 167, in either a continuous or in an interrupted fashion, whereby an embodiment that is interrupted may have separate distal actuating surface areas 168 with spaces in between. It is also noted that while the Y-shaped key pens 165 may be associated with Y-shaped key slots 167, in some instances also V- (e.g. L-), I-, or dot shaped key pens 165 may be used to pass through a Y-shaped key slot 167 while still actuating on the respective actuator such as a rod 179 and/or switch behind the key slot 167.

The longitudinal key pen portions 165*b* of FIG. 27 has three longitudinal wings 165*d* or flanges that extend along, and away from, the pen axis Ck. Each wing 165*d* defines a leg of the Y. The wings 165*d* extend along the pen axis Ck in the direction of the second interface dimension d2. The wings 165*d* extend away from each other, away from the pen axis Ck, thereby providing for the Y-shaped cross section. An intersection Ck of the three wings 165*d*, i.e. in the middle of the Y, may be located approximately on the pen axis Ck. In other examples the intersection Ck of the wings 165*d* may be offset from a center of the key pen base 169*b*, and/or offset from a pen axis Ck. Similarly, a key pen having a V-shaped cross-section may have an intersection in or near the center of the key pen base 169*b* or key pen hole 185, or away from the center.

For example, the key pen 165 includes an actuating surface area 168 to actuate upon a counterpart actuator of the receiving station, such as the rod 179 or a switch, whereby the counterpart actuator may be provided behind the key slot 167 to facilitate that only matching key pens 165 may actuate upon the actuator. The actuating surface area 168 may be provided at the distal end of the longitudinal key pen portion 165*b*. As clearly viewable from FIGS. 19, 21 and 35, in certain examples the outside ends of the actuating surface areas 168 of the wings 165*d* define the actuating surfaces 168 because these surfaces 168 engage the actuator rod's edges at insertion of the interface structure 105 into the receiving station 107.

Figure 35:
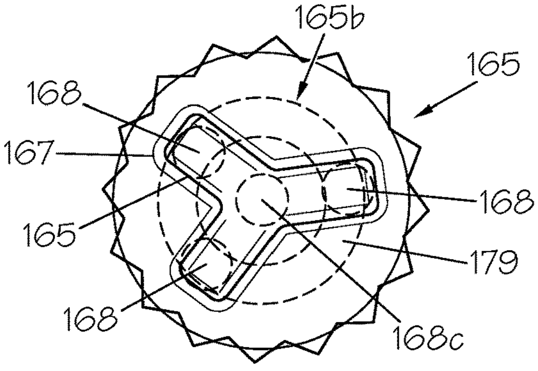
FIG. 35 illustrates a front view of an example key pen.

In FIG. 35 the actuating surfaces 168 are diagrammatically indicated by circles in dotted lines at the position where the key slot 167 and the edge of the rod 179 (also in dotted lines) overlap. For example, when the hollow rod 179 is actuated by a V- or Y-shaped key pen 165 there are two or three, respectively, separate actuating surface areas 168 at distances from each other, near the outer ends of the legs of the V or Y, respectively, at a distance from a central or longitudinal pen axis Ck, that engage the rod 179. One actuating surface area 168 may be sufficient to act upon the actuator.

In another example there may be a center actuating surface area 168*c*. A receiving station may include a rod portion, switch or lever that is actuatable by the center actuating surface area 168*c*. In certain example such center actuating surface area 168*c* could be for a master key pen, as will be explained below. Any key pen 165 of suitable configuration and having any of said actuating surface areas 168 can facilitate mounting and unmount of the supply apparatus 101 with respect to the receiving station.

Figure 36:
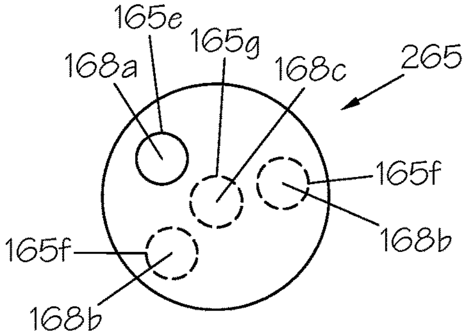
FIG. 36 illustrates a diagram of a cross sectional front view of another example key pen.

FIG. 36 illustrates another example of a cross section of a key pen 265, perpendicular to its longitudinal axis Ck. At a minimum, the key pen 265 may include a single cylindrical or beam-like protruding longitudinal pin 165*e* with an actuating surface area 168*a* at its distal end to push the rod 179. The pin 165*e* and its actuating surface area 168*a* may be positioned to pass through a corresponding Y- or V-shaped key slot 167 and to engage the respective actuator, such as the circular push edge of the rod 179. For differently oriented key slots 167, the pin 165*e* will need to be positioned differently with respect to the base 169*b* to pass through these differently oriented key slots 167. Hence a key pen 165 comprising, or consisting of, a single cylindrical pin 165*e* in a predetermined position may provide for a liquid-type-discriminating key pen, sufficient to trigger an actuator and facilitate installation to the receiving station.

In other examples, also illustrated in FIG. 36, further pins 165*f* may be provided to pass through a respective key slot and engage the actuator 179, as illustrated with dotted circles 165*f*. Hence, one or more cylindrical, pin-shaped or beam-like longitudinal key pens 165*e*, 165*f* may protrude from the base 169*b*, along the pen axis Ck to pass through a key slot 167 and act upon a respective actuator, such as a rod 179 or switch, with respective actuating surface areas 168*a*, 168*b*. Alternatively, the protruding key pen portion may be Y- or V-shaped over a substantial portion of its length and then may diverge towards different actuating surface areas 168*a*, 168*b*, or may converge towards a single actuating surface area 168*a*. Again, a master or center protruding pen 165*g* may be provided, for example of extended length to reach an inside base or the rod 179.

Figure 37:
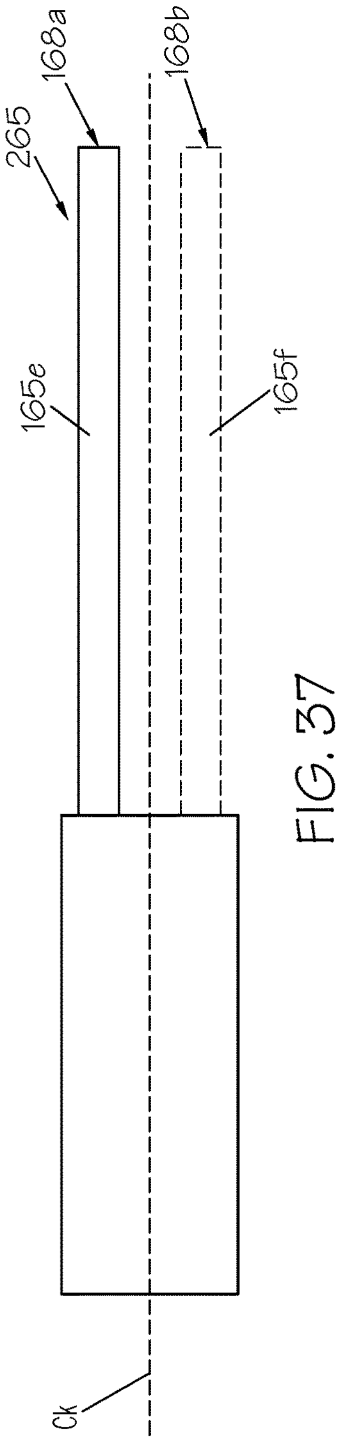
FIG. 37 illustrates a diagram of a side view of an example of a key pen.

FIG. 37 illustrates an example side-view of such key pen 265 with one or more of such separate actuating surface areas 168*a*, 168*b*, having respective protruding pins 165*e*, 165*f* that may be suitable to pass through key slots and act upon an actuator. In certain examples the longitudinal key pen portion 165*e*, 165*f* may include plastic or metal pins protruding from the base wall 168*a*, 168*b*. The length of the pins 165*e*, 165*f* between the base 169 and the actuating surface area 168*a*, 168*b* may be approximately the same as the earlier mentioned protruding key pen portions 165*b* of FIGS. 27-32.

Figure 37A:
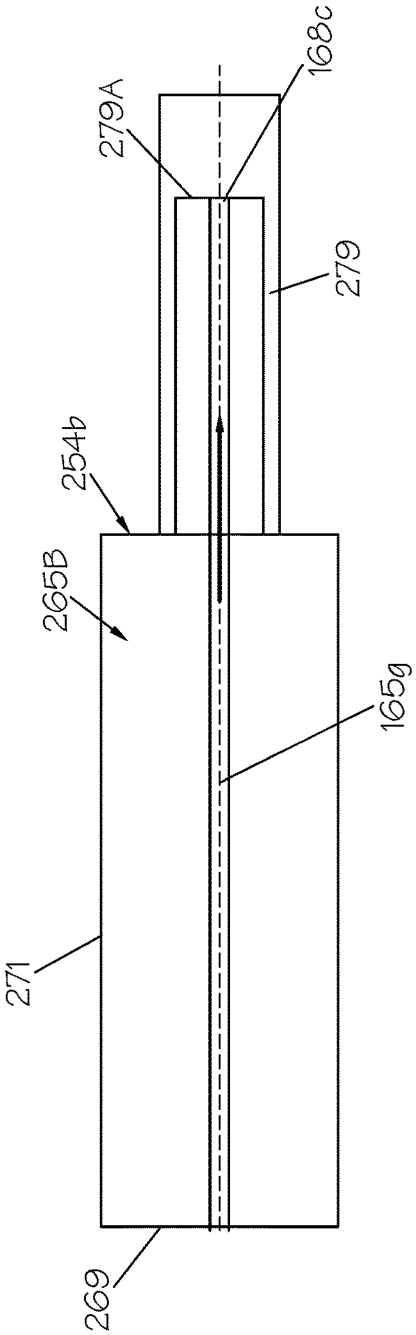
FIG. 37A illustrates a diagram of a side view of another example key pen.

Referring to FIGS. 37A, 35 and 36, a "master" key pen 265 may include at least one pin 165*g* with an actuating surface area 168C that is positioned to pass through differently shaped or oriented key slots 167 associated with different types or colors of liquid, for example through a center of such key slot 167. For example, such at least one pin 165*g* could be provided at a predetermined position, so that it passes through multiple differently shaped or orientated Y- or V-shaped key slots 167 of multiple receiving stations associated with different liquid types and/or colors, for example a center position with respect to its base or the key slot 167. The pin 165*g* may extend approximately parallel to the main liquid flow direction DL. The pin 165*g* may be provided at a location that corresponds with a center of a Y-shaped key slot 167, where the three legs of the Y intersect, so that it can pass through the centers of differently oriented Y-shaped key slots 167.

In one example, as illustrated in FIG. 37A, a master key pen 265B extends further than the interface front 254 and/or the liquid interface edge (e.g. edge 116 in other figures), as diagrammatically illustrated by the contour of a corresponding recess 271. For example the master key pen 265B protrudes at least 5 mm, at least 10 mm, at least 15 mm or at least 20 mm beyond the interface front 254 or liquid interface edge 116 as viewed along the third interface dimension d3. Hence, the key pen 265B may have a length of at least approximately 30, at least approximately 35, at least approximately 40 or at least approximately 45 mm, for example as measured between its base 269 and its actuating surface area 168*c*. At insertion of the interface structure into the receiving station, the extended master key pen 265B may protrude inside the hollow rod 279 until the distal actuating surface area 168*c* of the pen 265B engages an inner wall 279A of the rod 279 whereby the master key pen 265B may push the rod inwards by pushing against that inner wall 279A, for example to trigger the hook 161. The additional length beyond the interface front 254 or liquid interface edge may serve to span the distance between the front edge of the rod 279 and said inner wall 279A upon which the master key pen 265B acts. In other examples, a master key pen may be shaped differently than a pin, and/or may engage other types of actuators. Having a master key pen that does not discriminate between certain receiving stations could be useful for color or type independent liquid supply apparatuses such as service supplies with service liquid, or to save costs, or for other reasons.

In an example, the master key pen does not discriminate between receiving stations in a set of receiving stations, but it discriminates between different sets of receiving stations. In again other examples the key pen 265, 265B may include an extended pin similar to the current extended pin 165*g* but it does not serve as a master key pen. An extended color or liquid type discriminating key pen 265, 265B could be provided. In other examples, a longer not-pin-shaped key pen like the master key pen 265B may be used that has a similarly extended shape, for example to engage an inner wall 179A of a rod 179 or any other suitable actuator component.

Figure 38:
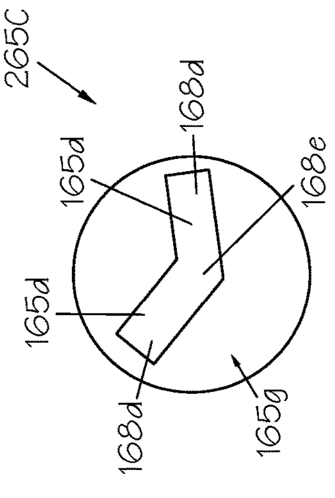
FIG. 38 illustrates a diagram of a front view of another example key pen.

FIG. 38 illustrates again a different example of a cross section of a key pen 265C. The cross section is V-shaped. The key pen 265C includes a longitudinal key pen portion 165*g*, with two wings 165*d*, that match part of the Y-shaped key slot 167 as indicated in FIG. 35, suitable for passing through said Y-shaped key slot 167 and actuating the rod 179 for example with two corresponding external actuating surface areas 168*d*. The V-shaped pen 265*c* may be relatively flatter along its longitudinal axis as compared to the Y-shaped pens 165. Accordingly, the key pen shape may be "reduced" while still performing its function. In an example where a Y- or V-shaped key slot is used also an I-shaped key pen cross section could work, or at least one dot-shaped cross section or any other cross section that matches part of a V or Y and touches the edge of the rod 179 could work.

Figure 39:
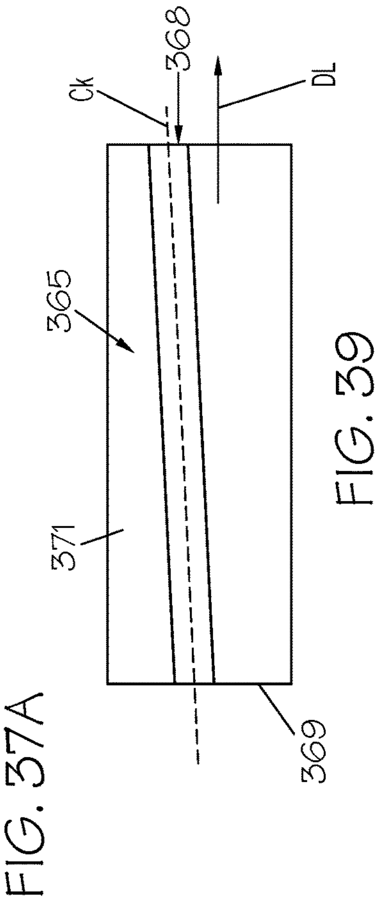
FIG. 39 illustrates a diagram of a side view of another example key pen.

FIG. 39 illustrates another diagrammatic example of a key pen 365 in a recess 371, protruding from its base 369. This key pen 365 does not extend exactly parallel to the second interface dimension d2 or the main liquid flow direction DL. The key pen 365 extends along its longitudinal axis Ck, but not exactly parallel to the second interface dimension d2. The longitudinal axis Ck is tilted with respect to the main liquid flow direction or second interface dimension d2. Here, the longitudinal axis Ck of the key pen 365 extends approximately in the main liquid flow direction DL, but it is tilted at an angle with said main liquid flow direction DL, while still allowing insertion through a key slot and actuating an opposite actuator of the receiving station. The longitudinal distance between the base 369 and the actuating surface area 368 of the key pen 365 may be at least approximately 10 mm, at least approximately 12 mm, at least approximately 15 mm, at least approximately 20 mm, or at least approximately 23 mm. It is again noted that certain margins and tilt angles of the key pen 165 with respect to the main liquid flow direction are allowed within the scope of this disclosure.

FIGS. 29-39 illustrate different examples of key pens that may be used for any of the interface structures of this disclosure, and that may be suitable to actuate certain actuators provided in the receiving stations. While in these examples single key pens are illustrated, the key pens may be provided in pairs, at both lateral sides of the liquid output, as illustrated in other figures. In turn, the corresponding actuators, when actuated by these key pens, may trigger at least one of (i) certain retention mechanisms to retain the supply apparatus to the receiving station and/or (ii) a pump switch, and/or (iii) data communication, and/or (iv) other actions. Any of the example key pens of this disclosure may have a length along a pen axis Ck, between a key pen base and an actuating surface area, of at least approximately 10 mm, of at least approximately 12 mm, of at least approximately 15 mm, at least approximately 20 mm, or at least approximately 23 mm whereby the actuating surface area may be approximately level with the liquid output edge or a front of the interface structure. That said, an example extended (e.g. master) key pen version (e.g. FIG. 37A) may be at least approximately 30 mm, at least approximately 35 mm, at least approximately 40 mm or at least approximately 45 mm.

Figure 40:
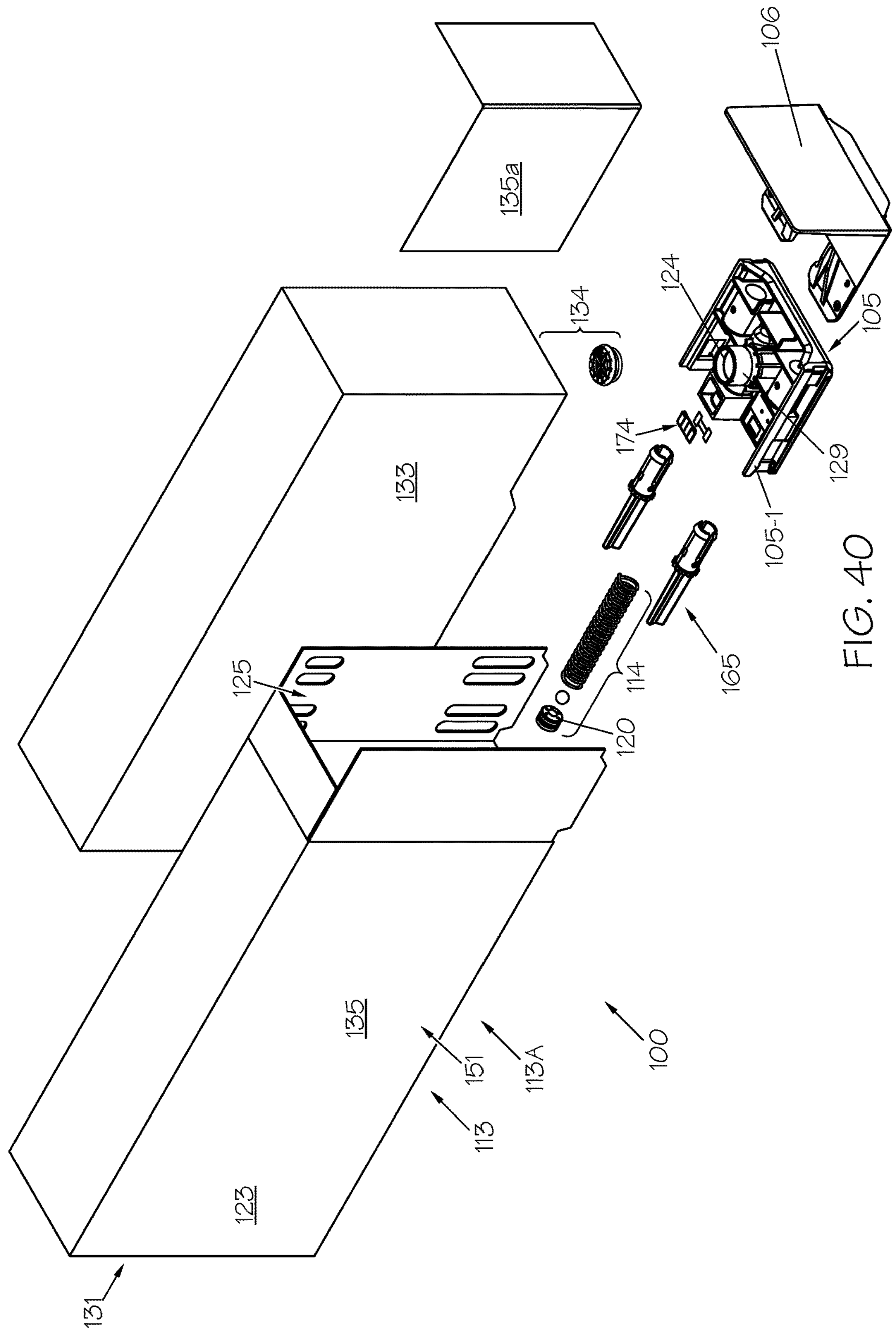
FIG. 40 illustrates an exploded view including an example kit 100 of components for construing a supply apparatus.

FIG. 40 illustrates a kit 100 of components for construing a supply apparatus 101 according to a further example of this disclosure. The kit 100 includes a container 103 to hold liquid. The kit 100 includes an interface structure 105. The kit 100 includes liquid interface components 114 for a liquid channel of the interface structure 105. The kit 100 includes key pens 165 for attachment to the interface structure 105. The kit 100 includes an integrated circuit 174 for attachment to the interface structure 105, including a contact pad array. The kit 100 includes at least one liquid interconnect element 134 to connect a liquid input 124 of the reservoir connecting liquid channel portion 129 of the interface structure 105 with the container 103 to allow liquid to flow between the container 103 and the liquid channel 117. The kit 100 may further include a mechanical connection structure 106 to mechanically connect the interface structure 105 with the container 103. The mechanical connection structure 106 may also serve as a strengthening member along a respective side 125 of the supports structure 135, at least in assembled condition. The respective side 125 can be a back of the container 103.

The at least one container 103 includes an at least partially collapsible reservoir 133 and a support structure 135. The container 103 may further include a label 135*a* whereby information on the label may indicate an installation orientation of the supply apparatus 101 and/or where to push the supply apparatus 101 into the receiving station. To that end the label may at least partially extend at a back 125 of the support structure 135. The support structure 135 may be a folded carton box-shaped structure that holds the reservoir 133. The support structure 135 includes a projecting portion 123 that extends near a front 131 of the support structure 135, and a back 125, opposite to the front 131. An opening 113A (not visible in this view) is provided in a bottom 113 of the support structure 135, near the back 125 of the support structure 135, to allow for the reservoir connecting channel portion 129 and input 124 of the liquid channel of the interface structure 105 to pass through the support structure 135, to connect to the reservoir 133. In assembled condition the reservoir connecting channel portion 129 may extend through the bottom opening 113A into the support structure 135 while the rest of the interface structure 105 may project downwards away from the bottom 113, over an extent in this disclosure defined by the first interface dimension d1. The kit 100 may further include at least one liquid interconnect element 134 to facilitate connection between the reservoir 133 and the reservoir connecting channel portion 129, near the bottom 113 and back 125 of the reservoir 133. The liquid interconnect element 134 may include an interconnect spout attached to a neck of the reservoir 133, or be integral to the reservoir 133.

The support structure 135 is illustrated in an open condition wherein backside flaps are open to allow the reservoir 133 to be placed in the support structure 135, whereby the interface structure 105 and/or reservoir 133 may be connected to the support structure 135 with the aid of a mechanical connection structure 106, extending near the back 125 and bottom opening 113*a*, along the back and bottom opening 113*a*. The interface structure 105 and/or reservoir 133 extend partially through the bottom opening 113*a*. The mechanical connection structure 106 may include at least one clamping profile to clamp to the support structure 135 at assembly. In assembled condition the mechanical connection structure 106 may strengthen the back 125 of the supply apparatus 101, for example to facilitate pushing the back wall 125 at insertion and ejection. In assembled condition the mechanical connection structure 106 may be substantially L-shaped at least when viewing its cross-section in the center plane CP (e.g. see FIG. 9) as viewed along the third container dimension D3.

The mechanical connection structure 106 largely extends between the reservoir 133 and the support structure 135, along the respectively first and back walls 113, 135, at the inside of the support structure 135, at least partially along the opening 113*a* and at least partially around the interconnect element 134, for example between flanges of the interconnect element 134. The mechanical connection structure 106 may include at least one wedge to clamp the reservoir and support structure walls, for example by wedging respective walls of the support structure 135 and reservoir 133 between the mechanical connection structure 106 and flanges of the interconnect element 134.

The liquid interface components 114 of the example kit of FIG. 40 may include a seal 120, for example a seal plug, and ball valve components, to be placed at the downstream end of the liquid channel 117 of the interface structure 105, to form part of the liquid interface 115.

In one aspect, this disclosure provides for an intermediate subassembly of components of the supply apparatus 101 without interface structure 105, such as a container comprising a print liquid reservoir 133 and a support structure 135. A set of components to assemble the container 103 may be provided.

The reservoir 133 is to be placed in the support structure 135 of FIG. 40, whereby in folded and mounted condition the support structure 135 may provide for a box or cubicle shaped structure to extend at least partially around the reservoir 133, whereby the mounted reservoir and support structure define the container 103. The container 103 has first, second and third container dimensions D1, D2, D3. The support structure 135 is adapted to at least partially surround and support the reservoir 133 and to provide stiffness to the container 103. The reservoir 133 includes a bag to hold the print liquid, being at least partially flexible to collapse while print liquid is withdrawn from the reservoir 133, the at least one wall of the bag being configured to inhibit fluid exchange. The reservoir 133 includes, or is to be attached to, an interconnect element 134, 434, for example through a reservoir neck. The neck includes an opening into the bag, to output print liquid from the bag. A largest internal diameter of said neck can be less than half the third and/or second container dimension D3, D2. In a filled state, when mounted into the support structure 135, starting at the neck, at least approximately two thirds, three fourths, or four fifths of the bag's length projects along the second container dimension D2 away from the neck, and a smaller volume 423A may extend at the opposite side 425 of the neck, e.g. the back side. In the mounted and folded condition, the support structure 135 includes approximately perpendicular walls defining said first, second and third container dimension, D1, D2, D3, the first and second dimension D1, D2 being more than the third dimension D3, wherein a first wall 113 defining the second and third dimension D2, D3 includes an opening 113*a* (e.g. see FIG. 22) adjacent said neck of the reservoir 133 when positioned in the support structure 135, to allow connection of another fluid structure to the neck. Such other fluid structure can be the interface structure 105. In the mounted and folded condition of the support structure 135, the opening 113*a* in the first wall 113 is provided adjacent another wall 125 adjacent the first wall 113, the other wall 125 being parallel to the first and third dimension D1, D3.

In one aspect, this disclosure relates to a method of assembling different components to obtain the supply apparatus 101, wherein at least one of the components is collected after a previous usage. The at least one collected component can be any of the different example supply features within the scope of this disclosure and/or described in this disclosure. For example, after exhaustion of the supply apparatus 101, the interface structure 105 can be separated from the container 103. For example, after such collection, the key pens 165 and the single molded base structure 105-1 of the interface structure 105 can be separated. Then, one of (i) newly manufactured key pens 165, or (ii) previously used and collected key pens 165 may be connected to the base structure 105-1 in an orientation that corresponds to the desired receiving station and liquid type. For example, similar to the original assembly before first usage, the new or re-used key pen 165 may fit in a key slot 167 of the base structure 105-1. For example, datums 187 and/or counter datums 189 may be used to facilitate correct rotational positioning. The interface structure 105 may then be connected to a filled new-built reservoir 133 or to a refilled re-used reservoir 133. The reservoir 133 and/or support structure 135 can be newly manufactured before filling and then connected to the recovered base structure 105-1, or, at least parts of the reservoir 133 and/or support structure 135 could be recycled before connection to the base structure 105-1. Hence the recycled base structure 105-1 may be re-purposed for a different liquid type, a different printer platform, a different liquid volume, etc. as compared to the first usage of the same base structure 105-1. The original integrated circuit 174 could also be exchanged, refurbished, or replaced with a new integrated circuit 174 to match said desired liquid type, station and/or platform.

Figure 40A:
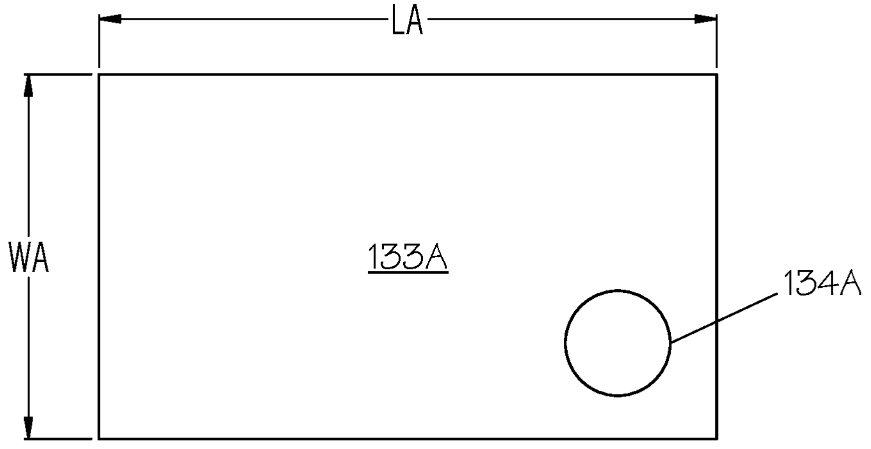
FIG. 40A illustrates a diagram of an example unfilled reservoir.

FIG. 40A illustrates a diagram of an example of an unfilled reservoir 133A. The unfilled reservoir 133A may be a flexible bag that may be substantially flat in the unfilled, empty state. For example, the bag in empty state may be largely defined by two opposite films connected or folded at short outer edges of the unfilled bag. For example, the outer edges may be folded edges between the two connected opposite films or two separate opposite films may be welded. The flat unfilled bag may have a length LA and width WA. In a filled state, that is, in an at least partly expanded state of the reservoir 133A, the length LA and width WA may be difficult to distinguish and for example do not correspond to, nor extend along, any of the earlier mentioned container dimensions D1, D2, D3.

The reservoir 133A includes an interconnect element 134A, for example to connect to a reservoir connecting portion of a liquid channel of an interface structure or cap. The interconnect element 134A may be a neck of the reservoir 133A. The interconnect element 134A may have an inner liquid channel, and outer flanges such as illustrated in FIG. 22 to facilitate connection of the support structure, the mechanical connection structure 106, and the interface structure. The interconnect element 134A may be offset from a center of the reservoir 133A unfilled and flat state. The interconnect element 134A may be offset from a middle of the width WA and/or offset from a middle of the length LA of the reservoir 133A in unfilled and relatively flat state, for example relatively adjacent a corner of the flat unfilled reservoir 133A. The interconnect element 134A may be connected to one of the opposite films.

FIG. 41 illustrates a supply apparatus 401 wherein the container 403 includes an at least partially collapsible reservoir 433 wherein a projecting portion 423 of that reservoir 433 protrudes beyond a liquid interface edge of the interface structure 405, in a main liquid flow direction DL. In the illustrated example, no separate support structure, such as a tray or box, is provided. The apparatus 401 of FIG. 41 can be an intermediate product for further assembly, or a finished product for direct connection with a receiving station. For example, where the supply apparatus 401 is a finished product, certain stiffening members may be provided along, or integral to, the reservoir 433. The container 403 includes a fluid interconnect element 434 to connect to the interface structure 405. Here, the interface structure 405 is connected to, and protrudes from, the liquid interconnect element 434, rather than directly from a reservoir bottom wall. The extent of the first dimension d1 of the interface structure 405, which determines both the height and the direction of the height, may be measured between (i) a deepest bottom 413 of the projecting portion 423, or a distal end of the liquid interconnect element 434, and (ii) the distal side 437 of the interface structure 405, along the direction of the first dimension d1, D1. In another definition the first interface dimension d1 may be determined by a distance between an external distal side 437 of the interface structure 405 and a front top edge 454*b* just above the liquid interface. Even if the interface structure 405 does not protrude directly from a bottom face 413 of the container 403, the height of the interface structure 405 may be determined by the height between the distal side 437 and the front edge 454*b*, within which the interface components are included such as the needle receiving liquid channel portion and other interface components such as at least one of the integrated circuit contact pads, key pens, guide features, etc. Again, as also illustrated in FIG. 26, the interface structure 405 may include an intermediate channel portion with liquid input opening to receive liquid from the container, the intermediate portion and input protruding beyond the profile height of the interface structure 405, partly into the liquid interconnect element 434 or the container 403.

Figure 42:
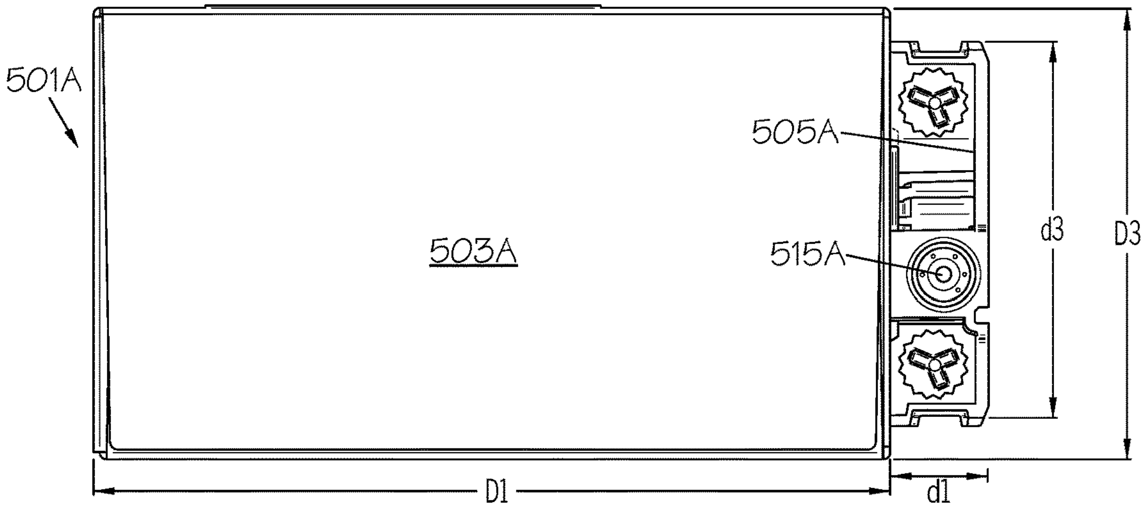
FIG. 42 illustrates a front view of an example liquid supply apparatus.
Figure 43:
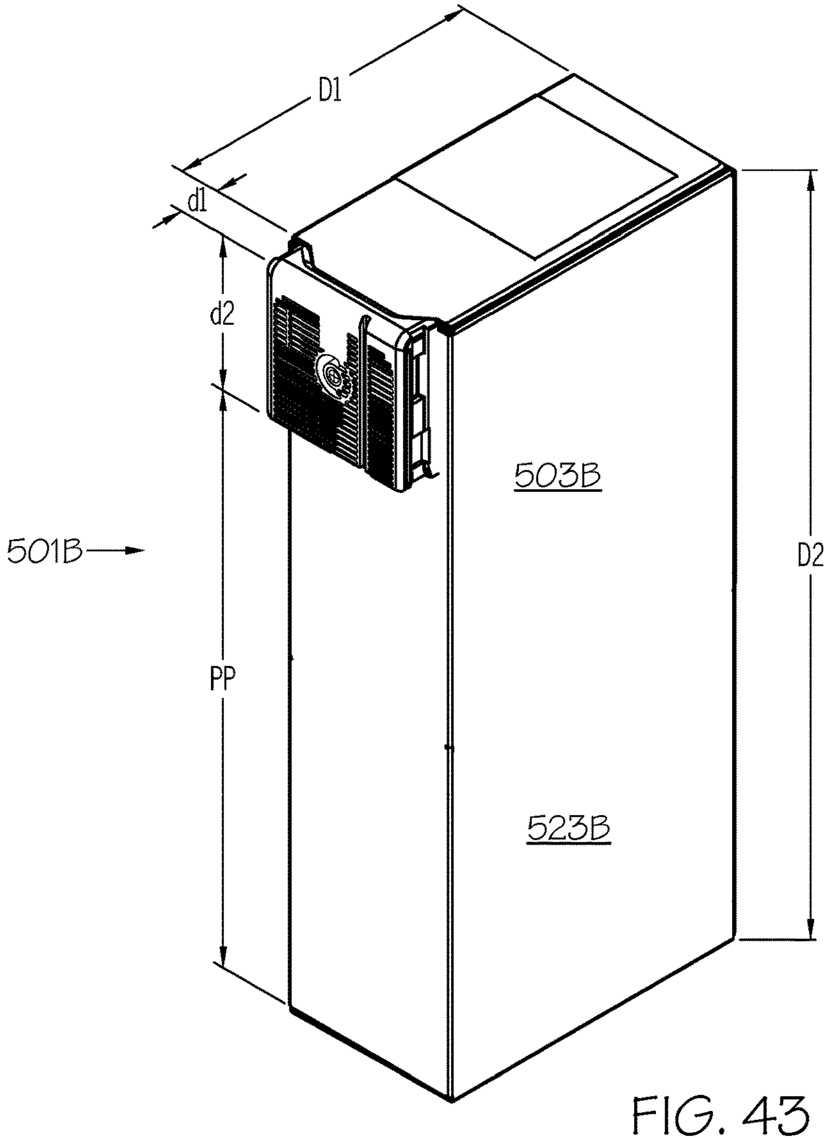
FIG. 43 illustrates a perspective view of another example liquid supply apparatus.
Figure 44:
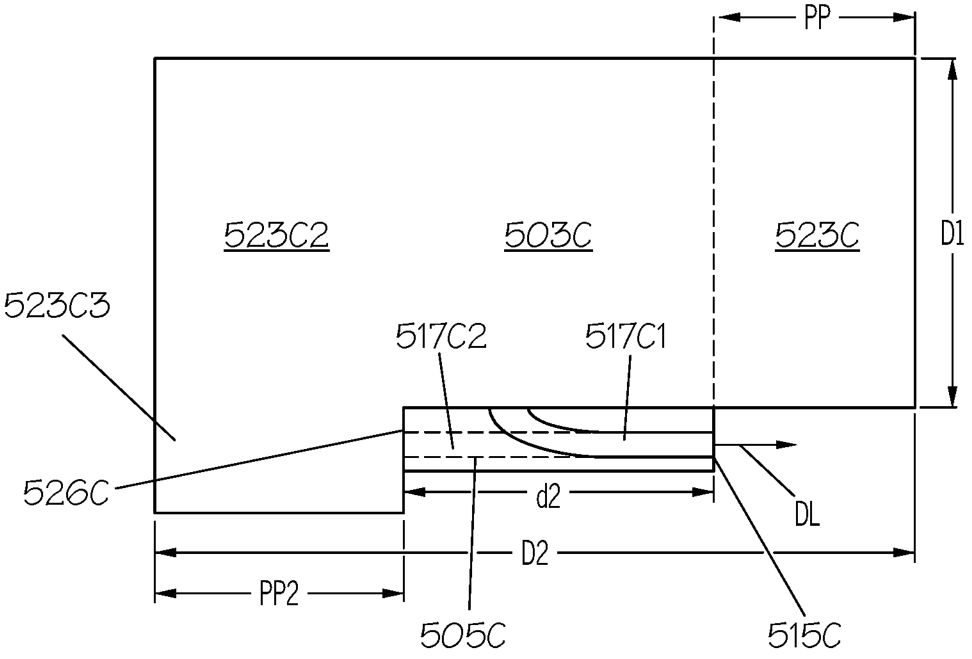
FIG. 44 illustrates a diagram of a side view of another example liquid supply apparatus.
Figure 45:
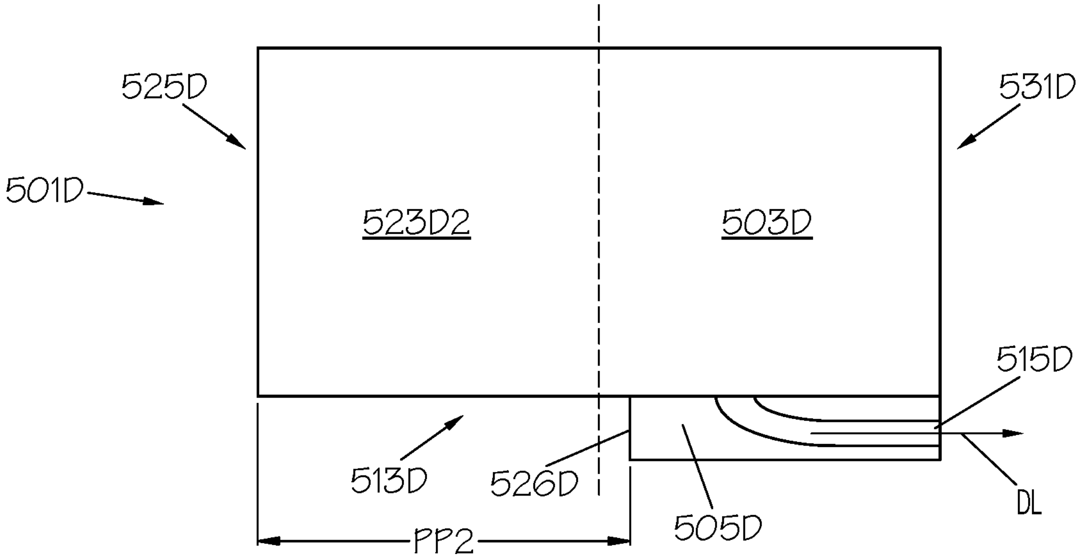
FIG. 45 illustrates a diagram of a side view of yet another example liquid supply apparatus.
Figure 46:
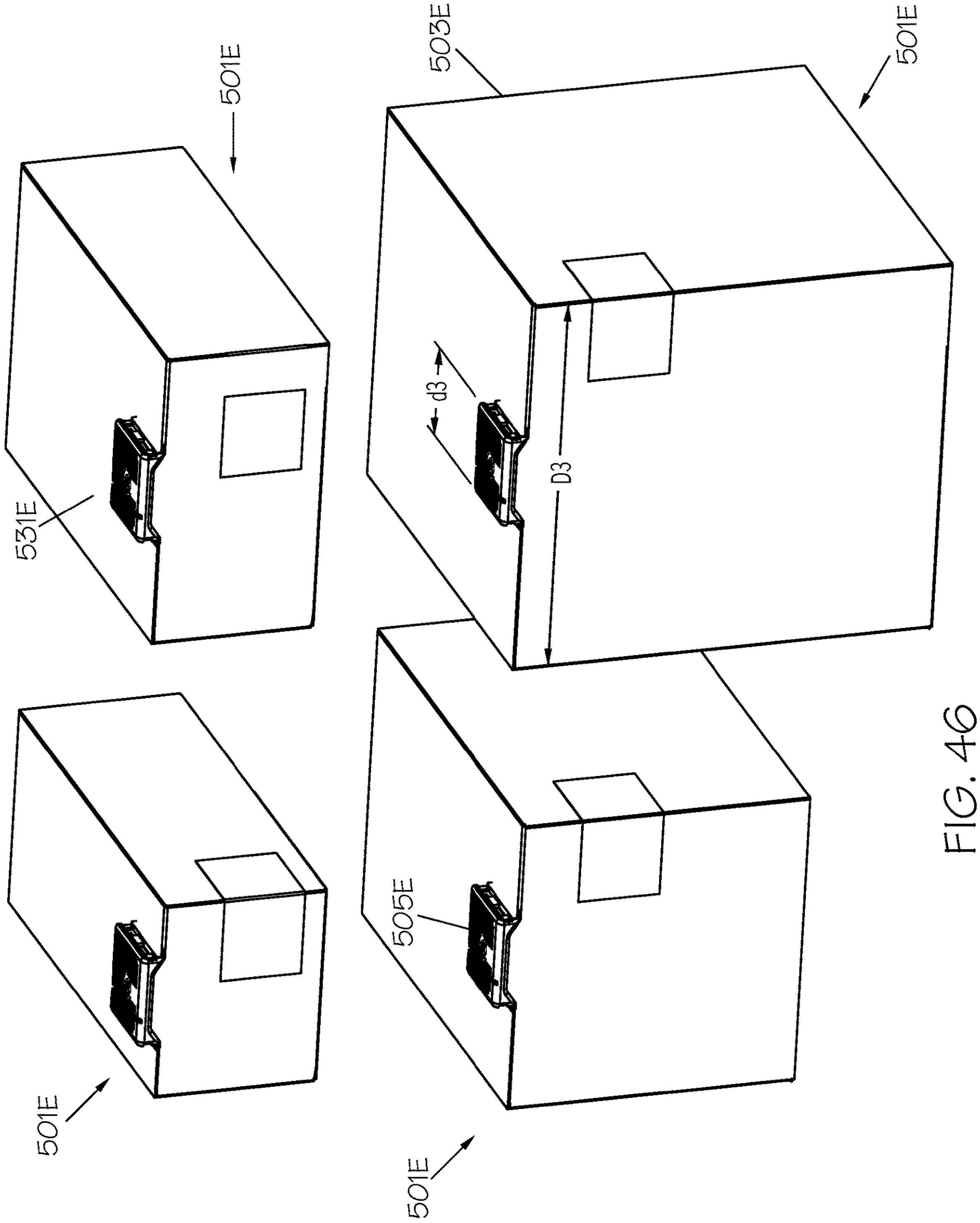
FIG. 46 illustrates a perspective view of a plurality of example liquid supply apparatuses.
Figure 47:
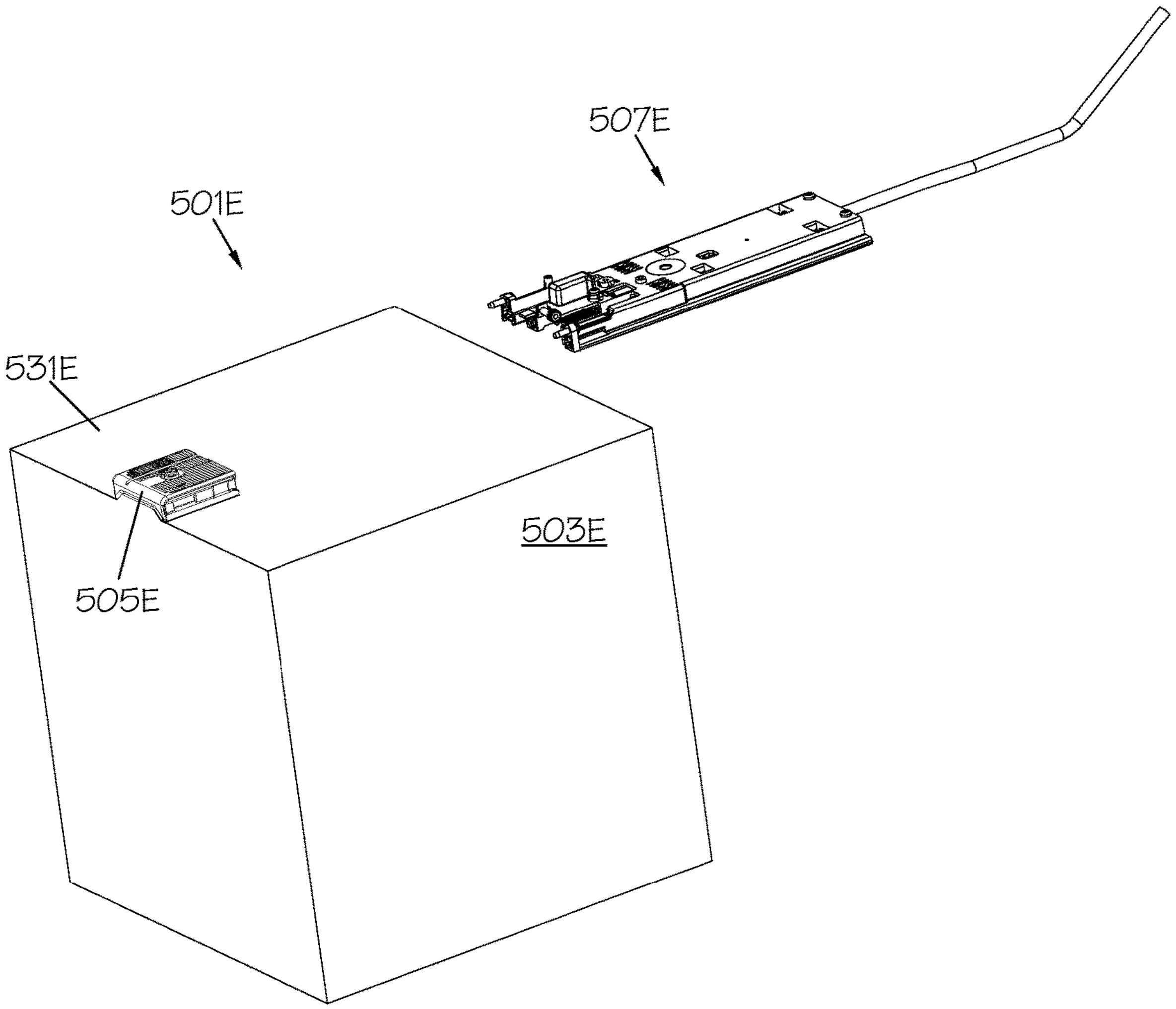
FIG. 47 illustrates a perspective view of an example receiving station and liquid supply apparatus.

FIGS. 42-47 illustrate examples of supply apparatuses of this disclosure in different operational orientations, whereby for each example the interface structure is positioned differently with respect to the container. For example, in FIGS. 42 and 43 the interface structure projects from a lateral side of the container. In FIG. 44 the interface structure projects from a first side of the container, at a distance from opposite sides adjacent to, and at a straight angle with, said first side. In FIG. 45 the interface structure projects from a wall of the container near a front of the container, at a distance from the back whereby the liquid interface extends at the front. In FIGS. 46 and 47 the interface structure projects upwards from a top of the container. These different orientations and configurations may be facilitated because the outputs of certain example collapsible liquid bag reservoirs of this disclosure can be oriented and located in any direction, with little influence of gravity.

In the example supply apparatus 501A of FIG. 42, the interface structure 505A protrudes from a lateral side 513A of the container 503A, in the first interface dimension d1, when installed. Here, the first container dimension D1 and the first interface dimension d1 extend horizontally, although the supply apparatus could be tilted as compared to the illustrated orientation. The needle insertion direction extends approximately horizontally, along the corresponding second dimensions D2, d2, into the page, at straight angles with the first dimensions D1, d1. The supply apparatus 501A of FIG. 42 may include a projecting portion 523A of the container 503A that projects beyond the liquid interface 515A, along said second dimensions D2, d2, out of the face of the page. Correspondingly, the third dimensions D3, d3, which in other examples have been referred to as a “width” of the container and interface structure, respectively, extend vertically for the example orientation and supply apparatus of this figure.

In the example supply apparatus 501B of FIG. 43, the interface structure 505B protrudes from a lateral side 513B parallel to the first interface dimension d1, which in the drawing is approximately horizontal, wherein again "approximately" is meant to include a tilted condition with respect to exactly horizontal as explained above. In this example, the needle insertion direction of the respective liquid channel portion near the liquid interface, and the main liquid flow direction, may extend approximately vertical. The projecting portion 523B of the container 503B projects beyond the liquid interface 515B of the interface structure 505B, in the main liquid flow direction DL, along the second dimensions D2, at approximately straight angle with the first dimension D1 of the container, and over a projection distance PP that may be several times the second interface dimension d2. In one example scenario, the supply apparatus 501B of FIG. 43 can be hung onto a receiving station of a host printer in its illustrated orientation, for example onto a fluid needle protruding at a side of the printer in an upwards direction, whereby the key pens of the supply apparatus protrude downwards to actuate upon an actuator of the receiving station. The supply- and printer-side key and retention mechanisms, if any, can be adapted to accommodate a vertical installation position.

FIG. 44 illustrates a diagram of another example supply apparatus 501C, with an extended container volume 523C2, 523C3. The interface structure 505C projects outwards with respect to a bottom 513C of the container 503C, at a distance PP, PP2 from both the front 531C and back 525C, respectively, of the container 503C. For example, the interface structure 505C may project from a bottom 513C of the container 503C near a middle of the bottom 513C of the container 503C between the front 531C and back 525C of the container 503C. The container 503C includes a first projecting portion 523C projecting beyond the liquid interface 515C along the main liquid flow direction DL, over a projection extent PP. In this example, the container 503C includes a second projecting portion 523C2 opposite to the first projecting portion 523C projecting in the opposite direction with respect to the main liquid flow direction DL. In the illustrated example the second projecting portion 523C2 extends beyond a back 526C of the interface structure 505C, over a second projection extent PP2. In addition, the second projecting portion 523C2 may further include a further volume extension 523C3, which in the illustration projects downwards but which may also project upwards or in any other direction. In one example, the second projecting portion 523C2 facilitates adding volume to the container 503C. In an installed condition of the supply apparatus 501C, the second projecting portion 523C2 may project outside of the contour of a printer receiving station. In fact, different types of volume projections/extensions 523C2, 523C3 may be added to any container of this disclosure, in any direction, for example to expand the volume or shape of the container. In the example of FIG. 44, these volume extension is integral to the container. In other examples volumes may be connected by way of a separate fluidic connection to the container.

Two different configurations of liquid channels 517C1, 517C2 are illustrated in FIG. 44. Both configurations are possible within the scope of this disclosure. A first one 517C1 of the liquid channels 517C1 includes a reservoir connecting portion at an angle with a needle receiving portion wherein the liquid channel 517C1 connects at the top of the interface structure 505C, at least in the illustrated orientation. Another example liquid channel configuration 517C2 may have a reservoir connecting portion near a back 526C of the interface structure 505C, to connect to the volume extension 523C3, at least in the illustrated orientation, wherein the reservoir connecting portion need not be at an angle with the needle receiving portion. A neck or and/or interconnect element of the reservoir may connect to the liquid channel 517C2 near a back 526C of the interface structure 505C. In other examples, differently configured volume extensions 523C3 may be provided, which may be connected to the respective liquid channel at another side of the interface structure 505C.

In another example the container 503C has a single extended cuboid shape along the second container dimension D2 with first and second projecting portions 523C, 523C2, each projecting portion 523C, 523C2 projecting beyond the back and front of the second interface structure dimension d2, but without said further volume extension 523C3. In another example the interface structure 505C may include certain extended relatively rigid supports elements that project in a backwards direction under such second projecting portion 523C2, for example to mechanically support the weight of the filled second projecting portion 523C2 that in installed condition may extend outside of the receiving station.

FIG. 45 illustrates a diagram of another example supply apparatus 501D wherein the liquid interface 515D is provided approximately near or level with the front 531D of the container 503D, under the bottom 513D of the container 503D. The supply apparatus 501D includes a second projecting portion 523D2, projecting towards the back 525D of the container 503D beyond a back 526D of the interface structure 505D over a second projection extent PP2 in a direction parallel to the second dimension D2, opposite with respect to the main liquid flow direction DL, for example similar to FIG. 44, but with the difference that there is no first projecting portion (423C) that projects beyond the liquid interface 515D. Similar to FIG. 44, the second projecting portion 523D2 of FIG. 45 may include further extensions (523C3) in other directions. This supply apparatus 501D may for example facilitate receiving stations of more shallow depth, or provide for an alternative design as compared to examples of this disclosure. In another example, the supply apparatus 501D of FIG. 44 or 45 may facilitate an approximately vertical installation whereby the second projecting portion 523D2 projects at least partly out of, and upwards from, the respective receiving station or printer.

FIGS. 46 and 47 illustrate other example supply apparatuses 501E where for each apparatus 501E the interface structure 505E projects from a top 531E upwards, in installed orientation. In one example a receiving station 507E may be connected to the interface structure 505E by manually moving the receiving station 507E towards the interface structure 505E, as illustrated in FIG. 47, and sliding it over the interface structure 505E to establish fluidic connection. In certain examples the container 503E may have a volume larger than approximately 500 ml, larger than approximately 1 L or larger than approximately 3 L. Where the container 503E has such large volume, there may be reasons to choose for a system where the receiving station 507E is to be moved towards the supply apparatus 501E, rather than the supply apparatus towards the receiving station as in other examples of this disclosure, because of the weight of the supply apparatus 501E in filled state, and/or because of its relatively large volume. In the illustrated examples, the third dimension D3 of the container 503E is significantly greater than the third dimension d3 of the interface structure 505E. In certain examples the third dimension D3 of the container 503E is at least two times the third dimension d3 of the interface structure 505E, or at least three times the third dimension d3 of the interface structure 505E.

It will be understood that, while in the drawings of FIGS. 42-47 certain components of the supply apparatuses have been moved and/or rotated along straight axes and straight angles with respect to the earlier disclosed supply apparatuses of earlier figures, such as the supply apparatus of FIGS. 8 and 9, in other similar examples that are in line with FIGS. 42-47, the respective supply apparatus components may be tilted at a non-straight angles and also the respective dimensions D1, d1, D2, d2, D3, d3 may be tilted at corresponding non-straight angles. Also, the supply apparatus of FIGS. 8 and 9 may in installed condition be tilted with respect to the illustrations. For example, a supply apparatus may be installed to a receiving station in a tilted condition whereby the main liquid flow direction DL is tilted with respect to, and/or rotated around, a horizontal or vertical, and the respective dimensions D1, d1, D2, d2, D3, d3 are tilted accordingly. In any event, it should again be understood that when referring throughout this disclosure to back, front, top, lateral side, side, bottom, height, width, or length or other aspects relating to dimensions, orientations or directions with respect to a surrounding three-dimensional space, this should not be interpreted as fixing the orientation of components of the supply apparatus, unless in certain examples where this is functionally determined. Rather, certain aspects related to orientations are described for the purpose of illustration and clarity.

Figure 48:
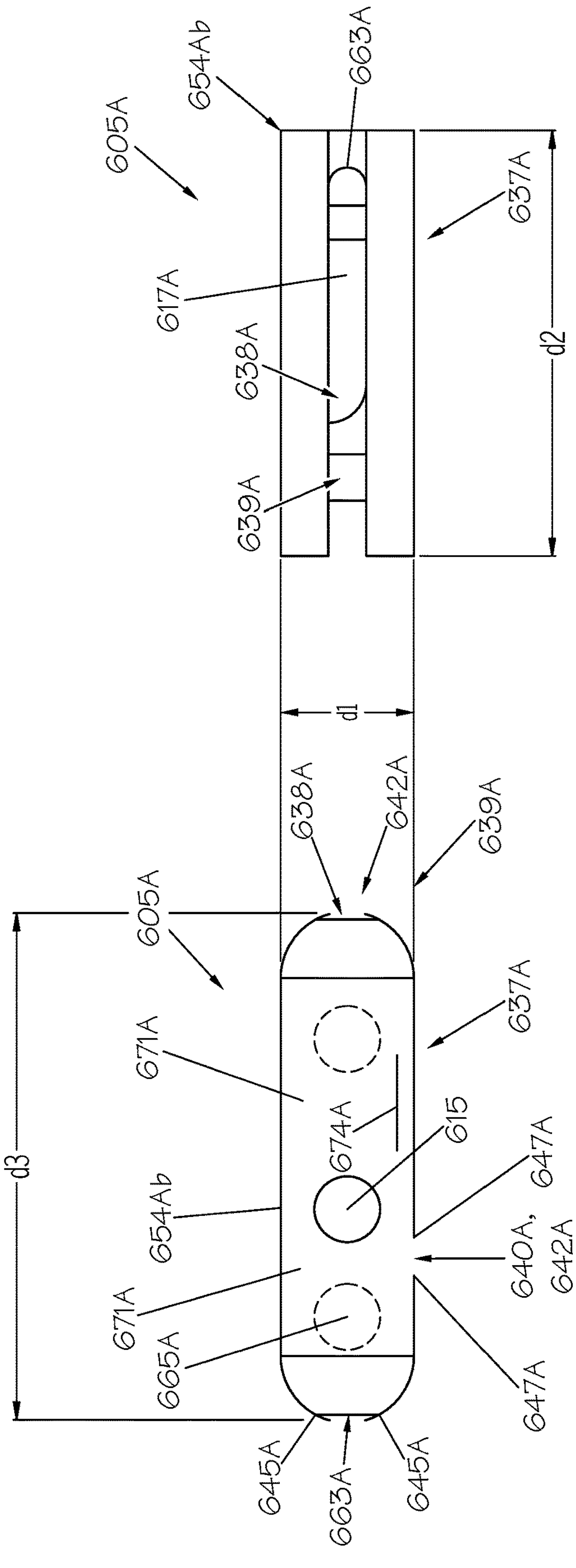
FIG. 48 illustrates a diagram of a front and side view, left and right, respectively, of another example interface structure.

FIG. 48 illustrates a diagrammatic front view (left) and side view (right) of a different example of an interface structure 605A for a supply container, for example having similar dimensions d1, d2, d3 as the example low-profile interface structure described with reference to FIGS. 8 and 9. The interface structure 605A of FIG. 48 includes a liquid interface 615A with recesses 671A at both lateral sides, one of which housing an integrated circuit 674, and an interface front including an interface front edge 654Ab. The interface front push edge 654Ab which functions as both the interface front push area and front edge, sufficient to push against the protective structure of the needle. The recesses 671A may be at least partially open at the lateral sides 639A, forming a lateral opening that may also define the lateral guide features 638A, for example respective guide slots 642A.

The interface front edge 654Ab extends opposite to the distal side 637A, adjacent the liquid interface 615A, for example to push a protective structure for releasing a fluid needle. The interface front edge 654Ab extends adjacent the container side from which the interface structure 605A projects when assembled to the container. Integrated circuit contact pads 675A are provided on the inside of the wall that defines the distal side 637A of the liquid interface 615A, laterally next to the liquid output interface 615A.

The interface structure 605A includes lateral and intermediate guide features 638A, 640A to engage corresponding guide rails of a receiving station, such as the guide rails associated with the other example guide features 138 and 140, respectively, in FIG. 17. In the present example of FIG. 48, lateral longitudinal guide features 638A are provided at the lateral sides 639A of the interface structure 605A, for example in the form of opposite edges 645A that extend along the second dimension d2 of the interface structure 605A, whereby the opposite edges 645A may be adapted to engage the respective guide rails. Guide slots 642A are formed by the opposite edges 645A. The lateral longitudinal guide features 638A may facilitate guiding of the interface structure 605A in the direction along the second interface dimension d2, while limiting the degree of freedom of movement in directions along the first interface dimension d1. An intermediate longitudinal guide feature 640A is provided at the distal side 637A of the interface structure 605A, for example in the form of opposite edges 647A that extend along the second dimension d2 of the interface structure 605A, whereby the opposite edges 647A may be adapted to engage the corresponding guide rails. The intermediate longitudinal guide feature 640A may facilitate guiding of the interface structure 605A in a direction parallel to the second interface dimension d2, while limiting the degree of freedom of movement in directions along the third interface dimension d3. Intermediate guide slots 644A may be formed by the opposite edges 647A. The edges 645A, 647A may have a similar function as the earlier mentioned second lateral guide surfaces 145 and second intermediate guide surfaces 147 as explained with reference to FIGS. 14, 17A and 17B.

Furthermore, the through slot 642A may function as a clearance for a hook (as shown in FIG. 18). A stop surface 663A may be provided at the front of the slot 642A, that may be part of a lateral front wall portion 663AA. In certain examples, one of the intermediate slot 644A and the lateral slot 642A are clearance slots to clear the corresponding guide rail.

Figure 49:
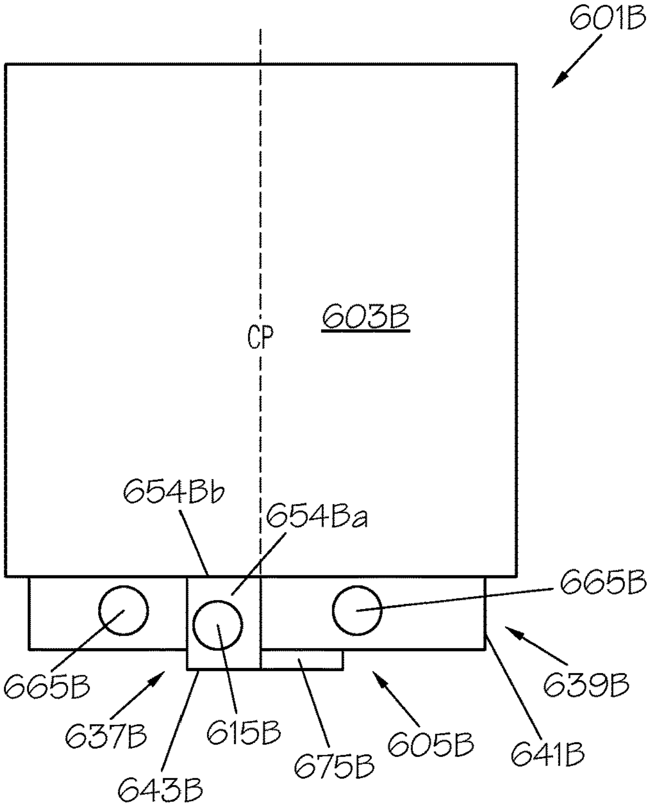
FIG. 49 illustrates a diagram of a front view of another example liquid supply apparatus.

FIG. 49 illustrates a diagram of an example of a supply apparatus 601B wherein the interface structure 605B has separately manufactured interface components. FIG. 49 also illustrates an example interface structure 605B having reduced guide features 641B, 643B. The interface structure 605B includes a liquid channel interface 615B, an interface front area and edge 654Ba, 654Bb, respectively adjacent the interface 615B, key components 665B including respective key pens and an integrated circuit component 675B including contact pads. For illustrative purposes the components are drawn as separate blocks, corresponding to separate components that need to be assembled together to form the interface structure 605B. The components could have been separately molded and/or extruded.

The interface structure 605B includes straight, flat lateral guide surfaces 641B at the lateral sides 639B and a straight, flat distal guide surface 643B at the distal side 637B of the interface structure 605B. For example, the lateral guide surfaces 641B extend approximately parallel to the first and second interface dimension d1, d2 and the intermediate guide surface 643B extends parallel to the second and third interface dimension d2, d3. In one example, the guide surfaces 641B, 643B are adapted to engage the insides of guide rails of FIG. 17. The guide surfaces 641B, 643B may facilitate sliding the interface structure 605B in a receiving station in a direction parallel the second dimension D2, d2, while limiting the freedom of movement in a direction parallel to the third dimension D3, d3, for example between corresponding opposite lateral guide rails or surfaces of the receiving station, but the guide surfaces of the interface structure still allow for some freedom of movement along the first dimension D1, d1, for example upwards in the drawing of FIG. 49.

Figure 50:
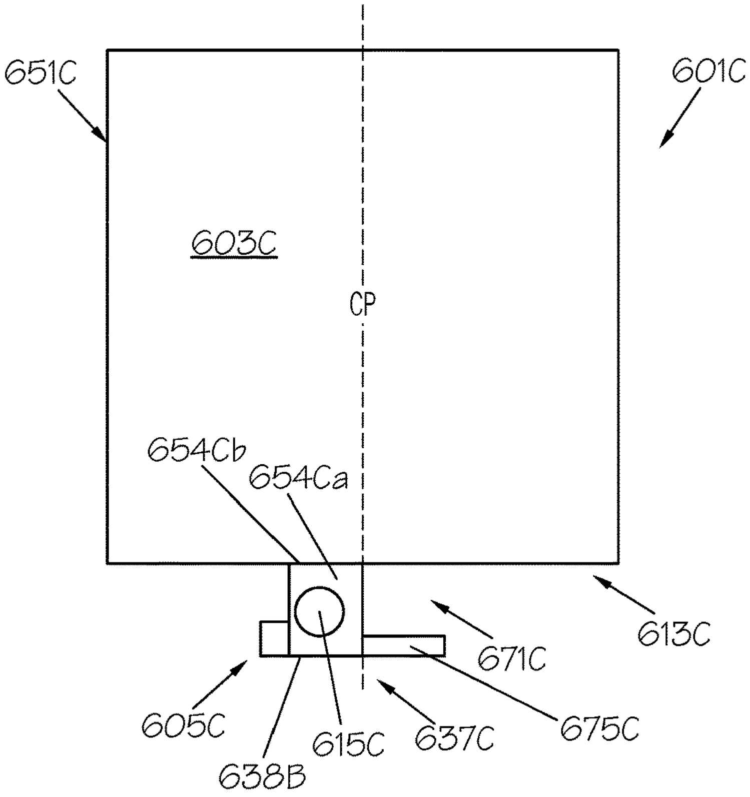
FIG. 50 illustrates a diagram of a front view of yet another example liquid supply apparatus.

FIG. 50 illustrates a diagram of another example of a supply apparatus 601C. Similar to other examples, the interface structure 605C of the supply apparatus 601C includes a liquid interface 615C, an interface front area and edge 654Ca, 654Cb, respectively, and integrated circuit contact pads 675C near the distal side 637C. In one example an intermediate guide feature 638C is provided near the distal side 637C of the interface structure 605C. The intermediate guide feature 638C may include at least one surface to engage a corresponding guide rail of a receiving station. Lateral guide features are omitted in this example interface structure 605C whereby a user may need to manually position the liquid interface 615C with respect to the fluid needle with no or few guide surfaces, or in the example where there is the intermediate guide feature 638C, that intermediate guide feature 638C may provide some guide functionality for positioning. Also, opposite the lateral side walls 651C of the container 603C may provide for rough guidance with respect to the receiving station. In the illustrated example a recess 671C extends along the container bottom side 613C, and along the needle receiving liquid channel portion of the liquid channel. The integrated circuit and/or integrated circuit contact pads 675C extend in the recess 671C, with the contact surfaces being exposed towards the container 603C. The recess is open to the lateral side opposite to the needle receiving liquid channel portion.

Figure 50A:
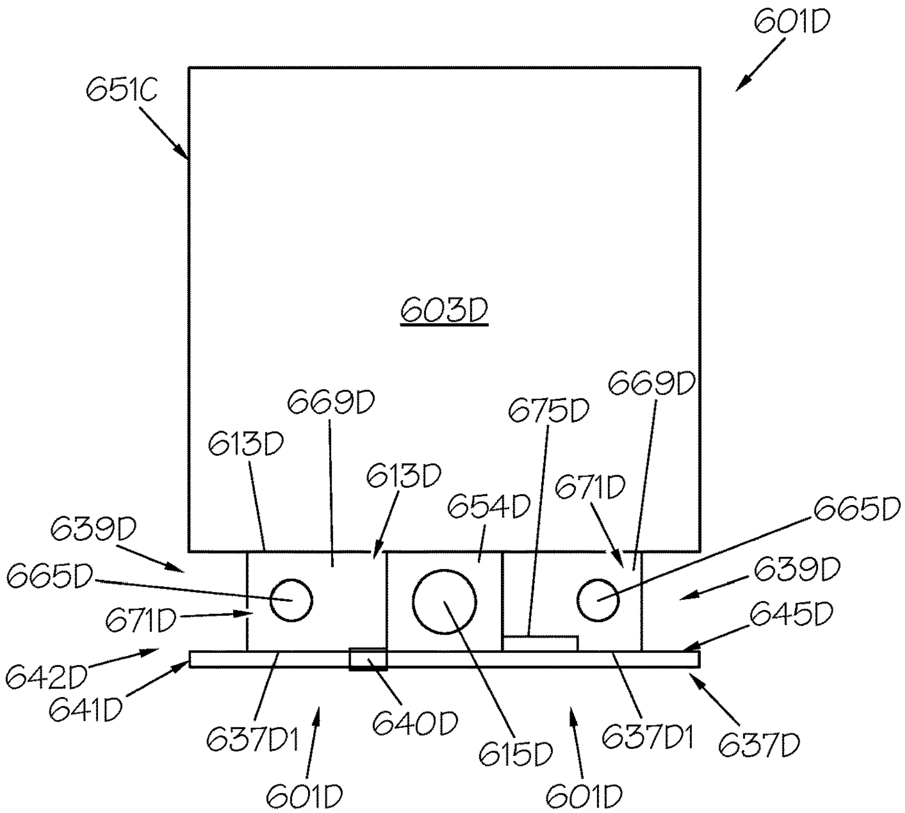
FIG. 50A illustrates a diagram of a front view of again another example liquid supply apparatus.

FIG. 50A illustrates a diagram of a further example of a supply apparatus 601D and its interface structure 605D whereby the respective recesses 671D are open to the lateral sides 639D of the interface structure 605D. The recesses 671D are delimited by base walls 669D, walls of the needle receiving portion of the liquid channel 617D, the respective container side 613D, and inner walls 637D1 of the distal side 637D of the interface structure 605D. The key pens 665D extend next to and approximately parallel to the liquid channel, from respective base walls 669D. An intermediate guide feature 640D, such as a guide slot, may be provided adjacent, and along, the needle receiving portion of the liquid channel of which the output interface 615D is illustrated. The intermediate guide feature 640D may be adapted to limit the freedom of movement in opposite directions parallel to the third interface dimension, with respect to counterpart guide surfaces of a receiving station. End edges of the distal side 637D of the interface structure 605D may define (i) first lateral guide surfaces 641D, for example to engage lateral guide surfaces in the receiving station, and/or (ii) second lateral guide surfaces 645D, for example to engage lateral guide rails of the receiving station, the first lateral guide surfaces 641D and second lateral guide surfaces 645D extending along the second interface dimension.

In another example the opening at the lateral side 639D, between the distal side 637D and the side 613D of the container 603D from which the interface structure 605D projects, may defined a clearance slot 642D to clear lateral guide rails of a receiving station rather than being guided by the guide rails. Similarly, the distal side 637D may be provided with an intermediate guide clearance slot instead of an intermediate guide slot 640D. Because in certain examples some guidance may be obtained through the key pens 665D, it may not be needed to provide for separate guide features but certain guide rails may need to be cleared to pass into the receiving station.

Figure 50B:
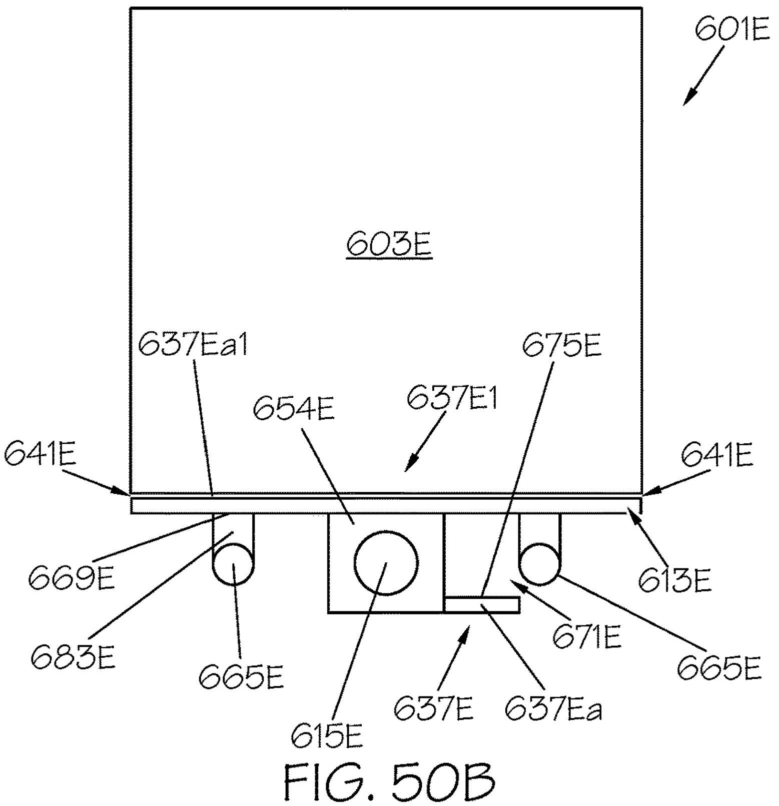
FIG. 50B illustrates a diagram of a front view of again another example liquid supply apparatus.

FIG. 50B illustrates a diagram of another example of a supply apparatus 601E and its interface structure 605E. The interface structure 605E includes key pens 665E that extend parallel to, and next to, the needle receiving portion of the liquid output channel, of which only the liquid interface 615E is illustrated. Each key pen 665E includes a base portion 683E at the base of the key pen 665E, to connecting the key pen 665E to respective base wall 669E. In this example, the base walls 669E of the key pen 665E extends at the side 613E of the container 603D from which the interface structure 605E projects. For example, the interface structure 605E may have a support wall 637Ea1 at a proximal side 637E1 proximal to the container side 613E from which the interface structure 605E projects, for example approximately parallel to that container side 613E. The key pen base portions 683E protrude out of the proximal side 637E1. The key pens 665E may be curved between the base portions 683E and the longitudinal key pen portion that extends approximately parallel to the needle insertion direction NI and main liquid flow direction DL of the needle receiving liquid channel portion. The proximal support wall 637Ea1 may extend to the lateral sides where end edges of the wall 637Ea1 may form lateral guide features 638E, for example first lateral guide surfaces 641E to limit a degree of freedom of movement in a direction of the third interface dimension, with respect to guide surfaces of a receiving station 609E. For example, the interface structure 605E does not engage protruding guide rails of the receiving station. The interface structure 605E may further include an integrated circuit and/or integrated circuit contact pads 675E along a support wall 637Ea that defines the distal side 637E, whereby the wall along which the distal side 637E and integrated circuit contact pads extend may be parallel to the third and second interface dimensions. A recess 671E is defined by that wall of the distal side 637E and contact pads 675, the needle receiving portion of the liquid output channel, and the proximal side 637E1 of the interface structure 605E. One of the key pens 665E may extend along, or partly inside of, the recess 671E.

In FIGS. 50A and 50B, the key pens, 665E may have predetermined cross sections to one of (i) discriminate between receiving stations or (ii) not discriminate between receiving stations, whereby the latter may be a master key pen. Distal actuating surface areas of the key pens 665D, 665E may extend approximately up to the front 654D, 654E, or further out of the interface structure 605D, 605E beyond the front 654D, 654E, as explained earlier with other example key pen structures.

Figure 50C:
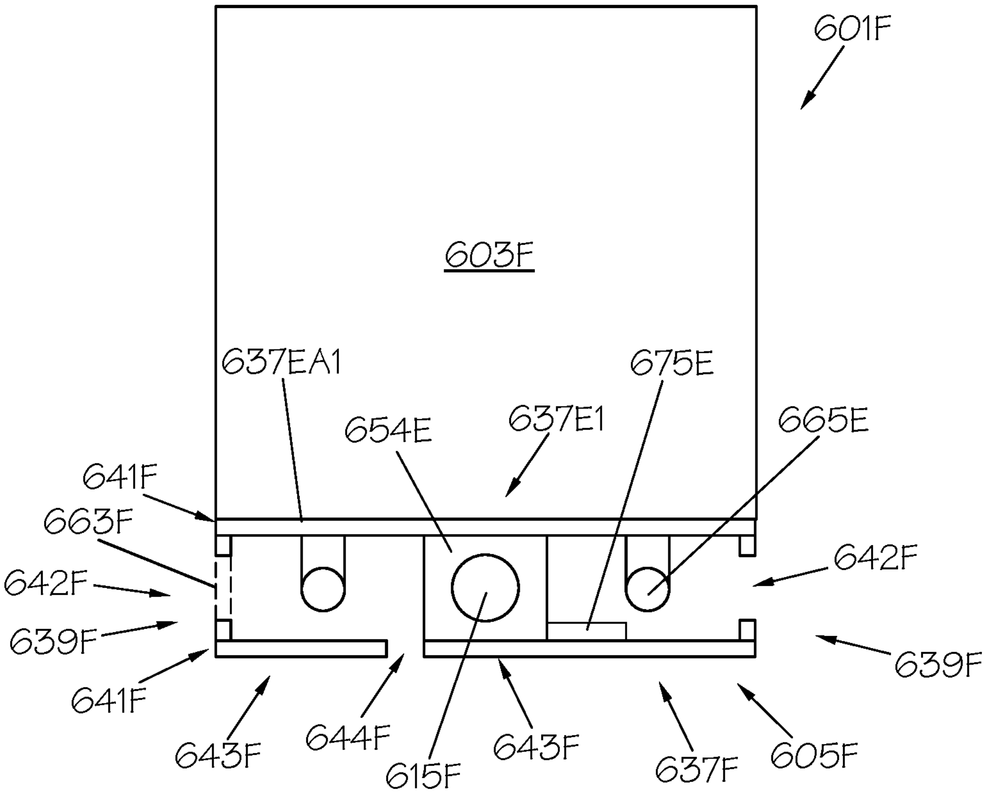
FIG. 50C illustrates a diagram of a front view of again another example liquid supply apparatus.

FIG. 50C illustrates a diagram of another example supply apparatus 601F and interface structure 605F. Here the interface structure 605F includes at least one first lateral guide surface 641F at the lateral sides 639F, with a lateral clearance slot 642F to clear corresponding lateral guide rails of the receiving station. In the illustrated example two opposite first lateral guide surfaces 641F are provided at opposite sides of the lateral clearance slot 642F. Both lateral sides 639F may be provided with first lateral guide surfaces 641F and clearance slots 642F. In a further example a secure feature such as a stop surface 663F may be provided near a front of the interface structure 605F, for example bridging the lateral clearance slot 642F, at one or both lateral sides 639F. The interface structure 605F may include at least one first intermediate guide surface 643F at the distal side 637F, with an intermediate clearance slot 644F to clear a corresponding guide rail of the receiving station. In the illustrated example two opposite first intermediate guide surfaces 643F are provided at opposite sides of the intermediate clearance slot 644F. The clearance slots 642F, 644F may facilitate passing of the interface structure 605F along guide rails of a receiving station without being guided by the guide rails. In one example the first guide surfaces 641F, 643F and/or outer walls of the container 603F and/or key pens 665F may provide for sufficient guidance to fluidically connect the liquid interface 615F to a liquid input of the receiving station.

The example interface structures of FIGS. 48, 49, 50, 50A, 50B and 50C may project from the container in a similar manner as other example interface structures described in this disclosure, for example projecting from a first container side, near a second container side that is at approximately straight angles with the first container side, and at a distance from an opposite third side of the container that is opposite to and at a distance from the second side, whereby the container may project beyond the liquid interface edge in the projection direction towards the third side. Also a liquid channel reservoir connecting portion may be provided, for example protruding from the interface structure, to connect to the respective reservoir. Similar to other examples of this disclosure, the interface components may have similar positions with respect to each other and/or the center plane CP.

Figure 51:
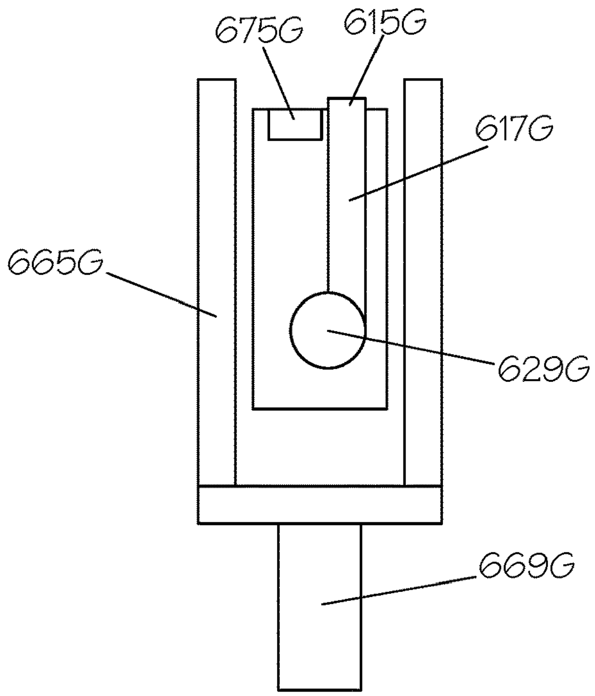
FIG. 51 illustrates a diagram of a cross sectional top view of examples of an interface structure and a key pen structure.

FIG. 51 illustrates a diagram of a cross sectional top view of an example of an interface structure 605G that, similar to the drawing of FIG. 50, does not include fixed keys. The interface structure 605G comprises a liquid channel 617G, including the liquid channel interface 615G, and a further reservoir connecting portion 629G to connect to the container. A separate key pen structure 665G is provided which would allow an operator to connect the interface structure 605G with the liquid needle and data connection of the receiving station, while actuating or unlocking certain actuators in the receiving station with the separate key pen structure 665G. In this example the key pen structure 665G includes a pair of key pens which may be similar to any of the example pairs of key pens illustrated throughout this disclosure. The pair of key pens may be connected through a single key pen structure 665G, for example through a grip portion 669G, to facilitate manual operation of the key pen structure 665G.

Figure 52:
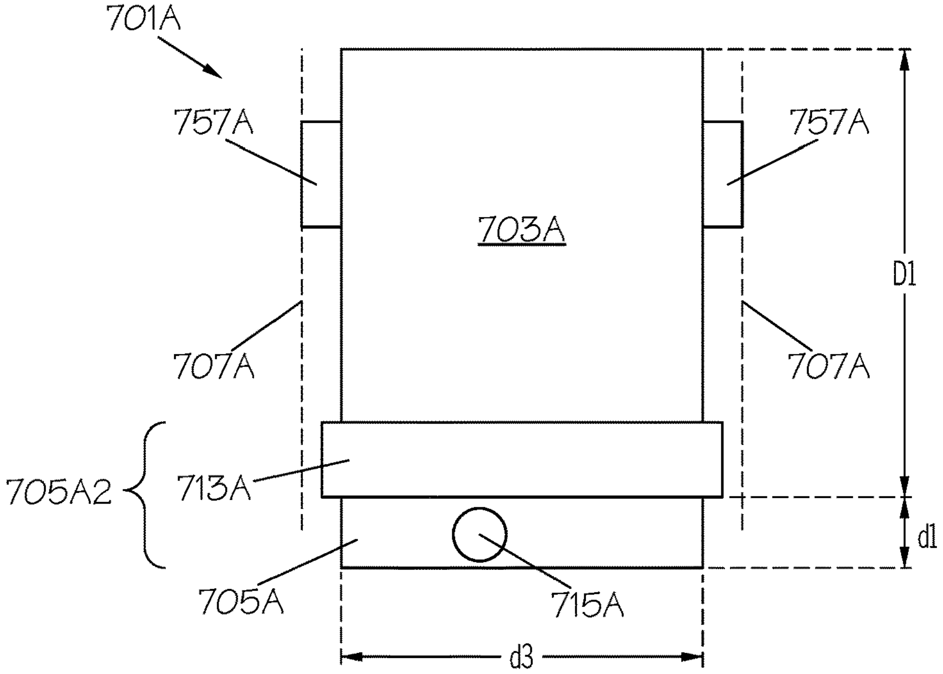
FIG. 52 illustrates a diagram of a front view of again another example liquid supply apparatus.
Figure 53:
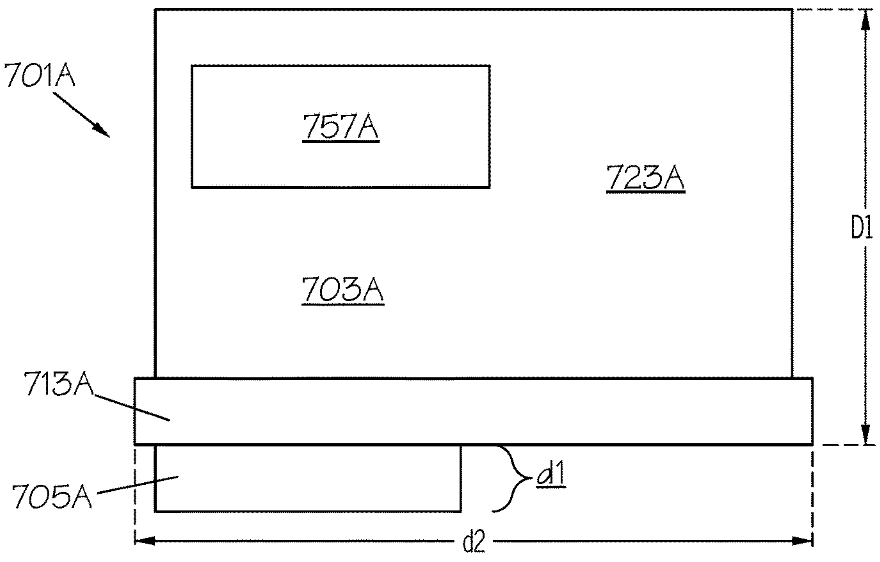
FIG. 53 illustrates a diagram of a side view of the example liquid supply apparatus of FIG. 52.

FIGS. 52 and 53 illustrate a diagrammatic front and side view, respectively, of an example supply apparatus 701A having a different example secure feature 757A than previous examples and a different example interface structure 705A than previous examples. A single structure 705A2 includes an interface structure 705A and a container support portion 713A. The single structure 705A2 may be a separately manufactured, e.g. molded, structure for later assembly to the rest of the container 703A. In this example the support portion 713A provides for some support to a projecting portion 723A of the container 703A, the support portion 713A and the projecting portion 723A both projecting beyond the liquid interface 715A of the interface structure 705A. The interface structure portion 705A projects from a bottom of the support portion 713A. The interface structure portion 705A includes components that interface with the receiving station including the liquid channel interface 715A, the integrated circuit contact pads, and at least one of guide features, key pens, etc. within its first, second and third dimensions. The first interface dimension d1, which determines the profile height of the interface structure 705A, extends between the bottom of the support portion 713A and the bottom of the interface structure 705A.

The supply apparatus 701A includes secure features 757A that may, at least to some extent, secure the supply apparatus 701A to walls 707A of a receiving station. In one example the secure features 757A include pads or elements to friction fit the supply apparatus to the receiving station, for example of elastomer material. The supply apparatus 701A may be pressed between walls of the receiving station whereby the elastomer material provides for sufficient friction, in combination with some clamping force between opposite receiving station walls 707A, to retain the supply apparatus 701A in seated condition. Other secure features could include latches, hooks, or clips, for example to latch, hook or clip to edges of the receiving station. These other secure features could be provided in, or attached to, any of the supply apparatus components such as the structure 705A2 or interface structure 705A. The example secure features 157 addressed in other parts of this disclosure, including the clearance 159 and stop 163 at the lateral side 139, may be omitted, and replaced by these other secure features or the friction fit elements, while certain other interface components such as one or more of the liquid interface 715A, integrated circuit contact pads, key pens, guide features, etc. could be included in the interface structure 705A.

Figure 54:
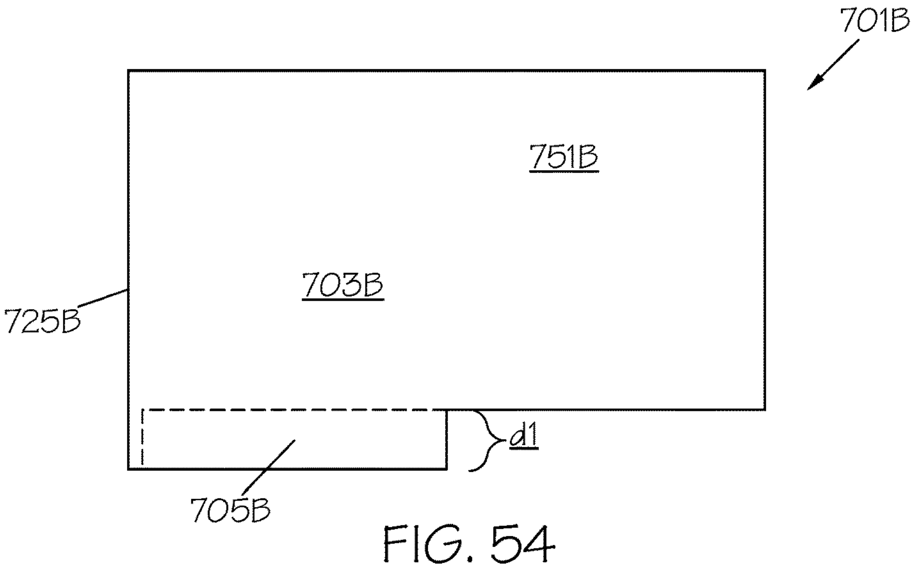
FIG. 54 illustrates a diagram of a side view of again another example liquid supply apparatus.
Figure 55:
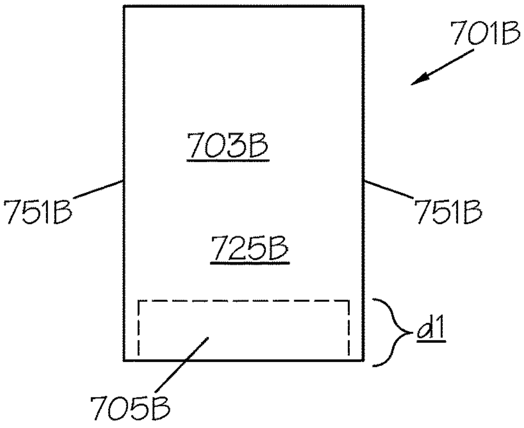
FIG. 55 illustrates a diagram of a front view of the example liquid supply apparatus of FIG. 54.

FIGS. 54 and 55 illustrate a diagrammatic side and back view, respectively, of another example supply apparatus 701B wherein parts of a support structure 735B extend over the interface structure 705B. A back wall 125B and/or side walls 751B of the support structure 735B extend along the interface structure 705B over the projection distance of the interface structure 705B, that is, along both the first container and interface dimension D1, d1. Lateral guide features could be provided in the side walls 751B of the support structure 735B next to the interface structure 705B (not shown). The interface structure 705B may be, to some extent, embedded in the support structure 735B.

Figure 56:
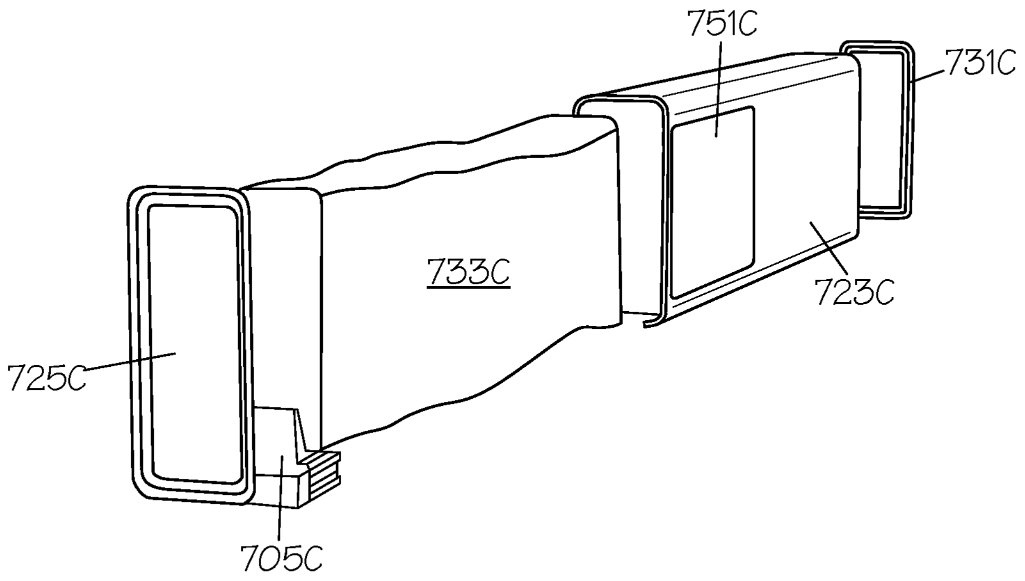
FIG. 56 illustrates a perspective view of again another example liquid supply apparatus in partially disassembled state.
Figure 57:
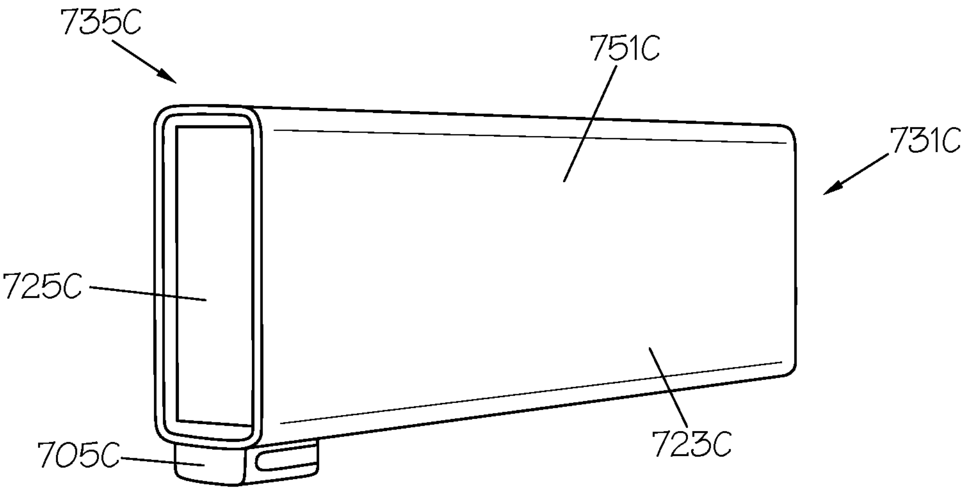
FIG. 57 illustrates another perspective view of the example liquid supply apparatus of FIG. 56 in assembled state.

FIGS. 56 and 57 illustrate perspective views of another example supply apparatus 701C in accordance with aspects of this disclosure, in a partially disassembled state and an assembled state, respectively. In the illustrated example the support structure 735C may be generally sleeve shaped facilitating that the bag reservoir 733C can slide into the sleeve shaped support structure 735C. The support structure 735C may include a sleeve shaped body portion 751C and a back and front wall 725C, 731C, respectively, to close respective ends of the sleeve shaped body portion 751C. The body portion 751C may include an opening through which the interface structure 705C projects, whereby the opening may be provided near the back 725C and a projecting portion 723C may extend over most of the length of the body portion 751C towards the front 731C. In an example the support structure 735C include plastics material. The back 725C and body portion 751C may be pre-attached or form a single integral body. In one example the interface structure 705C may be attached to, or an integral part of, the back 725C and/or the body portion 751C. The main liquid flow direction DL may extend out of the liquid interface, along the projecting portion 723C that projects over and beyond the interface structure 705C.

Figure 58:
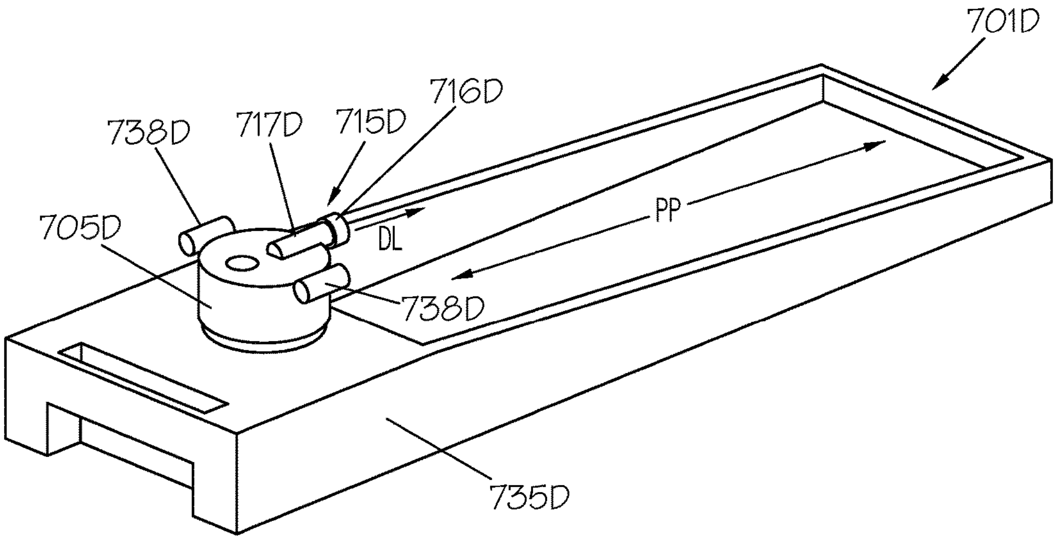
FIG. 58 illustrates a perspective view of again another example liquid supply apparatus.
Figure 59:
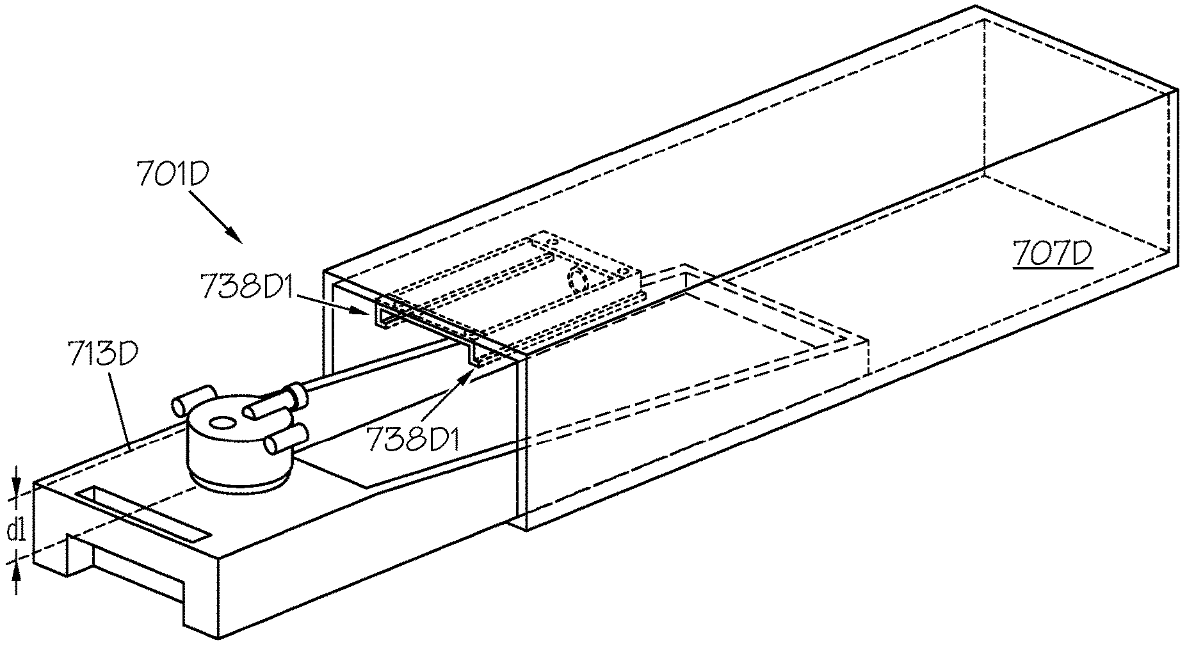
FIG. 59 illustrates again a perspective view of the example liquid supply apparatus of FIG. 58 being installed into a corresponding receiving station.

FIGS. 58 and 59 illustrate perspective views of portions of another example supply apparatus 701D in accordance with different aspects of this disclosure, wherein in both drawings the bag reservoir has been omitted, and in FIG. 59 the supply apparatus 701D is illustrated while being inserted into a receiving station 707D. The support structure 735D may be a tray, for example a carton tray, to support the bag. The projection distance PP of the support structure 735C beyond the liquid interface edge 716D is indicated in FIG. 58, illustrating how the container projects parallel to the main liquid flow direction DL beyond the interface liquid interface edge 716D. The interface structure 705D projects from the respective side 713D of the support structure 735D, in this example a top side, over the extent of the first interface dimension d1. The interface structure 705D includes cylindrical elongate lateral guide features 738D at the lateral and distal sides of the interface structure 705D that serve to guide the interface structure 705D with respect to corresponding guide rails 738D1 of the receiving station 707D along the main liquid flow direction DL, while limiting the degree of freedom in the directions of the first and third interface dimensions, to position the liquid outlet interface 715D with respect to the liquid input of the receiving station.

Figure 60:
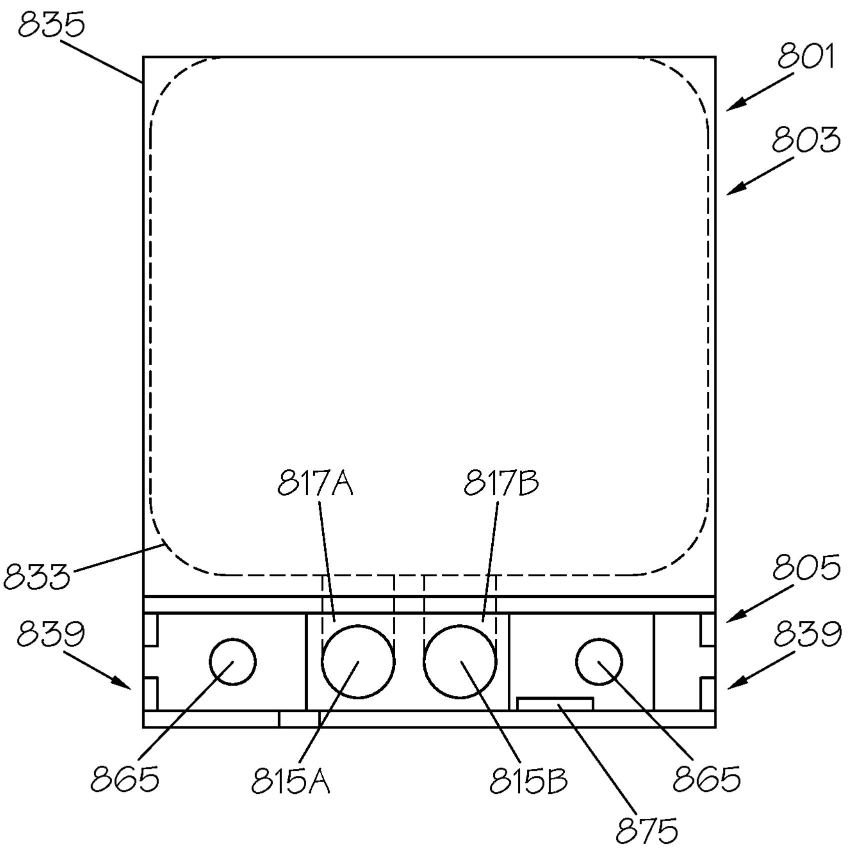
FIG. 60 illustrates a diagram of a front view of yet another example liquid supply apparatus.

FIG. 60 illustrates a diagram of an example supply apparatus 801 and interface structure 805 that include a plurality of fluid interfaces. The container 803 may include at least one of a support structure 835 and reservoir 833. The interface structure 805 may include at least one of key pens 865, integrated circuit contact pads 875, guide features, etc. In addition, in one example the interface structure 805 of FIG. 60 includes two liquid channels 817A, B to connect the reservoir 833 with two fluid needles of a single receiving station. The liquid channels 817A, 817B may include a liquid input and liquid output, or both liquid channels and interfaces 817A, 817B, 815A, 815B may be bi-directional. The liquid channels 817A, 817B comprise respective interfaces 815A, 815B to connect to respective liquid interfaces of the receiving station, for example including seals to seal to the needles. This example supply apparatus 801 facilitates mixing or circulation of liquid in the reservoir 833. Mixing, moving or recirculating liquid in the reservoir 833 can be advantageous for pigment inks or other liquids, for example to prevent settling of particles in a carrier liquid.

The different interface components other than the liquid channel components 815A, 815B, 817A, 817B have similar functions, positions and orientations as in the other examples of this disclosures. The plurality of liquid interfaces 815A, 815B and channels 817A, 817B can be positioned adjacent each other, or distanced from each other with perhaps other interface components in between. For example, one or both of the interfaces 815A, 815B and/or channels 817A, 817B could be moved closer to a lateral side 839, whereby for example certain interface components, such as the integrated circuit or at least one of the key pens, may extend between the different interfaces 815A, 815B and/or channels 817A, 817B.

In other examples the container of this disclosure may comprise a liquid reservoir and a vent and/or pressurizing mechanism connected to the inside of the reservoir. For example, such container may include a relatively rigid or hard-shell liquid reservoir. A secondary fluid interface may be provided similar to FIG. 60, wherein the secondary fluid interface may connect to the internal pressurizing mechanism of the container. The pressurizing mechanism may include a bag, expandable chamber, flexible film, balloon, or air blowing connection, or the like, to allow for pressurization of the inside of the reservoir. Such container may be for a relatively small volume supply apparatuses. The interface structure may project from a respective side of the relatively rigid container.

It is also noted that, although this disclosure addresses liquid channels and liquid interfaces, the liquid channels and liquid interfaces may serve to transport any fluid, for example liquids comprising gases.

In different examples of this disclosure, integrated circuits and respective contact pads are discussed. Such integrated circuit may include a data storage device and certain processor logic. The integrated circuit may function as a micro-controller, for example a secure micro-controller. Data stored on the storage device may include at least one of characteristics of the liquid, data to indicate a remaining liquid volume, a product ID, digital signatures, base keys for calculating session keys for authenticated data communications, color transform data, etc. In addition, dedicated challenge response logic may be provided in the integrated circuitry, in addition to the data storage device and processor logic. The supply apparatus may be authenticated by a printer controller by issuing certain challenges that the integrated circuit needs to respond to. The integrated circuit may be configured to return at least one of a message authentication code, session key, session key identifier and digitally signed data for verification by the printer controller. In certain examples, warranty, operating conditions and/or service conditions for a printer to which the supply apparatus is connected may depend on positive authentication of the integrated circuit by the printer controller. When a positive authentication cannot be established, this may point to the use of unknown or non-authorized supplies which in turn may increase a risk of damage to the printer, or lower quality print output. Where the integrated circuit cannot be positively authenticated, the printer controller may facilitate switching to a safe or default print mode, for example with reduced yet safer printer operating conditions, and/or facilitating modified warranty and/or service conditions.

In this disclosure, when referring to a front, back, top, bottom, side, lateral side, height, width and length of a component, this should in principle be interpreted as for illustration only, because components of the supply apparatus may be oriented in any suitable direction in three-dimensional space. For example, a collapsible liquid reservoir may be emptied in any orientation whereby the liquid interface and main liquid flow direction may be correspondingly directed in any direction, like upwards, downwards, sideways, etc., and the reservoir may correspondingly hang, protrude, stand, incline or point in any direction. The supply apparatus and interface structure of this disclosure may facilitate connection to different types of receiving stations or printers in any orientation.

While in this disclosure several examples are shown wherein the container and interface structure are, and/or include, separately manufactured components, for example the container including a carton and bag and the interface structure including a molded assembly, in other examples the container and interface structure may be at least partially manufactured (e.g. molded) together, or certain components of the container may be molded together with certain components of the interface structure.

The first, second and third dimensions of the interface structure refer to x, y, and z-axes, and extents along which the interface structure extents. As explained and illustrated, certain examples portions of the interface structure may extent outside of the first, second and third interface dimensions such as the reservoir connecting liquid channel portion or certain protruding support flanges. Hence, the interface dimensions d1, d2, d3 may refer to a projecting portion of the interface structure within which some or all of the interface components to interface with the receiving station extend. For example, the front push area edge and the distal side that supports the integrated circuit may extend within and/or define the first interface dimension d1. For example, the external lateral sides of the interface structure may define the third interface dimension, and in absence of these lateral sides, at least the opposite key pens may extent within the third interface dimension d3. The front liquid interface edge and the back of the interface structure may define the second interface dimension d2.

In this disclosure reference is made to axes and directions. Axes refer to a specifically oriented imaginary reference lines in three-dimensional space. A direction refers to a general course or direction.

In one example the liquid is to flow, mainly, from the container reservoir to the receiving station and hence in this disclosure respective flow directions portions may be referred to as "upstream" and "downstream" along the main liquid flow direction. However, there may be bi-directional flow in the channel between the container and the liquid interface whereby during periods of time a liquid may flow from the receiving station towards the container. Also, there may be two liquid channels with opposite flow directions at a given point in time. It will be understood that the definition of downstream and upstream refers to the main direction of flow between the container and the receiving station for printing. In examples where there are two fluid needles with each, at a given point in time, an opposite direction of flow for recirculating ink in the container, two similar liquid channels and interfaces may be provided in the supply apparatus. Again, each liquid channel may be adapted to facilitate flow in any direction inside the channel and through the interface. Still, the main flow direction will be determined by the general positive delta of liquid that needs to flow towards the receiving station to supply the liquid for printing.

Where a receiving station has two protruding needles to connect to a single supply apparatus for recirculating or mixing liquid in a supply apparatus, one needle of the receiving station may be serve as an input and another needle may serve as an output at a given point in time. Correspondingly, the interface structure may include two liquid interfaces and two liquid channels, one liquid interface serving as an input and another as output, although there may be bi-directional flow through each needle and interface. Any second needle and corresponding second liquid interface may have a similar design and configuration a first needle and liquid interface, as addressed throughout this disclosure, whereby the first and second needle/interface may extend in parallel to facilitate insertion and removal of the supply apparatus with respect to the receiving station. Other interface components like the interface front or front push area may similarly be duplicated or enlarged if two liquid channels and interfaces are used.

Similar to a secondary liquid needle, in further examples that are included within this disclosure, there may be further fluid needles to communicate gas with the supply apparatus, for example to communicate gas to a space between the reservoir and the support structure, or to communicate gas with a secondary gas reservoir inside the main liquid reservoir. Such further fluid or gas interface may facilitate pressurizing, service, or other functions. In these examples, a gas interface may be provided next to or between the disclosed interface components.

The axis along which the main liquid flow direction extends may be determined by internal walls of the needle receiving liquid channel portion and/or internal seal channel, for example by a central axis of these liquid channel components. It will be understood that liquid may not flow exactly straight nor that internal liquid guiding channel walls have to have perfectly round or straight shapes, whereby in certain instances it may be hard to determine an exact liquid flow axis. The skilled person will understand that the liquid flow direction is intended to reflect a general direction of flow from the supply apparatus to a printer receiving station, for example through the inserted needle along a needle axis. Also, the needle insertion direction may be determined by internal walls of the needle receiving liquid channel portion and/or internal seal channel, for example by a central axis of these liquid channel components, to enable insertion of the needle. The main liquid flow direction is parallel and opposite to the needle insertion direction.

In this disclosure certain features are identified as “first”, “second”, “third”, etc. to identify different aspects or features that have a similar name or purpose. For example, this disclosure addresses planes, guide features, recesses, keys, and other feature sets wherein individual features within these sets are identified by such “first”, “second”, etc. It will be understood that this type of identification is meant to distinguish between features that have similar aspects or purposes, but that throughout the claims and description a different numbering may be used for the same features depending on the context. For example, depending on the context, what is a sixth or seventh plane in the description may be referred to as a first or second or intermediate or offset plane in a dependent claim or at another location of the description.

Shorter or longer key pen lengths than the lengths indicated in this disclosure may be implemented to facilitate actuation, for example shorter than 10 mm or longer than 23 mm. Also, color-discriminating key pens or non-discriminating master key pens can be used whereby either of those may protrude beyond the liquid interface edge for example further than 5 mm or further than 10 mm beyond the liquid interface edge in the main liquid flow direction.

The supply of this disclosure can be inserted in a fully filled state, having a relatively high weight, and thereafter be unmounted in a substantially exhausted state, having a relatively lighter weight, in a relatively user-friendly way. During installation, the key pens may actuate upon a receiving station transmission mechanism which may be calibrated to accommodate the difference in weight between insertion and ejection. For example, a relatively light push may be sufficient to insert a filled, relatively high weight supply apparatus, while after exhaustion the empty, relatively low weight supply apparatus may be prevented from launching with respect to the receiving station. The interface structure may facilitate guided and relatively precise alignment of a filled, relatively high weight supply apparatus to a receiving liquid needle, whereby a relatively low amount of effort and experience is required from the operator.

Certain aspects addressed in this disclosure may facilitate the use of materials and components that reduce a potential impact on the environment. Certain aspects addressed in this disclosure facilitate space and foot print efficiency of the supply apparatus and associated printer. For example, the supply apparatus may have a relatively thin aspect ratio. For example, the interface structure may have a relatively low projecting profile height, as defined by its first dimension.

Other aspects addressed in this disclosure may facilitate enhanced modularity of the supply apparatus components. For example, the interface structure can be used for a wide range of different supply volumes for different printer platforms. In one example a single container or reservoir may be used for multiple volume supply apparatus through partially filling. For example, a filled on-the-shelf supply apparatus may include a reservoir bag that has a capacity of 1 L or more, whereby the same reservoir bag could be used for different supply apparatus products that contain, for example, 500 ml or 700 ml or 1 L of print liquid.

Also, the interface structure can be leveraged for connection to a relatively wide variety of different print system platforms. Whereas prior to the filing date of this disclosure an equivalent variety of print system platforms were associated with a wide range of different supply platforms, for example more than three or four different supply platforms of different designs, now the same variety of print system platforms may use a single interface structure and supply apparatus platform.

The supply apparatuses, interface structures and components of this disclosure can be applied to fields other than printing, for example any type of liquid dispense system, and/or liquid circulation circuit. For example, the print liquid supply may contain liquids other than print liquids, for example liquids that are to be contained in impermeable reservoirs, to retain certain properties over time. The application areas of these other fields may include medical, pharmaceutical or forensic applications, or food or beverage applications, for example. For that purpose, where in the description and claims a print liquid is mentioned, this may be replaced by any fluid or liquid. Also print systems or print platforms may be replaced by any fluid or liquid handling platform.

As noted at the beginning of this description, the examples shown in the figures and described above illustrate but do not limit the invention. Other examples that are not illustrated in this disclosure can be derived through either derivation or combination of different disclosed and non-disclosed features. The foregoing description should not be construed to limit the scope of the invention, which is defined in the following claims.

In one aspect, this disclosure involves a print liquid supply apparatus, comprising a container to hold print liquid, and an interface structure to fluidically connect the container to a receiving station. The container has a first, second and third dimension that are perpendicular to each other. The interface structure has a first, second and third dimension parallel to said first, second and third dimension of the container, respectively. In one example, the interface structure projecting outwards with respect to the container along the first dimension of the interface structure. The first dimension of the interface structure may be less than half of the first dimension of the container. The interface structure comprises a liquid interface to fluidically connect to a corresponding fluidic interface of the receiving station, and a liquid channel fluidically connecting the container and the liquid interface, wherein the liquid channel and interface may define a main liquid flow direction approximately parallel to the second dimension of the interface and container.

In another aspect, this disclosure involves a print liquid supply apparatus to supply liquid to a liquid needle of a receiving station comprising a liquid container including an at least partially collapsible liquid reservoir to hold at least 90 ml of print liquid, including reservoir wall material adapted to inhibit fluid transfer, and an interface structure at a side of the container. The interface structure includes (i) a rigid molded fluidic structure adapted to facilitate a fluidic connection with the receiving station, (ii) a liquid channel that includes a reservoir connecting portion that fluidically connects to the reservoir to allow the liquid to flow from the reservoir to and through a liquid channel of the interface structure, (iii) a liquid interface of the liquid channel at a distance from the reservoir connecting portion, the interface including a seal to receive a liquid needle, wherein a respective needle receiving liquid channel portion and/or the seal define a needle insertion direction, (iv) a front wall or edge including a push area which is disposed between the liquid interface and the container, (v) at least one key pen base and key pen protruding from the base in a direction parallel and opposite to the needle insertion direction, at a lateral side of the needle receiving liquid channel portion, the key pen having a respective actuating surface area at least 10 mm distant from the base, to pass through a key slot and actuate upon an actuator of the receiving station, wherein the level of the actuating surface area, as measured along the needle insertion direction, is (a) between approximately 5 and 0 mm short of the level of the liquid interface edge and/or front push area, or (b) extends beyond that level; and (vi) a contact pad array at a lateral side of the needle receiving liquid channel portion, wherein the contact pad array is arranged at an opposite to the container, wherein contact surfaces of the contact pads face towards the container, and wherein the key pen, needle receiving liquid channel portion and liquid interface are intersected by a first virtual reference plane parallel to, and at a distance from, a second virtual reference plane that intersects the contact pad array.

In again another aspect, this disclosure involves a method of assembling different components to obtain an interface structure and/or supply apparatus of any example of this disclosure, wherein at least one of the to-be-assembled components is collected after a previous usage in a printer in the field. For example, a supply apparatus can be collected after exhaustion, after which the interface structure can be separated from the container. The key pens and the single molded base structure can be disassembled. Then, one of (i) newly manufactured key pens, or (ii) previously used and collected key pens may be connected and positioned with respect to the base structure in an orientation that corresponds to the desired receiving station and liquid type.

In other aspects, this disclosure involves an interface structure for any of these liquid supply apparatuses. In another aspect this disclosure involves a key pen. In again others aspect, this disclosure involves an intermediate product to provide any of such liquid supply apparatus wherein the intermediate product may be a kit of components.

What is claimed is:

1. A print liquid supply apparatus comprising:

a container to hold print liquid, the container having a first dimension, a second dimension, and a third dimension that are perpendicular to each other;

an interface to fluidically connect the container to a receiving station, the interface:

having a first dimension, a second dimension, and a third dimension parallel to the first, second, and third dimensions of the container, respectively;

projecting outwards with respect to the container along the first dimension of the interface, the first dimension of the interface less than half of the first dimension of the container;

having a liquid interface to fluidically connect to a corresponding fluidic interface of the receiving station; and having a liquid channel fluidically connecting the container and the liquid interface, the liquid channel and the liquid interface defining a main liquid flow direction approximately parallel to the second dimension of the interface and the second dimension of the container;

integrated circuit contact pads laterally next to at least one of the liquid channel or the liquid interface;

a first key pen at a first lateral side of the channel; and a second key pen at a second lateral side of the channel, the second lateral side opposite the first lateral side of the channel, the first key pen extending at the same side of the liquid channel as the integrated circuit contact pads, with the integrated circuit contact pads extending laterally between the liquid channel and the first key pen to allow a data connector to pass through between the liquid channel and the first key pen, and a first distance between the first key pen and the liquid channel is greater than a second distance between the second key pen and the liquid channel.

2. The print liquid supply apparatus of claim 1, wherein a projecting portion of the container projects in a direction parallel to the main liquid flow direction surpassing the liquid interface in the main liquid flow direction.

3. A print liquid supply apparatus comprising:

a container to hold print liquid, the container having a first dimension, a second dimension, and a third dimension that are perpendicular to each other;

an interface to fluidically connect the container to a receiving station, the interface:

having a first dimension, a second dimension, and a third dimension parallel to the first, second, and third dimensions of the container, respectively;

projecting outwards with respect to the container along the first dimension of the interface, the first dimension of the interface less than half of the first dimension of the container;

having a liquid interface to fluidically connect to a corresponding fluidic interface of the receiving station; and having a liquid channel fluidically connecting the container and the liquid interface, the liquid channel and the liquid interface defining a main liquid flow direction approximately parallel to the second dimension of the interface and the second dimension of the container; and integrated circuit contact pads laterally next to at least one of the liquid channel or the liquid interface, wherein the integrated circuit contact pads extend near a distal side of the interface, contact surfaces of the integrated circuit contact pads extending in a first virtual reference plane parallel to the second dimension of the interface and third dimension of the interface and along a line parallel to the third dimension of the interface, facing the container, the first virtual reference plane extending at a distance from a second virtual reference plane parallel the second dimension of the interface and third dimension of the interface, the second virtual reference plane intersecting said liquid channel and liquid interface.

4. The print liquid supply apparatus of claim 3, further including:

a first recess at a first lateral side of the liquid channel;

a second recess at a second lateral side of the liquid channel, the second lateral side opposite the first lateral side; and a key pen extending into one of the first recess or the second recess next to and approximately parallel to the liquid channel, and the key pen also intersected by the second virtual reference plane.

5. A print liquid supply apparatus comprising:

a container to hold print liquid, the container having a first dimension, a second dimension, and a third dimension that are perpendicular to each other; and an interface to fluidically connect the container to a receiving station, the interface:

having a first dimension, a second dimension, and a third dimension parallel to the first, second, and third dimensions of the container, respectively;

projecting outwards with respect to the container along the first dimension of the interface, the first dimension of the interface less than half of the first dimension of the container;

having a liquid interface to fluidically connect to a corresponding fluidic interface of the receiving station;

having a liquid channel fluidically connecting the container and the liquid interface, the liquid channel and the liquid interface defining a main liquid flow direction approximately parallel to the second dimension of the interface and the second dimension of the container; and having at least one first relatively flat and elongate guide surface that is elongate in a direction along the second dimension of the interface, to guide the interface along a corresponding guide of the receiving station.

6. The print liquid supply apparatus of claim 5, further including integrated circuit contact pads laterally next to at least one of the liquid channel or the liquid interface.

7. A print liquid supply apparatus comprising:

a container to hold print liquid, the container having a first dimension, a second dimension, and a third dimension that are perpendicular to each other; and an interface to fluidically connect the container to a receiving station, the interface:

having a first dimension, a second dimension, and a third dimension parallel to the first, second, and third dimensions of the container, respectively;

projecting outwards with respect to the container along the first dimension of the interface, wherein the first dimension of the interface, as measured between the outer wall of the container from which the interface projects and an opposite distal side of the interface, is at least six times smaller than the first dimension of the container, at least in a filled state of the container;

having a liquid interface to fluidically connect to a corresponding fluidic interface of the receiving station; and having a liquid channel fluidically connecting the container and the liquid interface, the liquid channel and the liquid interface defining a main liquid flow direction approximately parallel to the second dimension of the interface and the second dimension of the container.

8. The print liquid supply apparatus of claim 7, wherein the container includes a reservoir to hold the print liquid, the reservoir having a liquid, air, and vapor barrier function, and being adapted to at least partially collapse while print liquid flows out of the reservoir through the liquid channel, and the interface being relatively rigid to facilitate guiding the interface with respect to the liquid input of the receiving station.

9. A print liquid supply apparatus comprising:

a container to hold print liquid, the container having a first dimension, a second dimension, and a third dimension that are perpendicular to each other; and an interface to fluidically connect the container to a receiving station, the interface including:

a first dimension, a second dimension, and a third dimension parallel to the first, second, and third dimensions of the container, respectively; and a projecting portion projecting outwards with respect to the container along the first dimension of the interface, the first dimension of the interface less than half of the first dimension of the container, the projecting portion including:

a liquid channel;

a liquid interface to fluidically connect to a corresponding fluidic interface of the receiving station, the liquid channel fluidically connecting the container and the liquid interface, the liquid channel and the liquid interface defining a main liquid flow direction approximately parallel to the second dimension of the interface and the second dimension of the container;

a push area edge between the liquid interface and the container; and integrated circuit contact pads, wherein contact surfaces of the integrated circuit contact pads extend parallel to, and at a distance from, a virtual reference plane that is parallel to the second dimension of the interface and the third dimension of the interface and that intersects the liquid channel and the liquid interface, and the push area edge extends at a distance from said virtual reference plane, at the opposite side of the virtual reference plane with respect to the integrated circuit contact pads, adjacent a container side from which the interface projects.

10. The print liquid supply apparatus of claim 9 wherein the projecting portion of the interface further includes:

key pens approximately parallel to and at opposite lateral sides of the liquid channel; and at least one secure feature at an external lateral side of a respective key pen, the secure feature including at least one of a clearance or a stop surface, wherein the key pens and the at least one secure feature are also intersected by said virtual reference plane.

11. The print liquid supply apparatus of claim 10, wherein the projecting portion of the interface further includes a first recess at a first lateral side of the liquid channel and a second recess at a second lateral side of the liquid channel, the second lateral side opposite the first lateral side, a first of the key pens extending in the first recess and a second of the key pens extending in a second recess, the first key pen and the second key pend protruding from respective bases of the respective first and second recesses.

12. A print liquid supply apparatus comprising:

a container to hold print liquid, the container having a first dimension, a second dimension, and a third dimension that are perpendicular to each other; and an interface to fluidically connect the container to a receiving station, the interface:

having a first dimension, a second dimension, and a third dimension parallel to the first, second, and third dimensions of the container, respectively;

projecting outwards with respect to the container along the first dimension of the interface, the first dimension of the interface less than half of the first dimension of the container;

having a liquid interface to fluidically connect to a corresponding fluidic interface of the receiving station;

having a liquid channel fluidically connecting the container and the liquid interface, the liquid channel and the liquid interface defining a main liquid flow direction approximately parallel to the second dimension of the interface and the second dimension of the container; and having a front push area that extends at least partially around, and adjacent to, the liquid interface, up to a container side from which the interface projects.

13. The print liquid supply apparatus of claim 12, wherein the liquid interface, a needle receiving portion of the liquid channel, the front push area adjacent the liquid interface, integrated circuit contact pads, at least one of a key pen or at least one guide feature for guiding the print liquid supply apparatus along the second dimension of the container, and a secure feature all extend within a contour of the container along the second dimension of the container and the third dimension of the container.

14. A print liquid supply apparatus comprising:

a container to hold print liquid, the container having a first dimension, a second dimension, and a third dimension that are perpendicular to each other; and an interface to fluidically connect the container to a receiving station, the interface:

having a first dimension, a second dimension, and a third dimension parallel to the first, second, and third dimensions of the container, respectively;

projecting outwards with respect to the container along the first dimension of the interface, the first dimension of the interface less than half of the first dimension of the container;

having a liquid interface to fluidically connect to a corresponding fluidic interface of the receiving station;

having a liquid channel fluidically connecting the container and the liquid interface, the liquid channel and the liquid interface defining a main liquid flow direction approximately parallel to the second dimension of the interface and the second dimension of the container; and having an interface front, adjacent the liquid interface and between the liquid interface and a container side from which the interface projects, the interface front including an edge adjacent said container side.

15. A print liquid supply apparatus comprising:

a container to hold print liquid, the container having a first dimension, a second dimension, and a third dimension that are perpendicular to each other; and an interface to fluidically connect the container to a receiving station, the interface:

having a first dimension, a second dimension, and a third dimension parallel to the first, second, and third dimensions of the container, respectively;

projecting outwards with respect to the container along the first dimension of the interface, the first dimension of the interface less than half of the first dimension of the container;

having a liquid interface to fluidically connect to a corresponding fluidic interface of the receiving station;

having a liquid channel fluidically connecting the container and the liquid interface, the liquid channel and the liquid interface defining a main liquid flow direction approximately parallel to the second dimension of the interface and the second dimension of the container; and having a wall portion defining a push area, the wall portion located between a liquid interface edge and the container, wherein the push area is to engage a protective structure of a needle to expose the needle during installation.

16. The print liquid supply apparatus of claim 15, wherein a smallest distance between the liquid interface edge and the (i) container side or (ii) an adjacent front edge of the interface, along the first dimension of the interface, represents a height of said push area, and the height is less than (i) the inner diameter of the liquid interface edge or (ii) the outer diameter of a seal in the liquid interface.

17. A print liquid supply apparatus comprising:

a container to hold print liquid, the container having a first dimension, a second dimension, and a third dimension that are perpendicular to each other; and an interface to fluidically connect the container to a receiving station, the interface:

having a first dimension, a second dimension, and a third dimension parallel to the first, second, and third dimensions of the container, respectively;

projecting outwards with respect to the container along the first dimension of the interface, the first dimension of the interface less than half of the first dimension of the container;

having a liquid interface to fluidically connect to a corresponding fluidic interface of the receiving station;

having a liquid channel fluidically connecting the container and the liquid interface, the liquid channel and the liquid interface defining a main liquid flow direction approximately parallel to the second dimension of the interface and the second dimension of the container; and having a secure feature to facilitate securing the apparatus to a receiving station, the secure feature at a lateral side of the interface, wherein the secure feature includes:

a clearance, to allow a secure element to protrude at least partially into the clearance; and a stop surface at a front side of the clearance as defined by the main liquid flow direction, wherein the clearance is defined by a hole in a wall that defines the lateral side of the interface, and wherein the stop surface is to engage the secure element at least when the secure element protrudes in the clearance so that the secure element is to be retracted to allow the stop surface to pass the secure element.

18. The print liquid supply of claim 17, wherein the secure feature extends laterally next to, and on the outside of, a protruding key pen which extends laterally next to and along the liquid channel, so that the secure feature, key pen and liquid channel are intersected by a virtual reference plane parallel to the second dimension of the interface and the third dimension of the interface.

19. A print liquid supply apparatus comprising:

a container to hold print liquid, the container having a first dimension, a second dimension, and a third dimension that are perpendicular to each other; and an interface to fluidically connect the container to a receiving station, the interface having a first dimension, a second dimension, and a third dimension parallel to the first, second, and third dimensions of the container, respectively, the interface projecting outwards with respect to the container along the first dimension of the interface, the first dimension of the interface less than half of the first dimension of the container, the interface including:

a liquid interface to fluidically connect to a corresponding fluidic interface of the receiving station;

a liquid channel fluidically connecting the container and the liquid interface, the liquid channel and the liquid interface defining a main liquid flow direction approximately parallel to the second dimension of the interface and the second dimension of the container;

at least one a secure feature;

at least one key pen;

at least one recess, the liquid channel, the liquid interface, the at least one secure feature, the at least one key pen, and the at least one recess intersected by a first virtual reference plane parallel to the second and third dimension;

integrated circuit contact pads that extend along, and are intersected by, a second virtual reference plane offset from, and parallel to, said first virtual reference plane adjacent a distal side of the interface structure, and a front push area adjacent the liquid interface extending at the opposite side of the liquid interface with respect to the integrated circuit contact pads.

* * * * *